United States Patent

[11] 3,536,209

| [72] | Inventors | Arthur R. Burch<br>Wayzata, and<br>Charles E. Bates, Minneapolis, Minnesota |
|---|---|---|
| [21] | Appl. No. | 543,229 |
| [22] | Filed | April 18, 1966 |
| [45] | Patented | Oct. 27, 1970 |
| [73] | Assignee | Clark Equipment Company<br>a corporation of Delaware |

[54] AUTOMATIC MATERIAL-UNIT STORAGE AND METHOD
10 Claims, 38 Drawing Figs.

| [52] | U.S. Cl. | 214/16.4 |
|---|---|---|
| [51] | Int. Cl. | B65g 1/00 |
| [50] | Field of Search | 214/16.4, 16.42, 16.14+ |

[56] References Cited
UNITED STATES PATENTS

| 1,919,269 | 7/1933 | Beckel | 214/16.1(4)UX |
|---|---|---|---|
| 2,670,859 | 3/1954 | Zeckendorf et al. | 214/16.1(4-E)UX |
| 2,923,421 | 2/1960 | De Roumefort | 214/16.1(4-B)UX |
| 2,941,738 | 6/1960 | Burke et al. | 214/16.4(2)UX |
| 3,139,994 | 7/1964 | Chasar | 214/16.4 |
| 3,171,551 | 3/1965 | Stirling | 214/16.1(4-F)UX |
| 3,184,083 | 5/1965 | Chasar | 214/16.4(2)UX |
| 3,219,207 | 11/1965 | Chasar | 214/16.4(2)UX |
| 3,279,626 | 10/1966 | De Roumefort | 214/16.1(4)UX |
| 3,323,661 | 6/1967 | Chasar | 214/16.4(2)UX |
| 3,389,314 | 6/1968 | Lemelson | 214/16.4(2)UX |
| 2,988,237 | 6/1961 | Devol | 214/11 |
| 3,049,247 | 8/1962 | Lemelson | 214/16.4 |
| 3,206,041 | 9/1965 | McGrath | 214/8.5 |
| 3,294,260 | 12/1966 | Frangos | 214/16.1 |

FOREIGN PATENTS

| 967,451 | 8/1964 | Great Britain | 214/670 |
|---|---|---|---|
| 230,283 | 11/1963 | Austria | 214/4(2)UX |
| 922,075 | 3/1963 | Great Britain | 214/16.1(6-C)UX |

*Primary Examiner*—Gerald M. Forlenza
*Assistant Examiner*—Raymond B. Johnson
*Attorneys*—Kenneth C. Witt, John C. Wiessler, Robert H. Johnson and R. J. Falkowski ABSTRACT: A material storage and handling system has a transfer vehicle and a stacker vehicle. The transfer vehicle is adapted to receive and carry the stacker vehicle and the stacker vehicle is adapted to carry and transfer material between the transfer vehicle and selected bins in a multiaisle, multibin storage structure. The transfer cart has two receiving stations for receiving material for pickup by the stacker vehicle. The stacker vehicle operates to pick up and deposit material to both the right and left sides within the aisles and at the transfer vehicle.

Patented Oct. 27, 1970 3,536,209
Sheet 5 of 31

INVENTORS
ARTHUR R. BURCH,
CHARLES E. BATES
BY Schroeder, Siegfried & Ryan ATTORNEYS

SHOWN AT AISLE NO. 1

SHOWN IN HOME POSITION

Patented Oct. 27, 1970

INVENTORS
ARTHUR R. BURCH
CHARLES E. BATES
BY Schroeder, Siegfried & Ryan
ATTORNEYS Patented Oct. 27, 1970

INVENTORS
ARTHUR R. BURCH,
CHARLES E. BATES
BY Schroeder, Siegfried
& Ryan ATTORNEYS

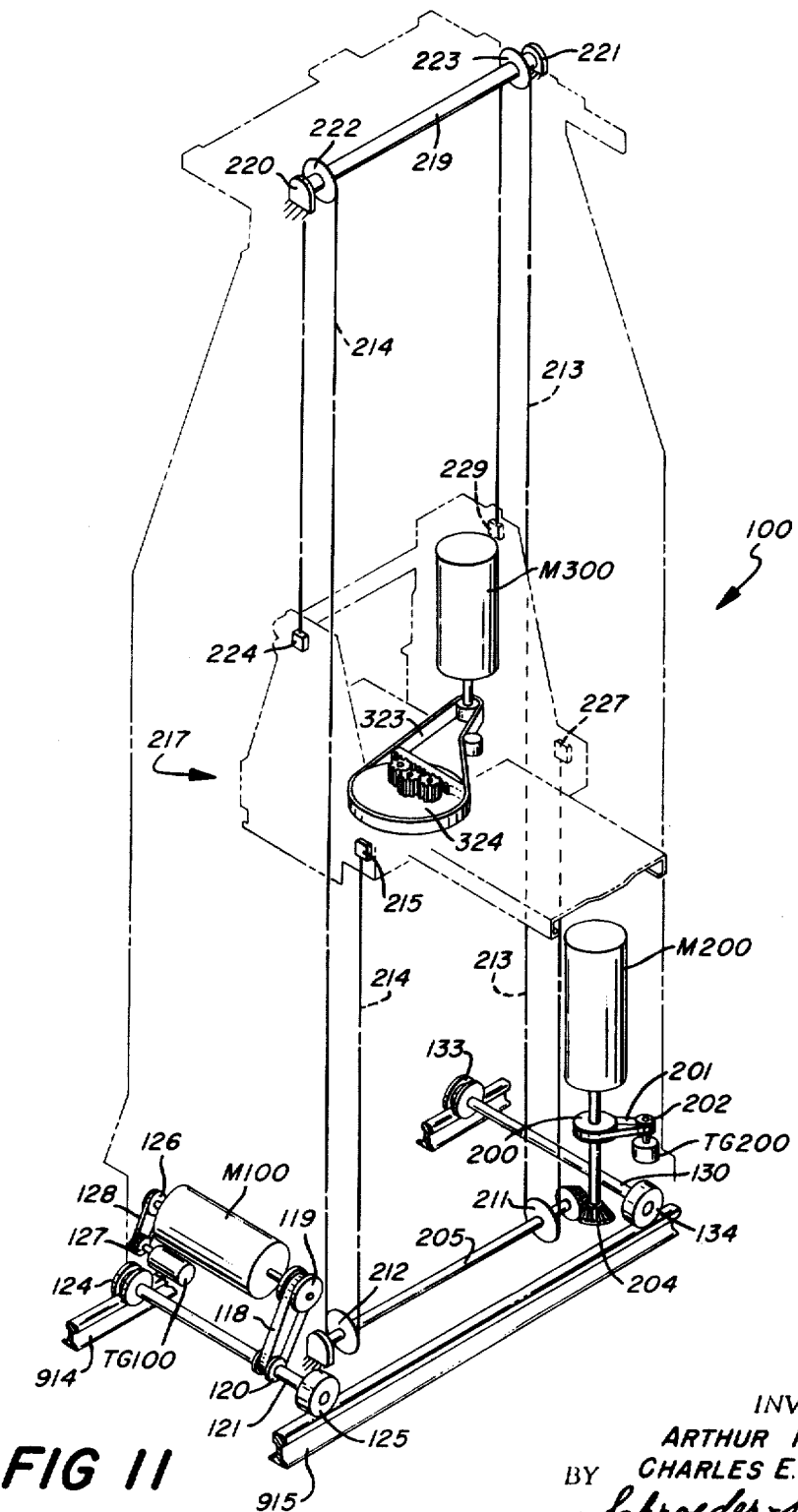

Patented Oct. 27, 1970

INVENTORS
ARTHUR R. BURCH,
CHARLES E. BATES
BY Schroeder, Siegfried & Ryan
ATTORNEYS

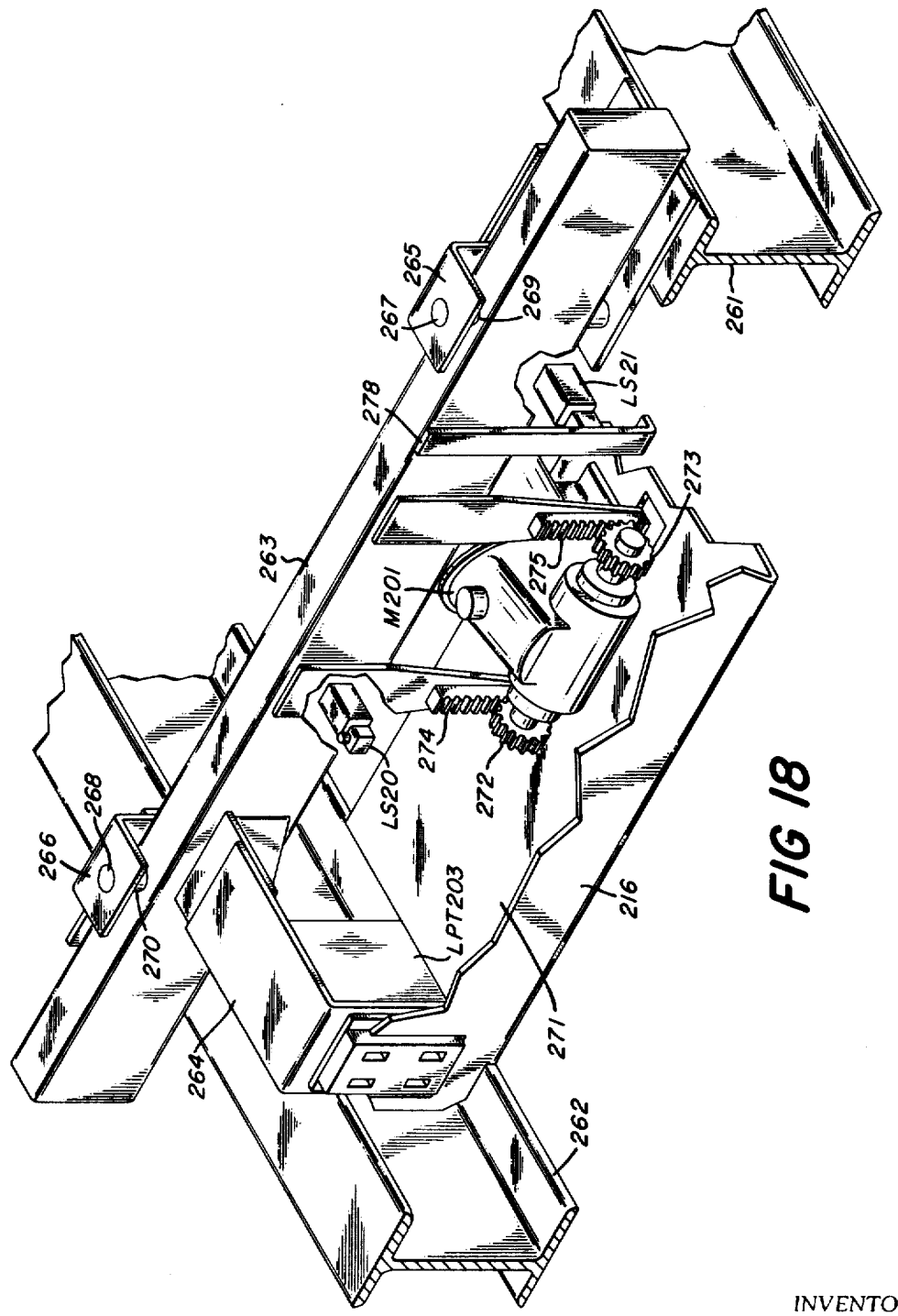

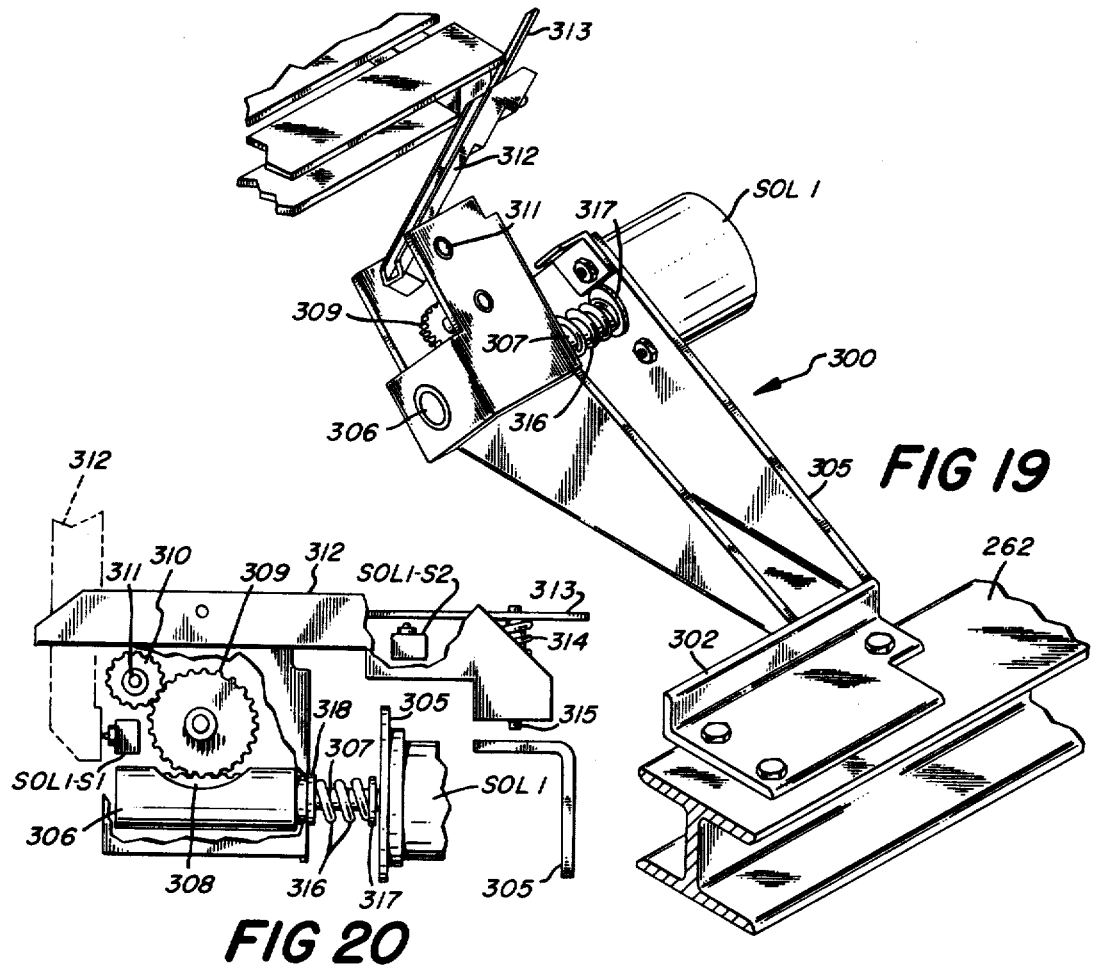

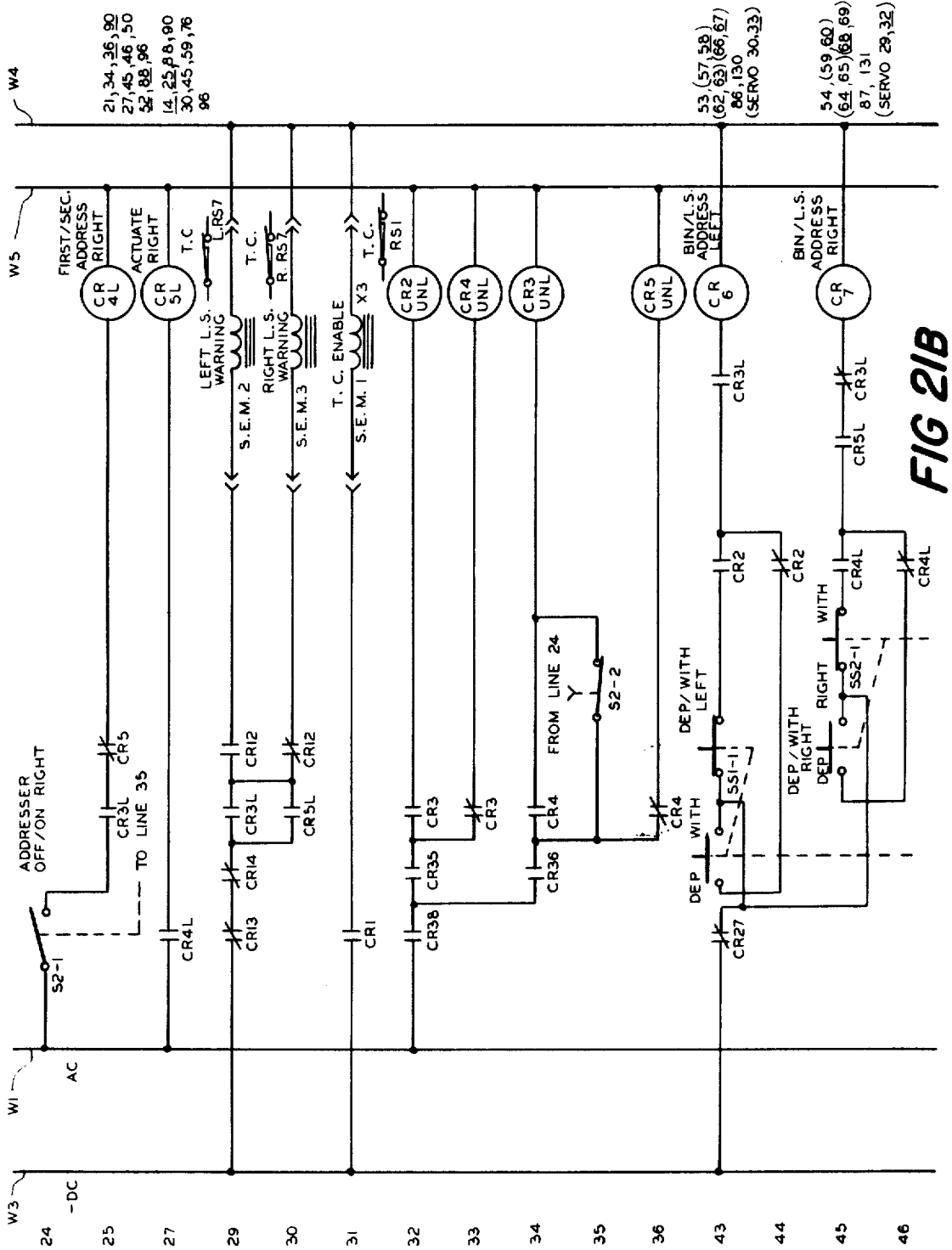

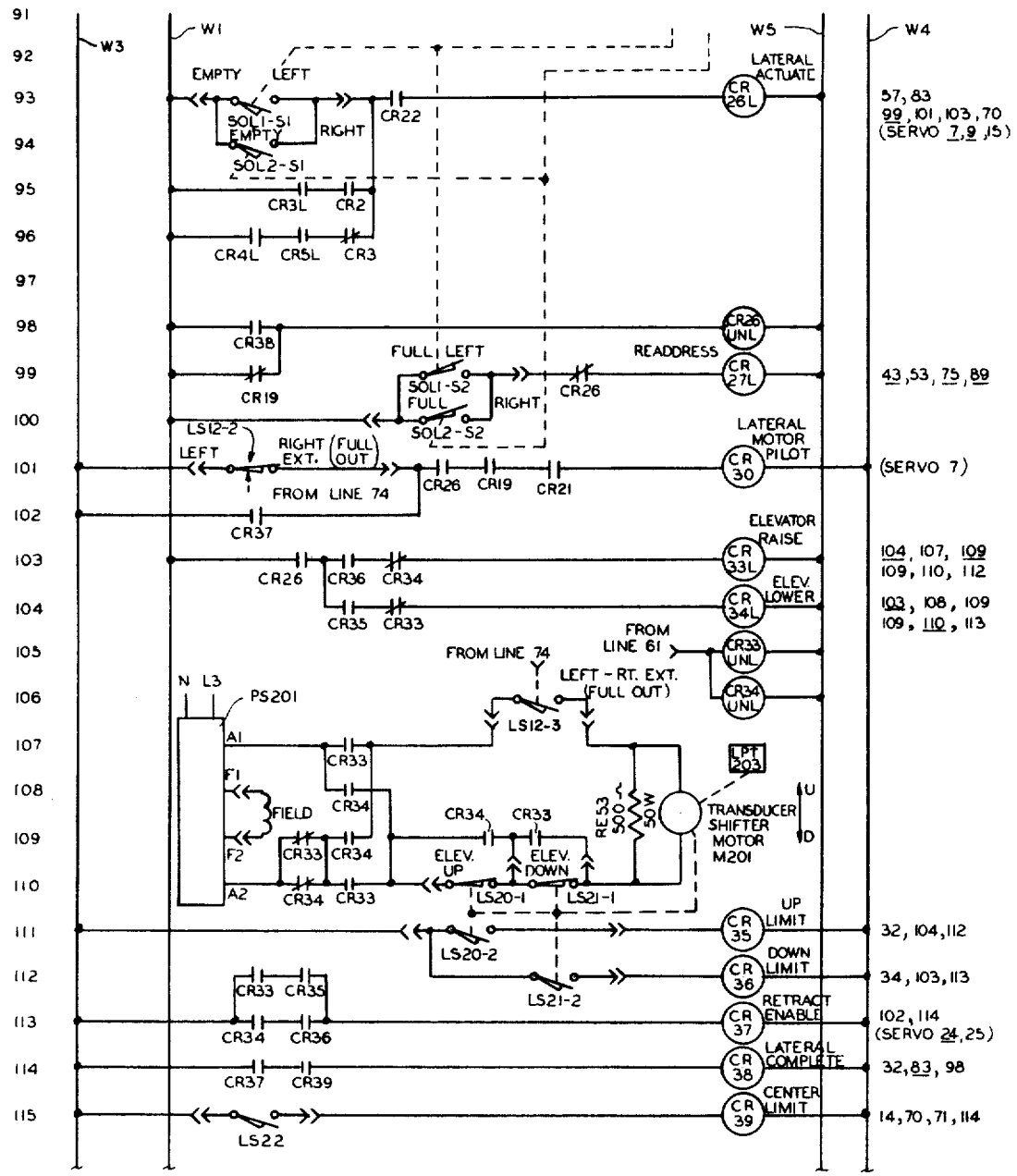
FIG 21F
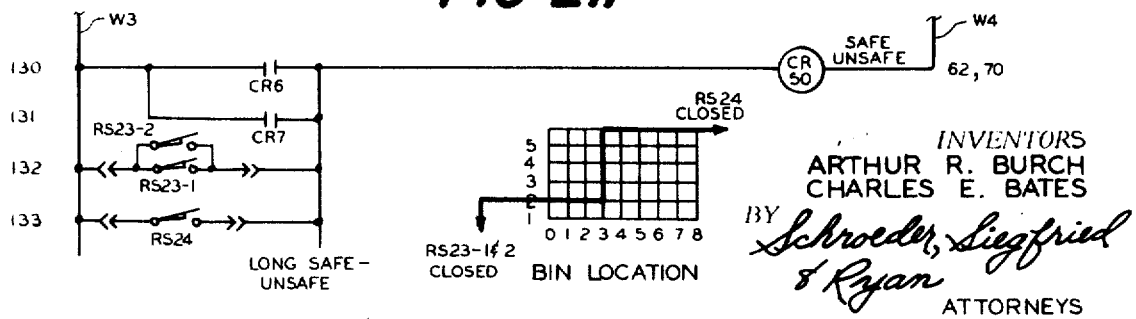

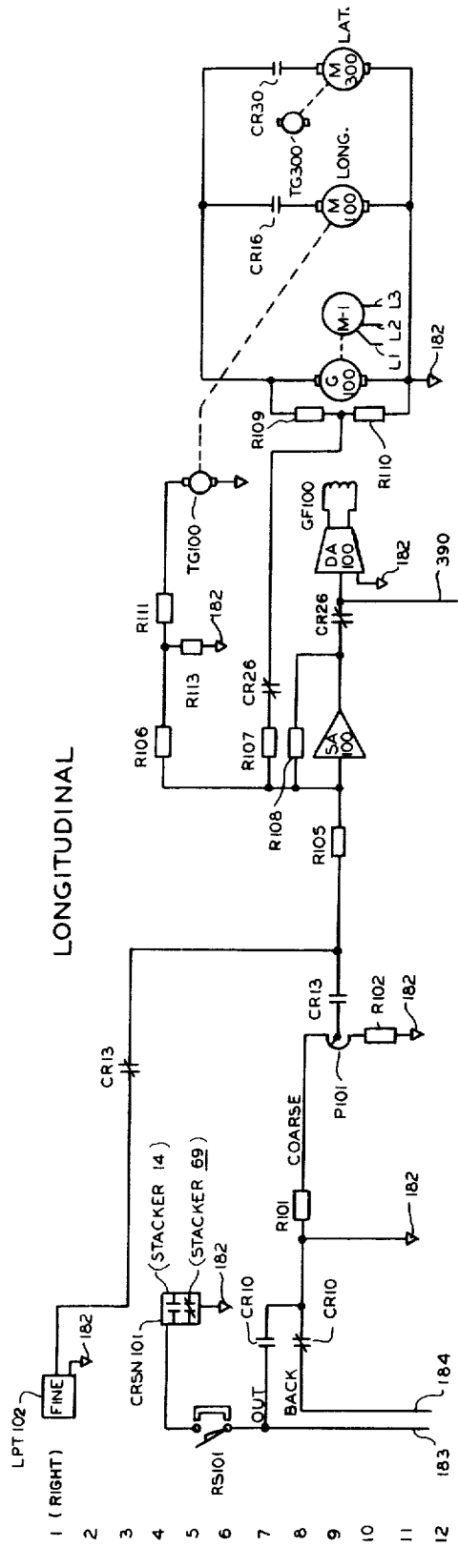

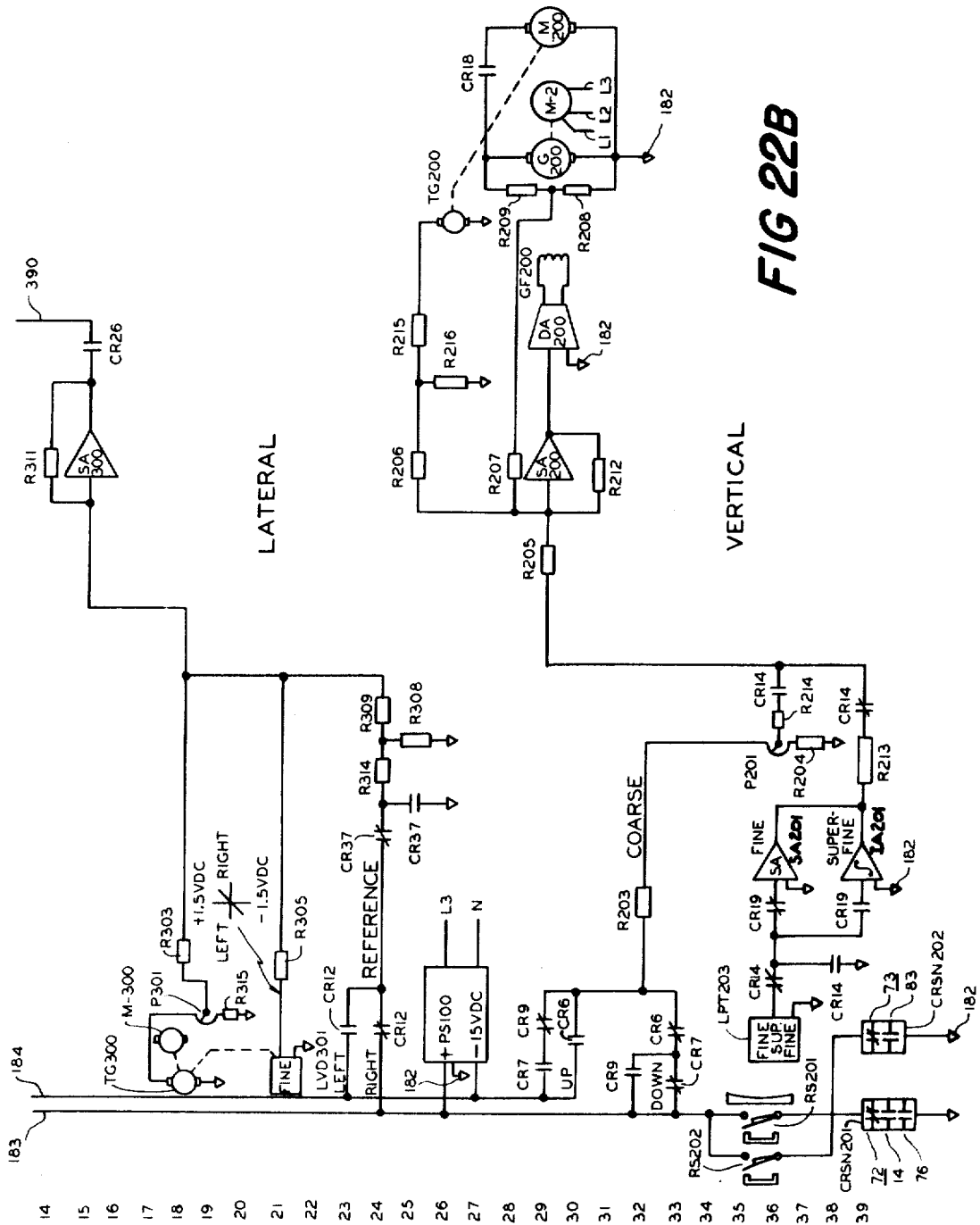

AUTOMATIC MATERIAL-UNIT STORAGE AND METHOD

This invention relates to the field of automatic warehousing equipment, and more particularly to an apparatus and method for automatically depositing and withdrawing loads from warehouse bins that utilizes two cooperatively operating vehicles.

GENERAL DESCRIPTION

The embodiment disclosed comprises an automatic warehousing system that uses two vehicles, a stacker and a transfer cart, controlled by command signals which are to move and store material units.

To aid in the disclosure of the invention, reference may be had to FIG. 1, which shows the basic components that make up the system.

Bins formed in vertical columns and horizontal rows are arranged in a warehouse with aisles extending between the bins, and with an aisle or access area maintained across the ends of the aisles. That is, the bins may extend up to one side of the building at one end of each aisle, but on the opposite end of the aisles there is space for the transfer cart which runs perpendicular to the direction of the aisles. The bin arrays are arranged along the aisles, and in this particular embodiment all the bins are the same width, and height. The loads to be handled may take on many forms such as pallet supported loads, cartons, boxes, and crates to name a few and will be referred to generally as material units. In the particular embodiment shown and described herein, pallets will be used which are approximately 48 inches long, 42 inches wide to support the individual loads, and will accommodate a load approximately 44 inches high. The pallets form the support in the bin areas for their loads.

The transfer cart operates across the ends of the aisles and perpendicular to the main storage aisles. The transfer cart permits the stacker to be moved from one aisle to another, and thus service a number of aisles with only one stacker. Pallet dollies are provided on the left and right load stations of the transfer cart for picking up a load from a depositing vehicle such as a fork lift or industrial truck when extended, and positioning the load at the load station on the transfer cart for a pick-up by the stacker when retracted.

The transfer cart is a vehicle driven by a direct current motor coupled through a gear reducer. A timing belt and pulley drive is used to drive the wheels on the transfer cart. Generally, a track is formed across the outside of the ends of the aisles (to the left and right), and the wheels on the transfer cart contain flanges to guide the transfer cart along the track. An electrical servo loop is used to operate and control the destination and speed of the transfer cart. After the transfer cart is programmed for a selected aisle, position locks are actuated to release the transfer cart and allow it to transfer from one aisle to another at which time the position locks again lock the transfer cart to the end of the aisle. In other words, the stacker, while being upon the transfer cart, is transferred from one aisle to another.

The stacker operates in the aisles between two racks of bins and moves longitudinally forward (away from the transfer cart) and backward (towards the transfer cart) in the storage aisles. The stacker also has an elevator situated thereon which moves vertically up and down past the face of the bins or racks. The pallet loads are moved laterally into (extended) and out (retracted) of the storage area or bins by a lateral platform mechanism which forms the base or support on the elevator for the pallets. For this particular embodiment, the stacker will be used in conjunction with the transfer cart which carries with it, its own load stations, but the stacker is fully capable of receiving or delivering loads from a load station at the end of the aisle, without a transfer cart.

The stacker is a multiwheeled vehicle driven by a direct current motor coupled to a gear reducer driving one of the axles with a timing belt. The stacker moves over a regular crane rail, which is mounted on the floor in each of the aisles. The drive wheels on one side of the vehicle contain flanges to guide the vehicle along the track.

The elevator, forming a part of the stacker, is also driven by a direct current motor and gear reducer. The elevator is raised and lowered through a pair of lifting chains which are driven by sprockets secured to the main lifting shaft. The elevator assembly is guided by rollers which run on a track attached to the stacker masts.

The stacker will provide two different modes of operation. In the "Deposit" mode of operation, a load of material will be picked up from either load station and deposited in any bin, and the vehicle will then return to the home station. In a "Withdrawal" mode of operation, a load of material will be picked up from any bin and deposited at either load station. The stacker is also capable of performing a dual command of any combination of the two modes of operation just described. All of these combinations are essentially two single commands, with one being carried out after the other, except the "Deposit-Withdrawal" combination, which requires the cycle to be altered and allow travel of the stacker directly from the deposit bin to the withdrawal bin.

The lateral platform mechanism which forms the base of the elevator is also driven by a direct current motor and gear reducer, both of which are mounted on the elevator frame. The lateral platform mechanism is driven through a rack and pinion arrangement to cause the platform of the elevator to extend its complete length into the left or right bin area and then retract to the center of the elevator.

One motor-generator set supplies power to either the longitudinal drive, or the lateral platform mechanism, since the lateral platform mechanism is never operated when the longitudinal drive is energized and vice versa. However, in normal operation, the longitudinal drive and vertical drive mechanism operate simultaneously.

It is a general object of this invention to provide material handling apparatus using only a single material-unit stacker which may be transferred by a transfer cart from one aisle to another of a load support structure.

It is another object of the present invention to make use of a transfer cart device as a longitudinal and vertical home station reference for the stacking device.

It is still another object of this invention to provide load station apparatus carried with the transfer cart from one aisle to another.

It is a further object of this invention to provide means for locking the transfer cart mechanism at an aisle where the stacker device is to operate.

It is still another object of this invention to provide a transfer cart and stacker mechanism which causes said devices to move to the destination determined by an operator through a coincidence circuit.

It is another object of the present invention to provide interlock means preventing the stacker from moving while being transferred from one aisle to another on the transfer cart.

It is still a further object of this invention to protect a load station from receiving or discharging a material unit when the stacker is about to receive or discharge a material unit to that load station.

It is a further object of this invention to provide means for determining when a bin is obstructed.

It is yet another object of this invention to provide a method of controlling the motions and destinations of the stacker and transfer cart.

It is still a further object of the present invention to provide a pair of load stations to receive and discharge material units from the transfer cart.

It is still another object of this invention to provide a transfer cart with a load station positioning device to properly orient any material units which are to be picked up by the stacker.

It is another object of the present invention to provide means for locking the transfer cart control means when the transfer is in progress.

It is yet another object of this invention to provide direction control means for the transfer cart and stacker irrespective of their positions during travel.

It is a further object of this invention to provide actuation elements on the bin structure for controlling certain of the sensing means of the transfer cart and stacker mechanism.

It is still another object of this invention to provide a stacker mechanism having an elevator thereon which moves vertically as the stacker carriage moves longitudinally with respect to the bin structure openings.

It is yet another object of this invention to provide means for vertically shifting bin sensors to provide the necessary vertical platform movement for depositing and withdrawing a material unit in the bin structure.

It is still another object of the present invention to align the elevator platform vertically with a superfine reference on the stacker carriage.

It is still another object of this invention to provide a stacker which can travel towards the transfer cart only upon satisfying certain predetermined safety conditions.

These and other objects and advantages of our invention will more fully appear from the following description, made in connection with the accompanying drawings, wherein like reference characters refer to the same or similar parts throughout the several views, and in which:

FIG. 6a is a plan view of the left pallet dolly extended;

FIG. 6b is a side elevational view of the left pallet dolly as shown in FIG. 6a;

FIG. 6c is a partial sectional view of the left pallet dolly taken along section line 6c–6c of FIG. 6a;

FIG. 11 is a diagrammatic view of the stacker and lateral platform driving mechanisms;

FIG. 18 is a partial isometric view of the transducer shifter bar showing the transducer and driving motor;

FIG. 19 is an isometric view of a transducer having an element shown striking an obstruction in a bin support area;

FIG. 20 is an isometric view of the same element as shown in FIG. 19 in its deenergized condition;

FIGS. 21a through 21h are schematic diagrams of the stacker logic and control circuits;

FIGS. 22a and 22b are schematic block diagrams of the stacker drive and servo control circuits;

Figure 1:
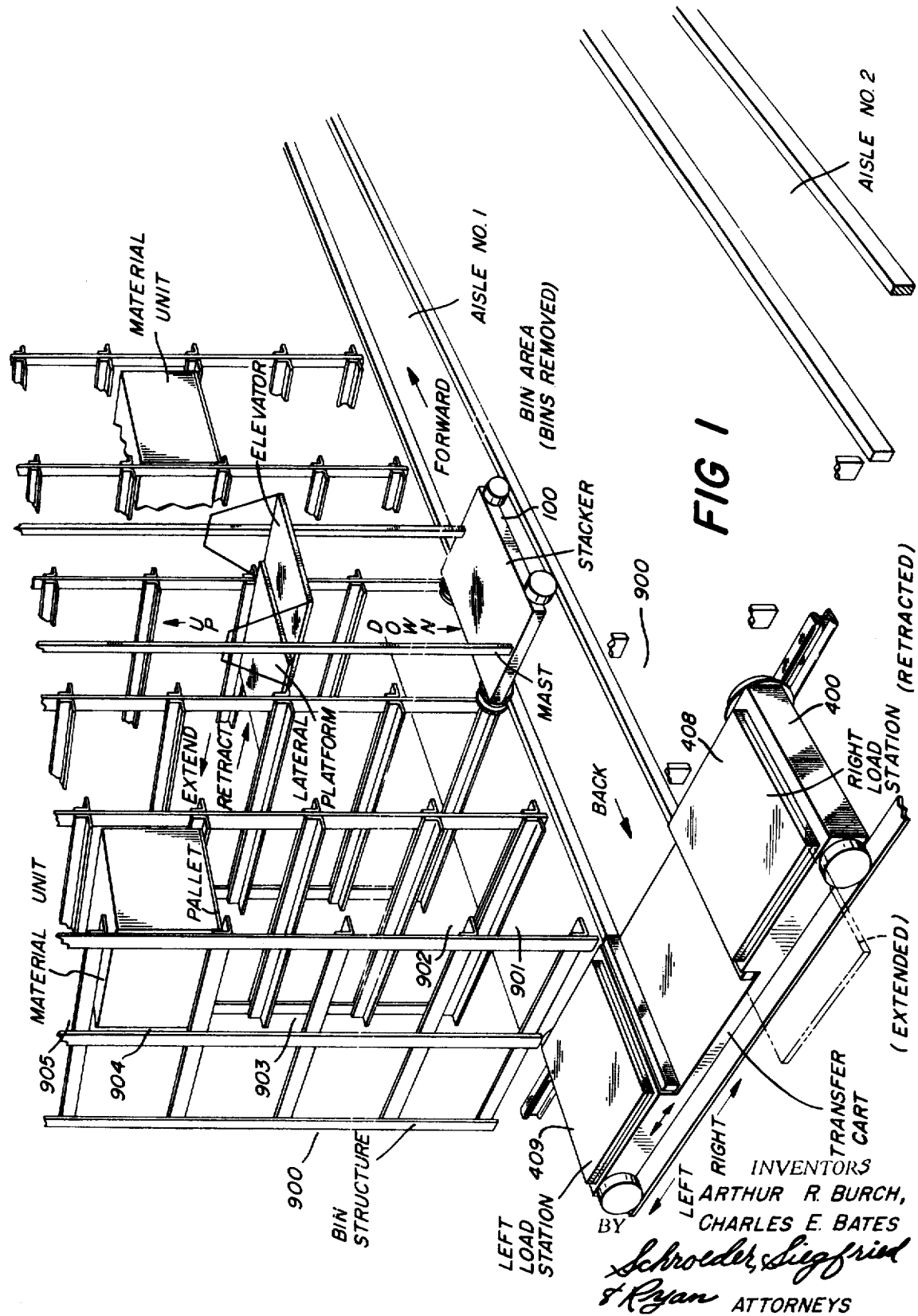
FIG. 1 is an isometric schematic diagram of the transfer cart located in front of aisle No. 1 with the stacker operating in the aisle in front of a bin structure.

In FIG. 1, a material-unit stacker 100 is shown in aisle No. 1 and a transfer cart 400 is shown at rest in front of aisle No. 1 formed in a bin structure 900. As mentioned previously, the transfer cart 400 moves across the end of the aisles and the stacker moves in the aisles between the bins. A pair of load stations 408 and 409 are located on the right and left sides respectively of the transfer cart.

THE BINS

Bin structure 900 is subdivided into a plurality of bins and for this embodiment, is shown to be five bins high where bins 901 are at the first level or lowermost level and are situated to the left and right of the stacker. Bins in the next level or second level are designated 902, bins in the third level or row being designated 903 respectively. The fourth row contains a pair of bins on the left and right sides designated 904 with the uppermost or top bins being designated 905.

Figure 2:
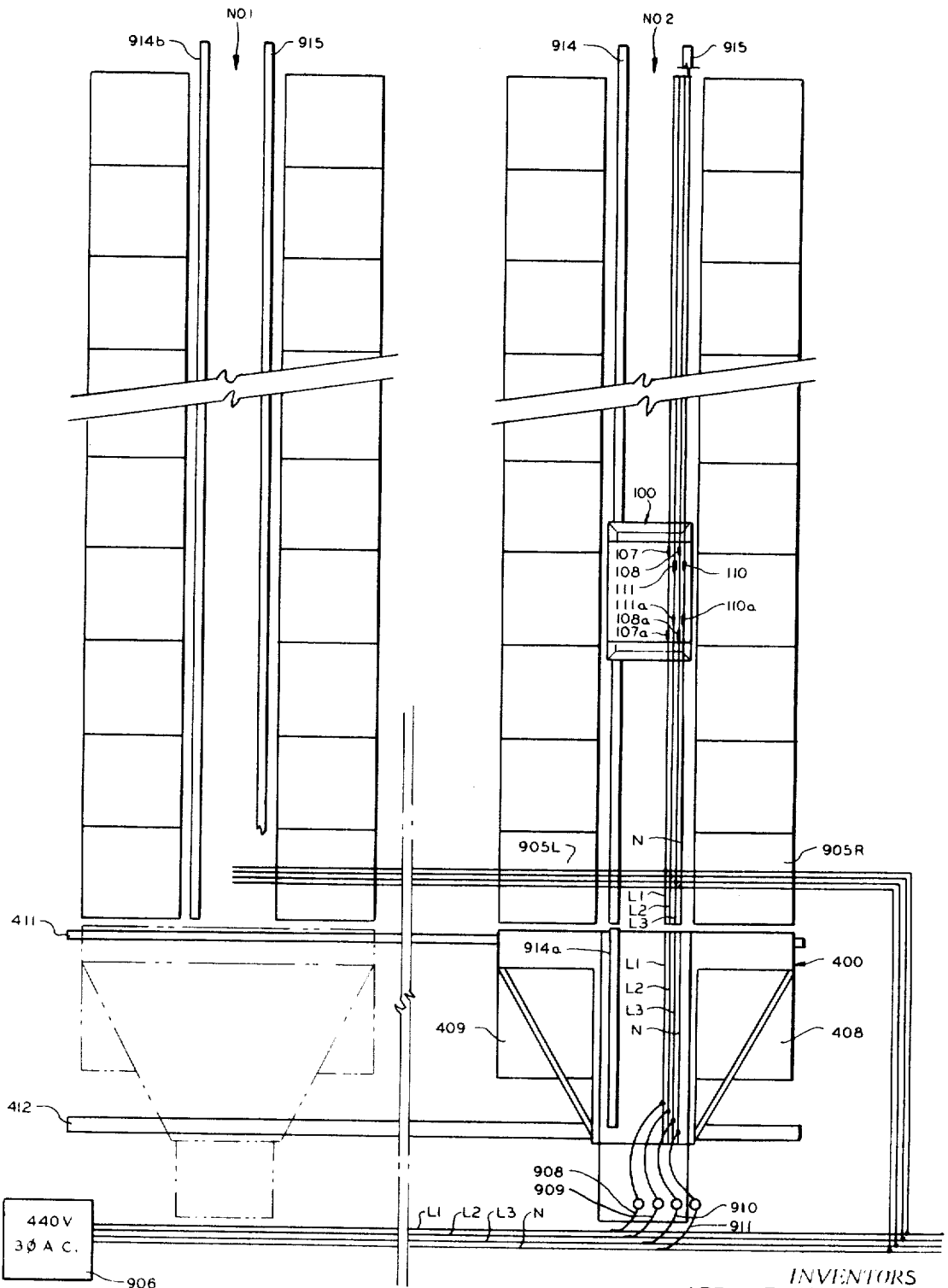
FIG. 2 is a diagrammatic plan view showing the transfer cart, stacker and bin structure with power connections.

In FIG. 2, there is shown an alternating current source of power 906 which is connected to a plurality of lines $L_1$, $L_2$, $L_3$, and N to provide a three phase 440-volt power system to the transfer cart and to the stacker. These lines supply power to the lines which extend down the aisles between the bins, such as the aisle designated No. 2 that extends between a plurality of bins arranged in columns and rows and terminating in a manner such as just described with bins on the left and right side of the aisle. The power lines extend down the aisle and as shown, stacker 100 is approximately four bins longitudinally down the aisle. In order to supply power to the transfer cart, power is picked up through four collectors 908, 909, 910 and 911. These collectors are respectively connected to stublines $L_1$, $L_2$, $L_3$ and N on the transfer cart to supply power for the stacker. At the bottom of the aisle there is located a pair of rails 914 and 915 over which stacker 100 travels. The transfer cart 400 has a pair of stub-rails 914a and 915a which are extensions of rails 914 and 915 and travel with the transfer cart to support the stacker. Shown immediately to the left in FIG. 2 is a representation of another bin structure in which a pair of rails 914b and 915b are situated. It will also be observed that there are a pair of rails 411 and 412 secured to the warehouse floor over which the transfer cart travels across the ends of the aisles.

THE TRANSFER CART

Figure 3:
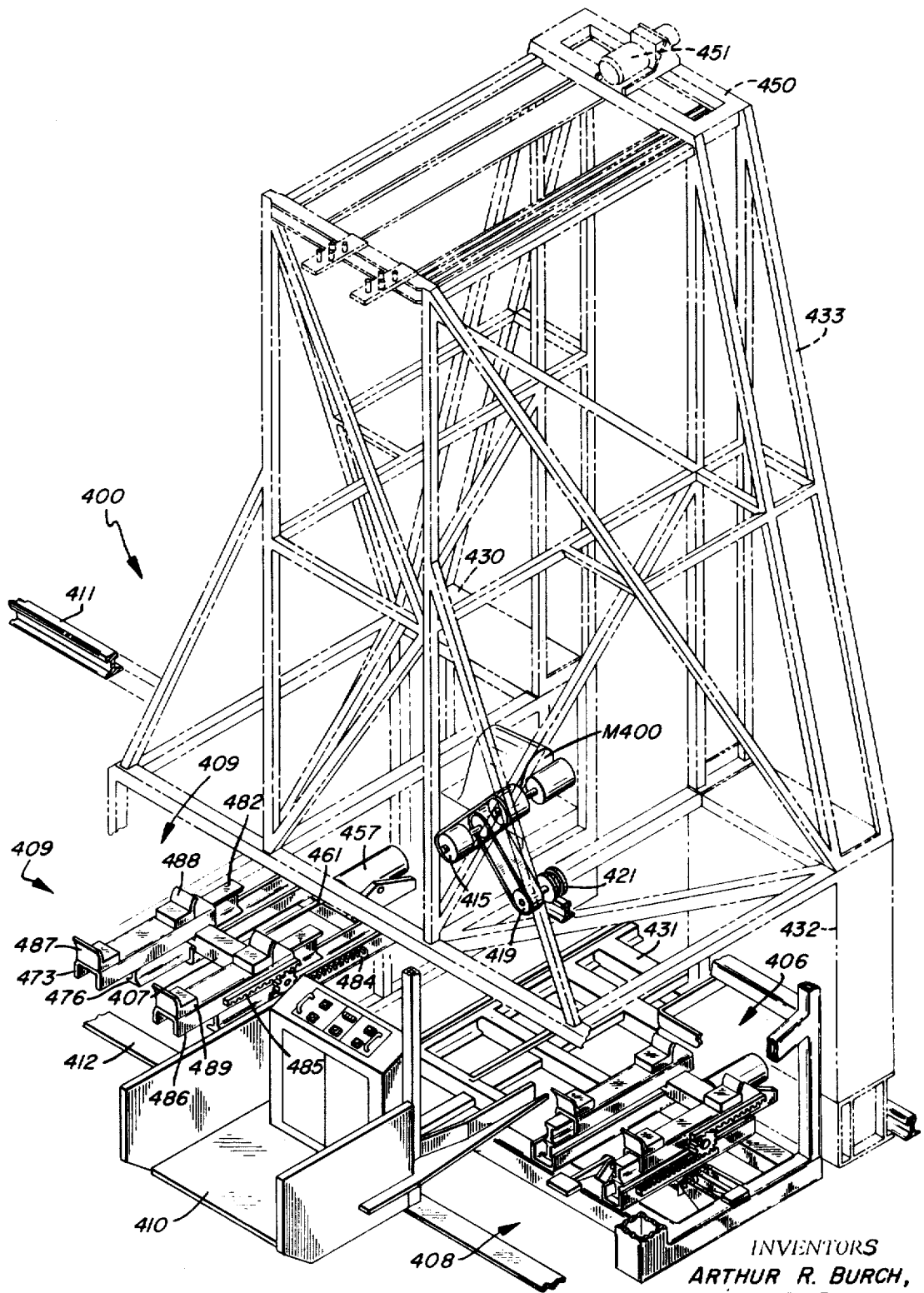
FIG. 3 is a partial isometric view of the transfer cart in front of an aisle.
Figure 4:
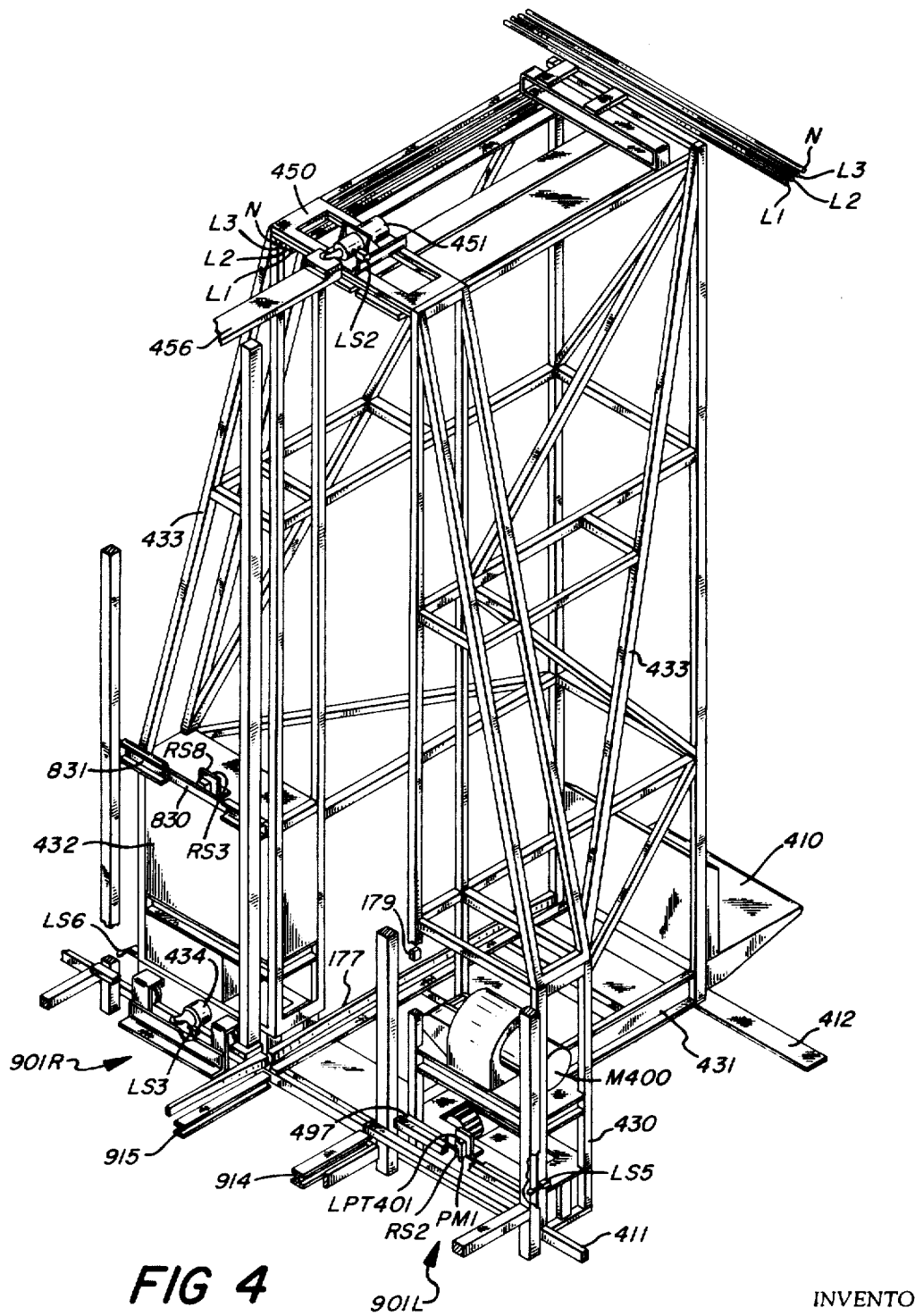
FIG. 4 is an isometric view of the transfer cart with the pallet dollies removed and certain portions broken away to show the placement of its control switches and transducers.

FIGS. 3 and 4 show the superstructure of the transfer cart which when seen from above is of a "T" shape. To further aid in identifying the transfer cart structural parts, the left rear structural section is designated structural section 430, the center portion thereof forming the stem of the T-shaped structural section is designated 431 and the rear right-hand structural section is designated 432. The upper pyramid shaped structural members are designated 433.

Figure 5:
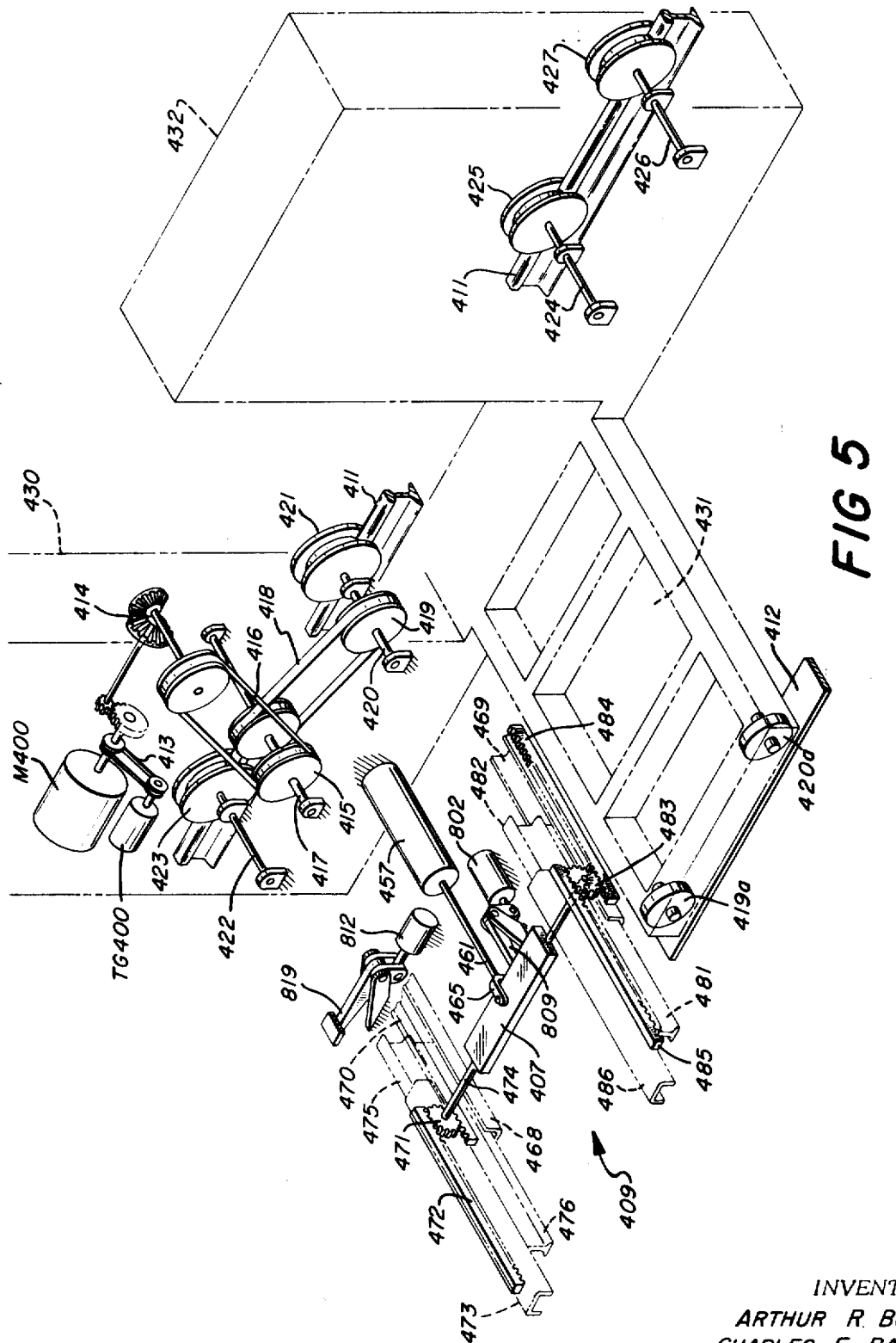
FIG. 5 is a diagrammatic view of the transfer cart showing the driving mechanisms with the left pallet dolly extended.

A more detailed schematic view of the driving mechanism is shown in FIG. 5 in the lower left rear portion 430 of the transfer cart structure, a drive motor M400 is secured to the framework and a tachometer generator TG400 is driven by motor M400 through a belt 413. Motor M400 drives a gear train 414 which in turn drives a pulley 415 through a timing belt 416. The pulley 415 is secured to a shaft 417 which in turn drives another timing belt 418 and a pulley 419 which is secured to a shaft 420, that is journaled in a pair of bearings and rotates a flanged driving wheel 421 which is in driving relationship with rail 411. Another shaft 422 is journaled in a pair of bearings at the extreme left side of transfer cart structure 430 and is secured to a flanged wheel 423.

Another shaft 424 is journaled in a pair of bearings on the right-hand rear portion 432 of the transfer cart structural mechanism and is secured to another flanged wheel 425 which rides on rail 411. At the extreme right-hand rear portion 432 of the transfer cart structural mechanism, another shaft 426 is journaled by a pair of bearings and has secured thereto, a flanged wheel 427 which engages rail 411. The front part of the transfer cart structural mechanism is carried by a pair of wheels 419a and 420a which roll on top of rail 412 which in this case is a flat strip.

FIG. 4 shows a position lock 434 secured to the right rear structural section 432. Position lock 434 extends through the face of structural section 432 that faces the bin section 901. Position lock 434 has a plunger which is moved forwardly and away from the transfer cart and rearwardly towards the transfer cart by a piston contained in position lock 434 driven by compressed air. The plunger engages a U-shaped striker plate which is secured to the floor of the warehouse.

The upper portion of the transfer cart superstructure 433 (FIGS. 3 and 4) is connected to a rectangular frame 450 that is secured to the superstructure and has another position lock 451 secured to frame member 450. The compressed air lines are the same as those for the lower lock assembly and the position locks operate in the same manner. The top lock 451 shown in FIG. 3 has its plunger retracted. A striker plate is secured to a top brace member 456. Brace 456 is bolted to a structural member which bridges the aisle.

FIGS. 3, 5, 6a, 6b and 6c show a left pallet dolly 409 extended and FIG. 3 shows right pallet dolly 408 retracted. An air cylinder 457 is pivotally secured to a pair of brackets 458 and 459 by a pin 460. Situated within the cylinder, is a piston which drives a plunger 461 forwardly and rearwardly. A compressed air line 463 supplies compressed air to cause the piston to move forwardly and another compressed air line 464, supplies compressed air to cause the piston to retract or move rearwardly. The end of plunger 461 is pivotally connected to a clevis 465 by a pin 466, the clevis being connected to a pallet dolly member 407 to cause it to move in an extending and retracting mode of operation. Brackets 458 and 459 and a pair of U-shaped channel members 468 and 469 are secured to an outer box frame 467. The U-shaped channel members 468 and 469 form the lower part of the pallet dolly which moves outwardly and rearwardly to handle the load. Secured to the side of U-shaped channel member 468 by suitable means such as welding, is a rack 470. Rack 470 is in communication with a pinion gear 471 which engages another rack 472 that is secured to an inverted U-shaped channel member 473 that overlies lower channel member 468. It will be seen that gear 471 is journaled on a shaft 474 which is secured to a pair of I-beams 475 and 476 by suitable means such as welding. I-beam 475 is stacked on top of I-beam 476 and welded where the two join each other, the edge being the part welded to shaft 474. On the side opposite shaft 474, pallet dolly member 407 is secured by suitable means such as welding. It will thus be seen that as plunger 461 is moved outwardly, gear 471 is subjected to the translational movement and is rotated because of its engagement with rack 470 thus causing the upper U-shaped member 473 to be projected outwardly twice the length of the stroke of plunger 461. The lower I-beam portion 476 is secured in place by a pair of rollers 477 and 478 which engage the outer lip portion of lower I-beam 476 and as the I-beams move outwardly due to movement of plunger 461, another pair of rollers engage the roller I-beam 476. FIG. 5 shows a lower I-beam member 481 on the right member of the left pallet dolly secured to another I-beam 482 with a pinion gear 483 secured to the edge portions thereof by a shaft as just described. Connected to the outside of U-shaped channel member 469 is a rack 484 which communicates with pinion gear 483 which in turn communicates with another rack 485. Another inverted U-shaped channel member 486 overlies channel 469 and is secured by rollers to the I-beam structure 481 and 482 in the manner just described for the other extension member. Rack 485 is welded or secured by other suitable means to channel member 486 and rack 484 is welded to channel member 469.

Secured to the extreme end of inverted channel member 473 is a pallet dolly load pad 487 (FIG. 6a) and secured near the other end of channel 473 is another load pad 488. Secured to inverted channel member 486, is a pair of load pads 489 and 490. Each of the load pads have three rollers which aid in moving the pallet across the pallet dolly and also each pad contains a guide bracket to aid in securing the pallet properly on the pallet dolly. The pallet overhangs the outside edges of channel members 473 and 486 and when retracted, strikes the edge of a first guide rail 491 which causes the pallet to be moved laterally towards the center section 431 of the transfer cart and another guide 492 helps position the pallet. A back stop 493 (FIG. 6a) prevents the pallet from moving rearwardly beyond that point of travel.

A compressed air line 801 (FIG. 6a) supplies compressed air to the end of a positioning cylinder 802. Positioning cylinder 802 is secured to a cross-brace of the frame structure 467 by a U-shaped clevis 803 secured by a pin 804. On the other end of positioning cylinder 802, there is a plunger 805 which drives a U-shaped link 806 outwardly to cause an arm 807 to pivot upwardly about a pin 808 which is secured to a bracket 809. As arm 807 moves upwardly and engages the pallet, the pallet is forced rearwardly and against rear guide 493 of the load station 409. Compressed air is also passed through a line 811 to another positioning cylinder 812. Positioning cylinder 812 is oriented at right angles to positioning cylinder 802 and has a piston contained therein which is driven outwardly upon being driven by compressed air through line 811. The end of cylinder 812 nearest compressed air line 811 is secured to an inner beam of frame 467 by a U-shaped clevis 813 which secures cylinder 812 thereto through a pin 814. The other end of cylinder 812 has a plunger 815 extending therefrom which engages a link 816 that is secured to an arm 817 and pivotally connected by a pin 818 to a bracket 819. The end of arm 817 contains a pressure pad as does the end of arm 807 and is moved in the same manner as just described for positioning cylinder 802 and its plunger so that upon moving upwardly and engaging the pallet, the pallet is forced towards a corner guide bracket 820 and eventually the pallet engages limit switches L.LS-8, L.LS-9 and L.LS-10, which will be further described in the description of the control circuits. Upon the pallet being placed aboard the pallet pads, limit switches L.LS-7 and L.LS-7A are actuated.

Inasmuch as the right load station 408 is the same as left load station 407 and symmetrical about the center section 431 of the transfer cart, it will not be necessary to describe the right pallet dolly, it being understood that it operates in the same manner as that just described.

TRANSFER CART LOGIC CIRCUITS

Reference is now made in general to the logic circuits (FIGS. 8a, 8b, 8c and 9) for controlling the transfer cart operations, not only as to moving a pallet on the pallet dolly but also transferring the transfer cart from one aisle to another. As shown in all the logic circuits, the line number indicated on the left-hand side of the circuit drawing makes reference to the electrical circuit to the right containing a number of elements. On the right-hand side of the circuit diagram are line numbers for which a relay will have contacts, and where the number is underlined it indicates the contacts are normally closed. The numbers not underlined indicate the contacts are normally open and are closed upon energizing the control relay. Certain alternating current relays, while having one set of contacts, have two different coils, one being known as a "latching" coil and the other as an "unlatching" coil.

When voltage is applied to a latching coil with the unlatching coil energized, the relay operates like a single coil type relay and is "pulled in". When the unlatching coil is deenergized, and a voltage is applied to the latching coil and deenergized, the relay remains in a mechanically latched state and acts as if it was "pulled in". When the relay is mechanically latched and the latching coil is deenergized, energizing the unlatching coil causes the relay to mechanically unlatch and "drop out". As shown in the logic circuits, the latching coils are associated with control relays and the unlatching coils are associated with unlatching relays although they are generally a single relay having dual coils and mechanically connected so as to perform the functions just described.

Figure 8A:
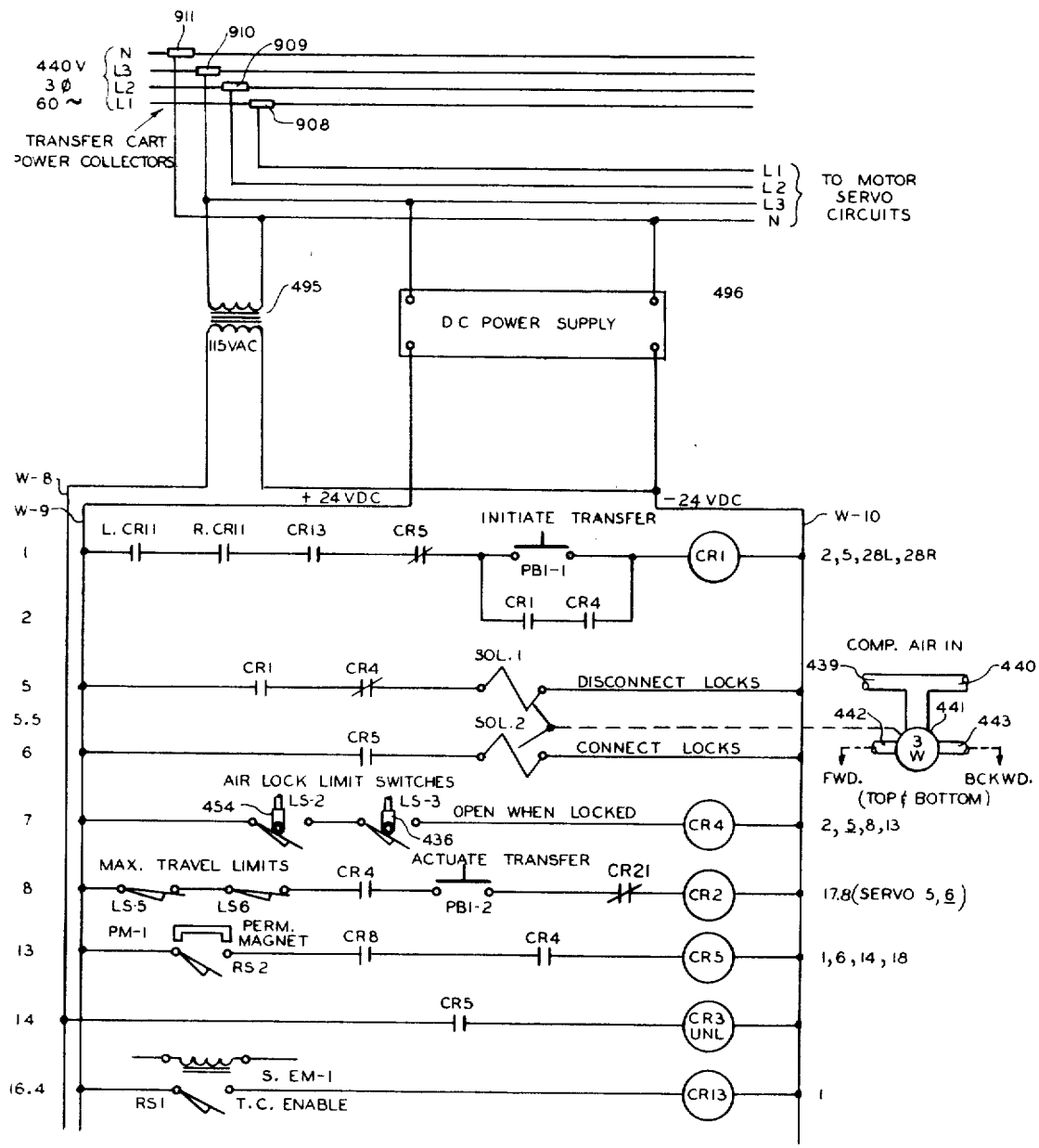
FIGS. 8a, 8b and 8c are schematic diagrams of the logic control circuit for the transfer cart.

The transfer cart logic circuit as found in FIG. 8a shows the power lines supplying power to the transfer cart through the collectors as previously described for an automatic mode of operation. A transformer 495 is connected between the neutral line N and line L 3 to produce a 115-volt output which is connected to a pair of common wires W10 and W8. A direct current power supply 496 is also connected to lines N and L 3 to supply an output voltage of 24 volts which is connected to a wire W9 and common wire W10. Line 1 is connected between wires W9 and W10 and includes a control relay CR-1 connected in series with a pushbutton switch PB1-1, a pair of normally closed relay contacts CR-5 and three open relay contacts L.CR-11, R.CR-11 and CR-13. Connected in parallel with pushbutton switch PB1-1, in line 2, are a pair of series connected relay contacts CR-1 and CR-4 which are normally open. Connected between wires W9 and W10 are a solenoid coil SOL-1 and a pair of series connected relay contacts CR-1 which are normally open and CR-4 which are normally closed. Connected between wires W9 and W10 are a pair of normally open relay contacts CR-5 and a solenoid coil SOL-2 that causes the aisle position locks to be engaged (line 6). Solenoid coils SOL-1 and SOL-2 are mechanically connected to a three-way valve 441 to control its operation. In line 7, control relay CR-4 is connected between wires W10 and W9 through a pair of series connected air lock limit switches LS-2 and LS-3 which are open when the aisle position locks are locked. In line 8, between wires W9 and W10 there are connected in series, a control relay CR-2, a pushbutton switch PB1-2, normally open relay contacts CR-4 and a pair of limit switches LS-5 and LS-6. Limit switches LS-5 and LS-6 are located respectively on the left and right sides of transfer cart 400 and control the maximum travel in each direction of the transfer cart, the switches being opened at maximum travel. In line 13, connected between lines W9 and W10, are a control relay CR-5, a pair of normally open relay contacts CR-4 and CR-8 connected in series, and a reed switch RS-2 which is closed by a permanent magnet PM-1 that is also shown in FIG. 4, located at the null position of a magnetic strip 497 which is used with a linear position transducer LPT-401 shown directly above the permanent magnet PB-1 which will be further described in connection with FIG. 9. Connected between wires W8 and W10, at line 14, are an unlatching relay CR-3UNL connected in series with a pair of normally open relay contacts CR-5.

Connected between wires W10 and W9, at line 16.4 is a control relay CR-13 connected in series with a reed switch RS-1. Reed switch RS-1 is closed by a stacker electromagnet S.EM-1 which allows the transfer cart logic circuit to be enabled.

Figure 8B:
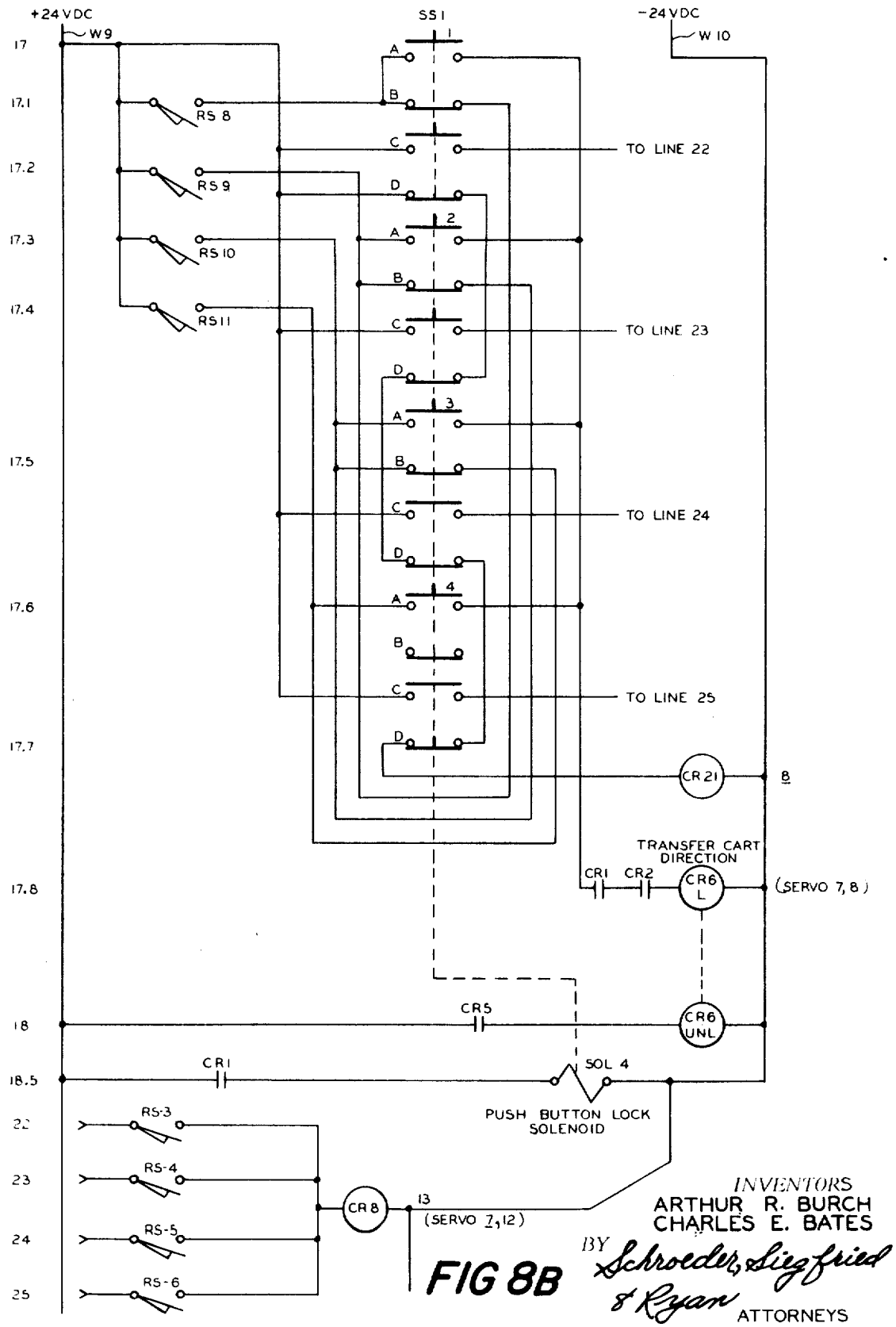

In FIG. 8b, all connections are made between wires W9 and W10. Situated in the center of the figure, is a selector switch SS-1 having sections 1, 2, 3, and 4 with pushbutton contacts A, B, C, and D in each section. It should be understood that normally one section will be depressed indicating a transfer of the transfer cart to that particular aisle and for this particular embodiment, aisle No. 1 corresponds to number 1 on switch SS-1. Switch SS-1 is of the type that is mechanically coupled between sections so that only one section may be depressed at a time and upon pressing a new section, the previously pressed section is deactivated. Starting with line 17, connection is made with contacts C of each switch section. Contacts C of section 1 are connected to a reed switch RS-3 on line 22 which is connected in series with a control relay CR-8. Contacts C of section 2 are connected to a reed switch RS-4 which is also connected to control relay CR-8. Switch contacts C of section 3 are connected to a reed switch RS-5 in line 24 and are connected to control relay CR-8. Contacts C of switch section 4 are connected to a reed switch RS-6 in line 25 which is also connected to control relay CR-8. All of the switch contacts marked D of all sections are connected in series with a control relay CR-21 between wires W9 and W10, on line 17.7. A reed switch RS-8 is connected in series with contacts A of switch section 1, a pair of normally open relay contacts CR-1 (line 17.8) and CR-2, and a control relay CR-6L. Another reed switch RS-9 is connected in series with switch contacts A of section 2 that are in parallel with contacts A of switch section 1 and reed switch RS-8. A reed switch RS-10 is connected to switch contacts A of section 3 which are connected in parallel with contacts A of sections 1 and 2 and the respective reed switches. Another reed switch RS-11 is connected in series with switch contacts A of section 4 which are also in parallel with contacts A of sections 3, 2, and 1 and the respective reed switches. Switch contacts B of section 1 are connected to reed switch RS-8 and are connected in series with switch contacts B of section 2 and connected in series with switch contacts B of section 3, which are then connected between reed switch RS-11 and its connection to contact A of section 4. The switching circuit is completed by connecting switch contacts A and B of section 2 with reed switch RS-9, and connecting contacts A and B of section 3 with reed switch RS-10.

Completing the circuit of FIG. 8b, at line 18 is an unlatch control relay CR-6UNL connected in series with a pair of normally open relay contacts CR-5. In line 18.5, a pushbutton lock solenoid SOL-4 is connected in series with the normally open relay contacts CR-1. Pushbutton lock solenoid SOL-4 is mechanically connected to the pushbutton arrangement of switch SS-1 to ensure that once one of the sections has been depressed and the solenoid energized, it is locked in that position.

Figure 7:
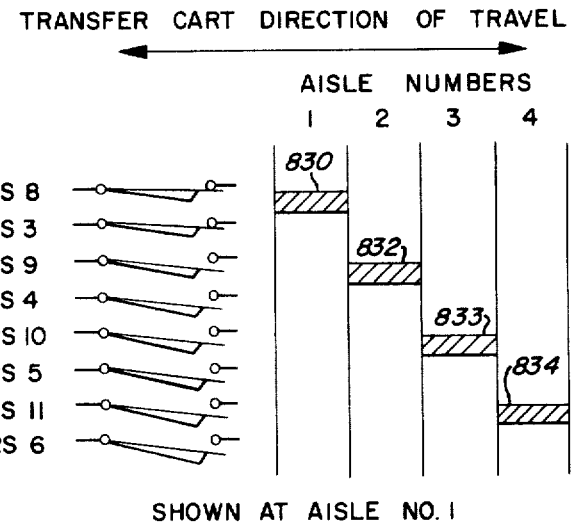
FIG. 7 is a schematic diagram of the transfer cart reed switch and magnetic strip arrangement for aisle transfer control.

Reed switches RS-3 through RS-6 and RS-8 through RS-11 are controlled by magnetic strips which are fastened to the bin faces as the transfer cart passes the ends of the aisles between the bins. As shown diagrammatically in FIG. 7, a magnetic strip 830 is used to control reed switches RS-8 and RS-3 and the physical placement of the magnetic strip is shown in FIG. 4 where the strip is fastened to a bracket 831 that is fastened in front of the transfer cart on the outside edge of the bins. In like manner, three other magnetic strips 832, 833 and 834 are spacially displaced from each other to control respectively, reed switches RS-9, and RS-4, RS-10 and RS-5, and RS-11 and RS-6. In other words, one magnetic strip controls the two reed switches adjacent the magnetic strips when they are properly aligned and of course are used to control the destination of the transfer cart.

Figure 6:
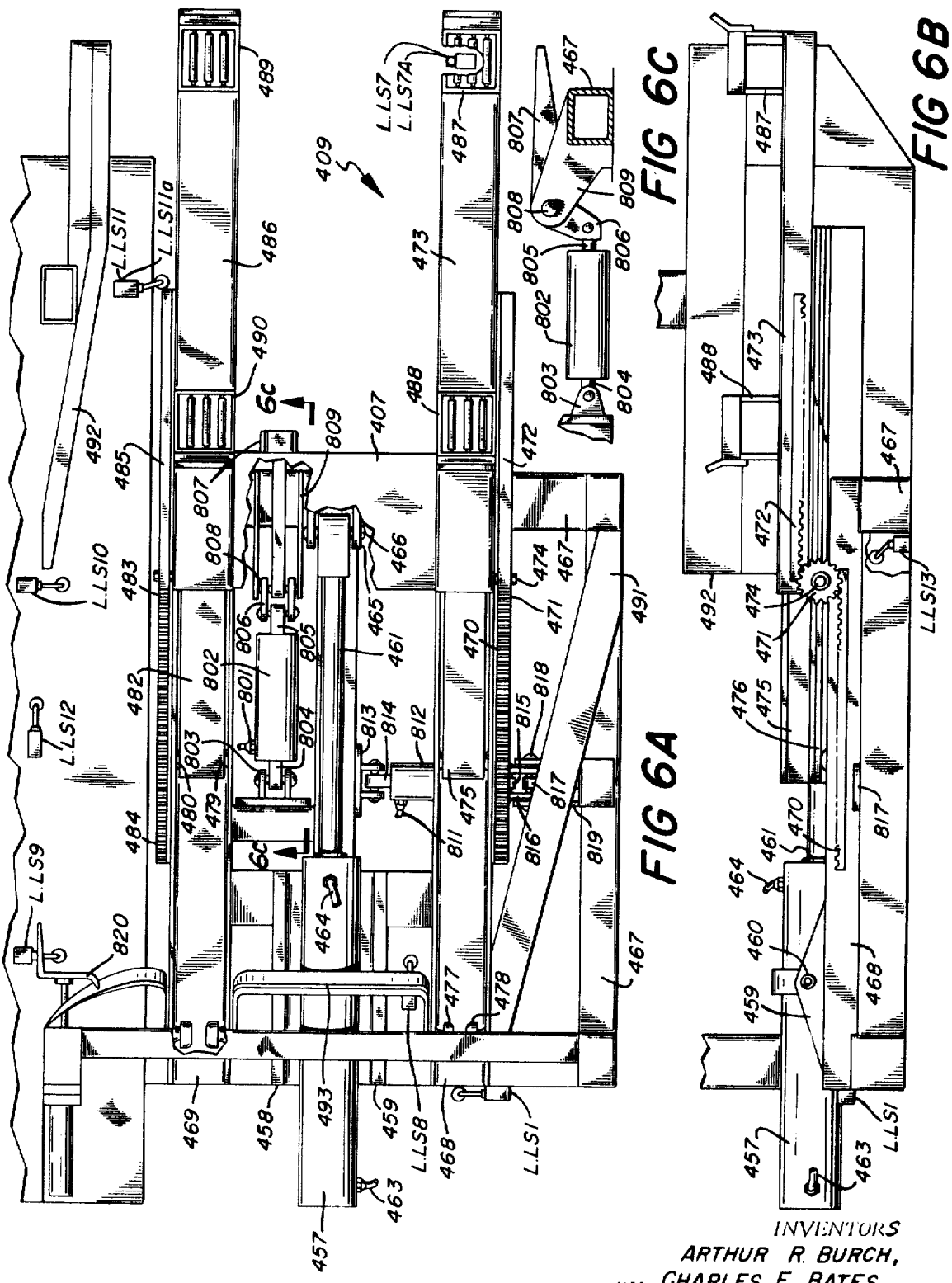
Figure 8C:
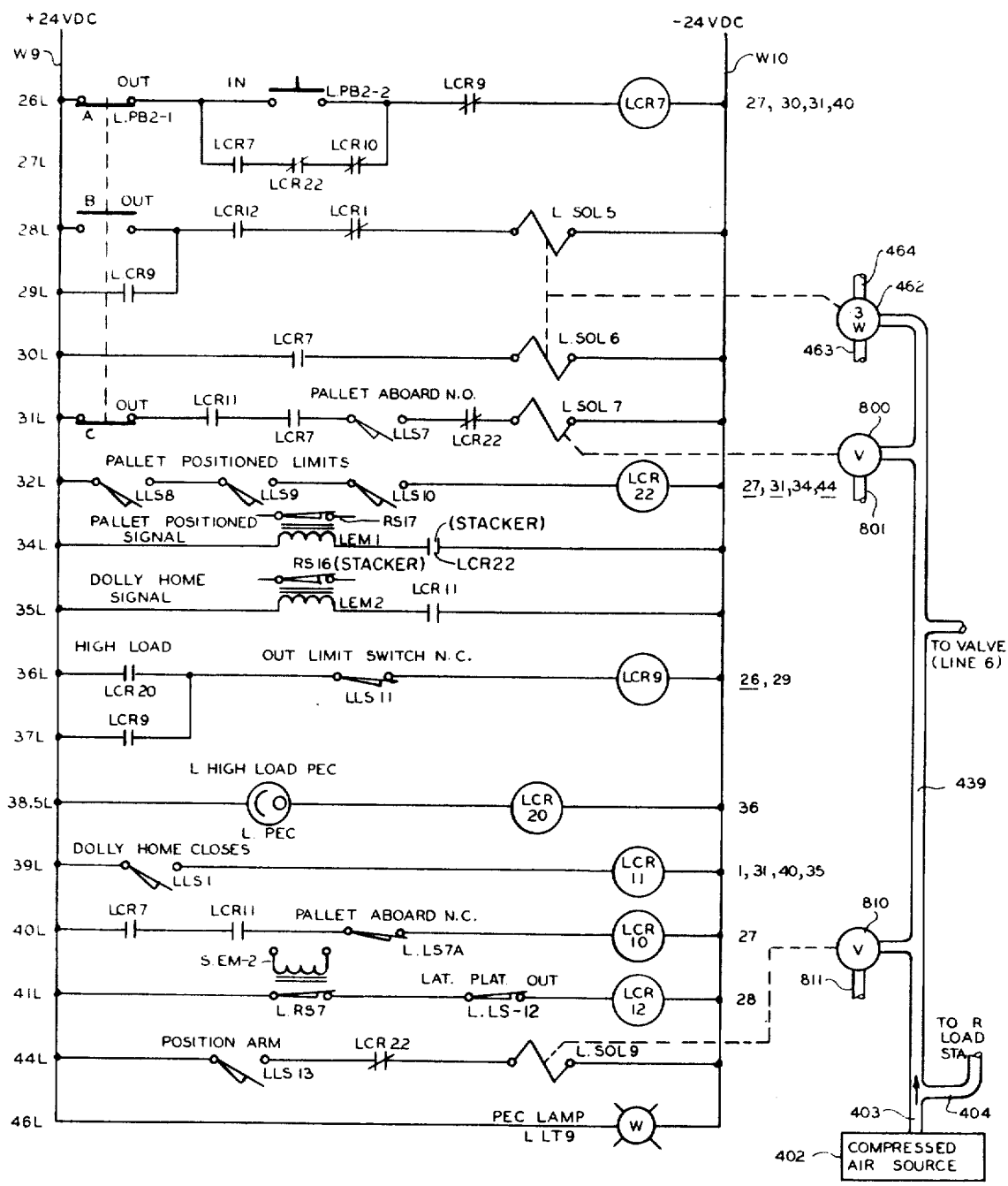
Figure 24A:
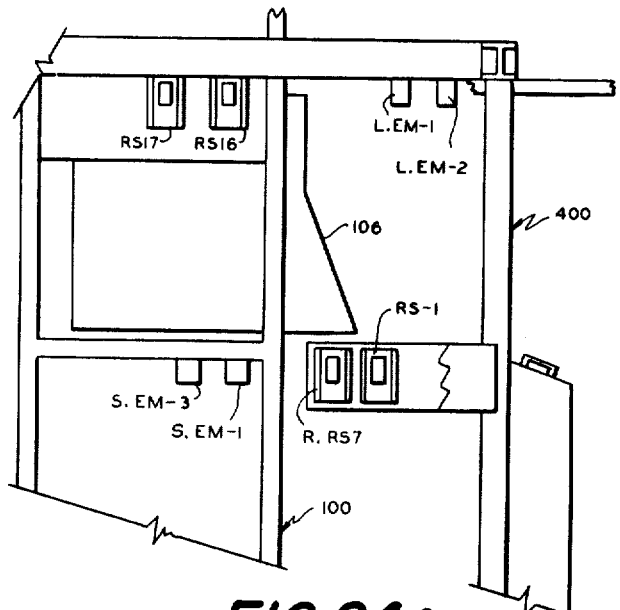
FIG. 24a is a diagrammatical view of the stacker approaching the transfer cart showing the placement of interlock electromagnets and switches as seen from the left pallet dolly position.
Figure 24B:
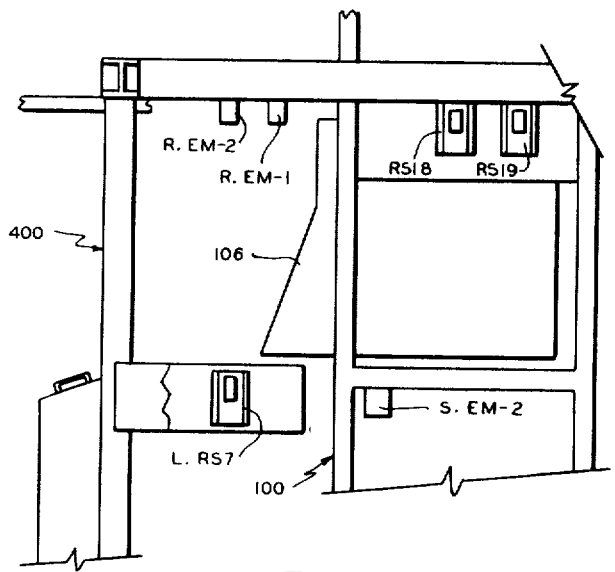
FIG. 24b is a diagrammatical view of the stacker approaching the transfer cart showing the placement of interlock electromagnets and switches as seen from the right pallet dolly position.

FIG. 8c also has all electrical connections made between wires W9 and W10 and all lines referred to are designated by a number and the letter L indicating the logic circuit for the left pallet dolly which is the same as that for the right pallet dolly. Because the electrical circuits are identical, with the exception of different designations for the components thereof, only the left pallet dolly logic circuit in FIG. 8c will be described. On line 26, there is connected in series, a pushbutton switch L.PB2-1 which is normally closed, a normally open pushbutton switch L.PB2-2, a normally closed switch contact L.CR-9 and a control relay L.CR-7. In line 27, there is connected in parallel with switch L.PB2-2, the series connection of normally open relay contacts L.CR-7, and normally closed relay contacts L.CR-22 and L.CR-10, which form a holding circuit. Connected in series in line 28, is a solenoid coil L.SOL-5, normally closed relay contacts L.CR-1 and normally open relay contacts L.CR-12 and normally open switch contacts, section B of switch L.PB2-1. In line 29, a pair of normally open relay contacts L.CR-9 are connected in parallel with switch contacts (section B) of switch L.PB2-1. In line 30, there is connected in series a solenoid coil L.SOL-6 and normally open relay contacts L.CR-7. Solenoid coils L.SOL-5 and L.SOL-6 control the mechanical position of a three-way valve 462 and thus control the direction of movement of the left pallet dolly. In line 31, there is connected in series, a solenoid coil L.SOL-7, normally closed relay contacts L.CR-22, a normally open limit switch L.LS-7, normally open relay contacts L.CR-11 and L.CR-7 and normally closed switch contacts (section C) of switch L.PB2-1. The physical placement of limit switch L.LS-7 in line 31 and L.LS-7A in line 40 is shown in detail in FIG. 6a. Solenoid L.SOL-7 controls position cylinder 802 of FIG. 6a. In line 32, control relay L.CR-22 is connected in series with three limit switches L.LS-8, L.LS-9 and L.LS-10. These switches indicate that the pallet has been positioned and are set at the limits of the pallet position just prior to being picked up by the stacker, the physical placement of the switches being clearly shown in FIG. 6a. In line 34, an electromagnet L.EM-1 is connected in series with normally open relay contacts L.CR-22. Electromagnet L.EM-1 closes a stacker reed switch RS-17 when the pallet is positioned after closing the limit switches in line 32 above. In line 35, an electromagnet L.EM-2 is connected in series with a normally open relay contact L.CR-11. Electromagnet L.EM-2 closes a reed switch RS-16 on the stacker when the pallet dolly is HOME or in the completely retracted position. As will be shown more clearly later, FIGS. 24a and 24b show the relative position of the electromagnets and their corresponding reed switches for controlling the interconnecting logic circuits between the transfer cart and the stacker. In line 36, a control relay L.CR-9 is connected in series with a normally closed limit switch L.LS-11 which is opened when the pallet dolly is fully extended. The location of the switch is shown in FIG. 6a, the circuit being completed by a normally open relay contact L.CR-20. Connected in parallel with contact L.CR-20, is another relay contact L.CR-9 that is normally open, (line 37). In line 38.5, a control relay L.CR-20 is connected in series with a high load photoelectric cell L.PEC. In line 39, a control relay L.CR-11 is connected to a limit switch L.LS-1 indicating the pallet dolly is HOME. Line 40 includes a control relay L.CR-10 connected in series with a normally closed limit switch L.LS-7A (described previously) and a pair of normally open relay contacts L.CR-7 and L.CR-11. Line 41 has a control relay L.CR-12 connected in series with a limit switch L.LS-12 which is tripped by the lateral platform of the stacker (See FIG. 6a for placement), and the circuit is completed by reed switch L.RS-7. Reed switch L.RS-7 is controlled by a stacker electromagnet S.EM-2 which prevents the pallet dollies from moving outwardly if the stacker program calls for a deposit mode with a pick up from the left. Line 44 also contains a solenoid coil L.SOL-9 which is connected in series with normally closed relay contacts L.CR-22 and a normally open limit switch L.LS-13 that is closed by positioning arm 806 (FIG. 6b). Solenoid coil SOL-9 controls a valve 810 to allow compressed air to reach positioning cylinder 812 (FIGS. 5 and 6a) through line 811 connected to valve 810. The circuit is completed by having a lamp L.LT-9 connected in line 46 to provide light for the photoelectric cell in detecting pallet loads which are higher that a predetermined height.

A compressed air source 402 supplies compressed air through a hose 403 which is connected to a pair of pipes 404 and 439 which form a parallel arrangement to drive pallet dollies 406 and 407. Pipe 404 provides compressed air to the right load station. Compressed air is supplied to valves 810, 462 and a valve 800, the latter having line 801 connected thereto for controlling cylinder 802 (FIGS. 5, 6a, and 6b), and three-way valve 462 has air lines 463 and 464 connected thereto for controlling cylinder 457.

TRANSFER CART SERVO AND DRIVING CONTROL CIRCUIT

Figure 9:
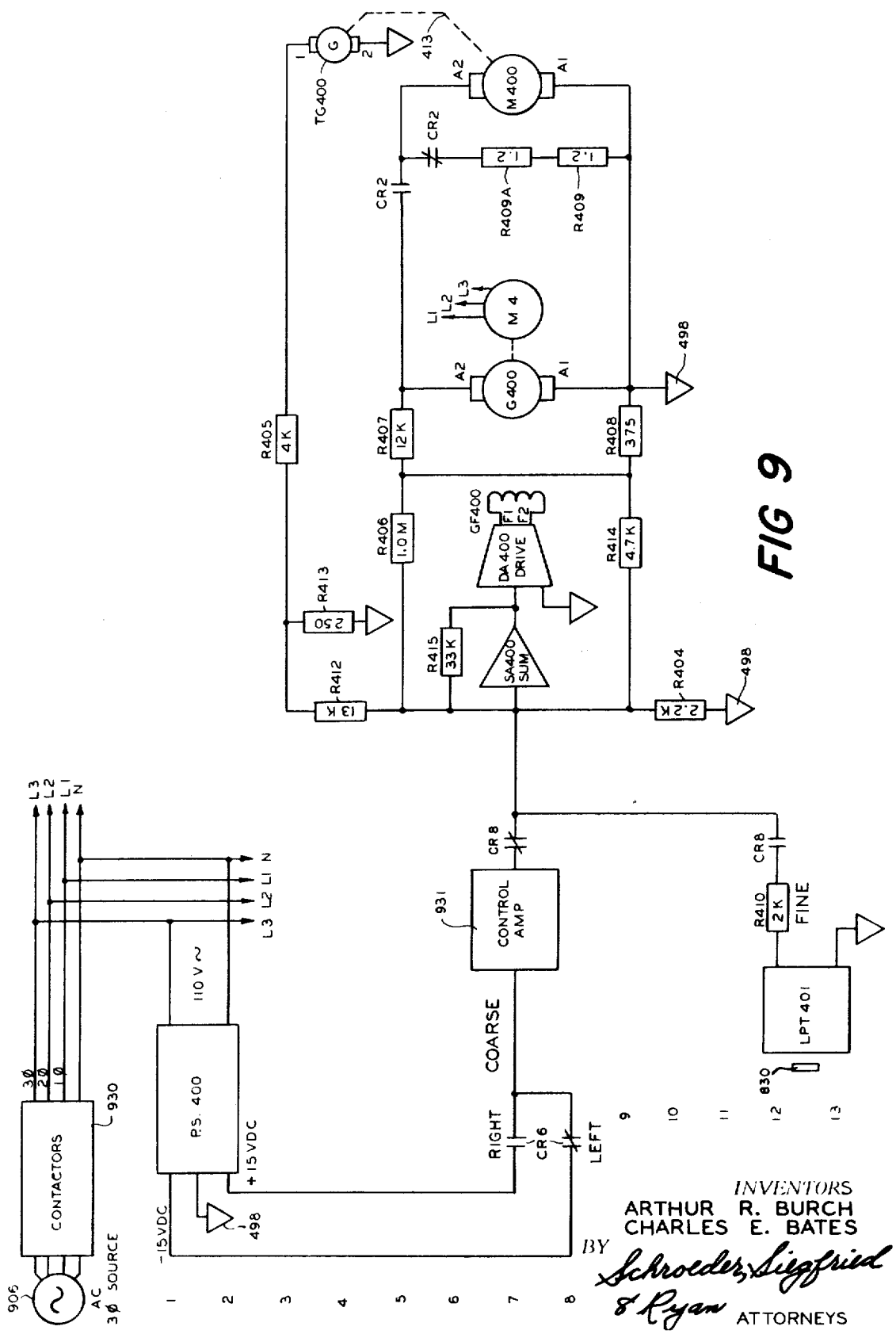
FIG. 9 is a schematic block diagram of the transfer cart electrical servo and driving mechanism.

In FIG. 9 will be found the transfer cart servo drive circuit. The circuit has power applied from three phase source 906 which passes through a set of contactors 930 and lines $L_1$, $L_2$, and $L_3$ are connected to a driving motor M-4. A power supply PS-400 is connected to lines L3 and N and the output is a direct current voltage of −15 volts in line 1 and a +15 volts in line 2, both voltages being with respect to a ground reference 498. Line 2, is connected to a control amplifier 931 through a pair of normally open relay contacts CR-6 (line 7). Connected between the contacts just mentioned and amplifier 931, is a normally closed relay contact CR-6 (line 8) which is connected to line 1 of power supply PS-400. A summing amplifier SA-400 has its input connected to the output of control amplifier 931 through normally closed relay contacts CR-8. The circuit just described is the "Coarse" control circuit and the signals are taken from power supply PS-400 and amplified by control amplifier 931 to provide a controlled voltage for summing amplifier SA-400. Control amplifier 931 is of a common type in which a signal is amplified and may be adjusted so that the magnitude thereof may be changed. The "Fine" control is provided by a transducer LPT-401 which is connected between relay contacts CR-8 and summing amplifier SA-400 in line 7 by a series circuit having a resistor R-410 connected to a normally open relay contact CR-8. Linear position transducer LPT-401 is shown diagrammatically in a typical mode of operation sensing magnetic strip 830. Linear position transducer LPT-401 is of the type that makes use of the "Hall Effect" in detecting magnetic material and a more complete description may be had of this transducer by reference to a copending application entitled "Transducer" filed in the name of William B. Walton, Ser. No. 514,556, filed on Dec. 17, 1965, and assigned to the same assignee.

The output of summing amplifier SA-400 is connected to a driving amplifier DA-400 which controls the excitation to a generator field GF-400 of a generator G-400. Armature terminal A-1 of generator G-400 is connected to ground and a voltage divider is formed between armature terminals A-1 and A-2 by a pair of resistors R-408 and R-407 connected in series. Connected to the junction of resistors R-407 and R-408 are a pair of circuits, the first of which is connected to the input of summing amplifier SA-400 through a resistor R-406 and the second of which is connected to the input of summing amplifier SA-400 through a resistor R-414. Connected to the input of summing amplifier SA-400 and ground, is a resistor R-404. A feedback circuit is also connected from the output to the input of summing amplifier SA-400 through a resistor R-415 in line 6. A tachometer generator TG-400 has one of its terminals connected to ground and the other terminal is connected to the input of summing amplifier SA-400 through a circuit formed from a pair of resistors R-405 and R-412 connected to each other in series on line 3 with another resistor R-413 connected to ground at the junction of the two resistors just mentioned. This circuit forms a speed feedback circuit to provide a positive control for generator G-400 in driving a motor M-400 that is coupled to tachometer generator TG-400 in driving relationship by belt 413 as previously described. The circuit is completed by connecting one of the armature terminals of motor M-400 A-1 to ground and having a series circuit connected to the other armature A-2 formed of a resistor R-409, another resistor R-409A and a pair of normally closed relay contacts CR-2. Connected between armature A-2 of generator G-400 and armature A-2 of motor M-400, is a normally open relay contact CR-2.

A thorough explanation of the operation of the logic circuits using the chart just described is to be found later herein under a section entitled TRANSFER CART OPERATION.

THE STACKER

Figure 10:
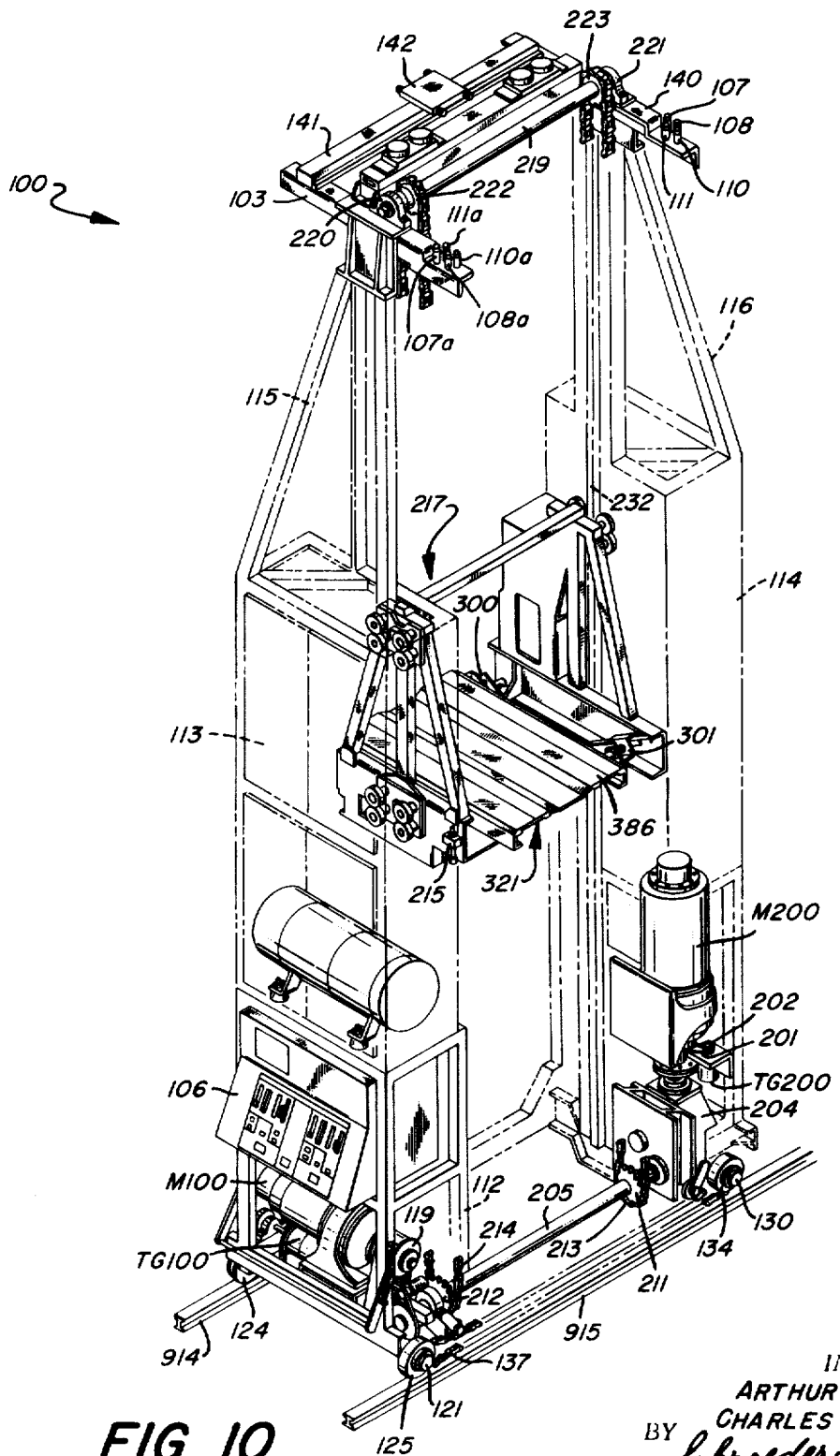
FIG. 10 is a partial isometric view of the stacker in an aisle.
Figures 14, 14A:
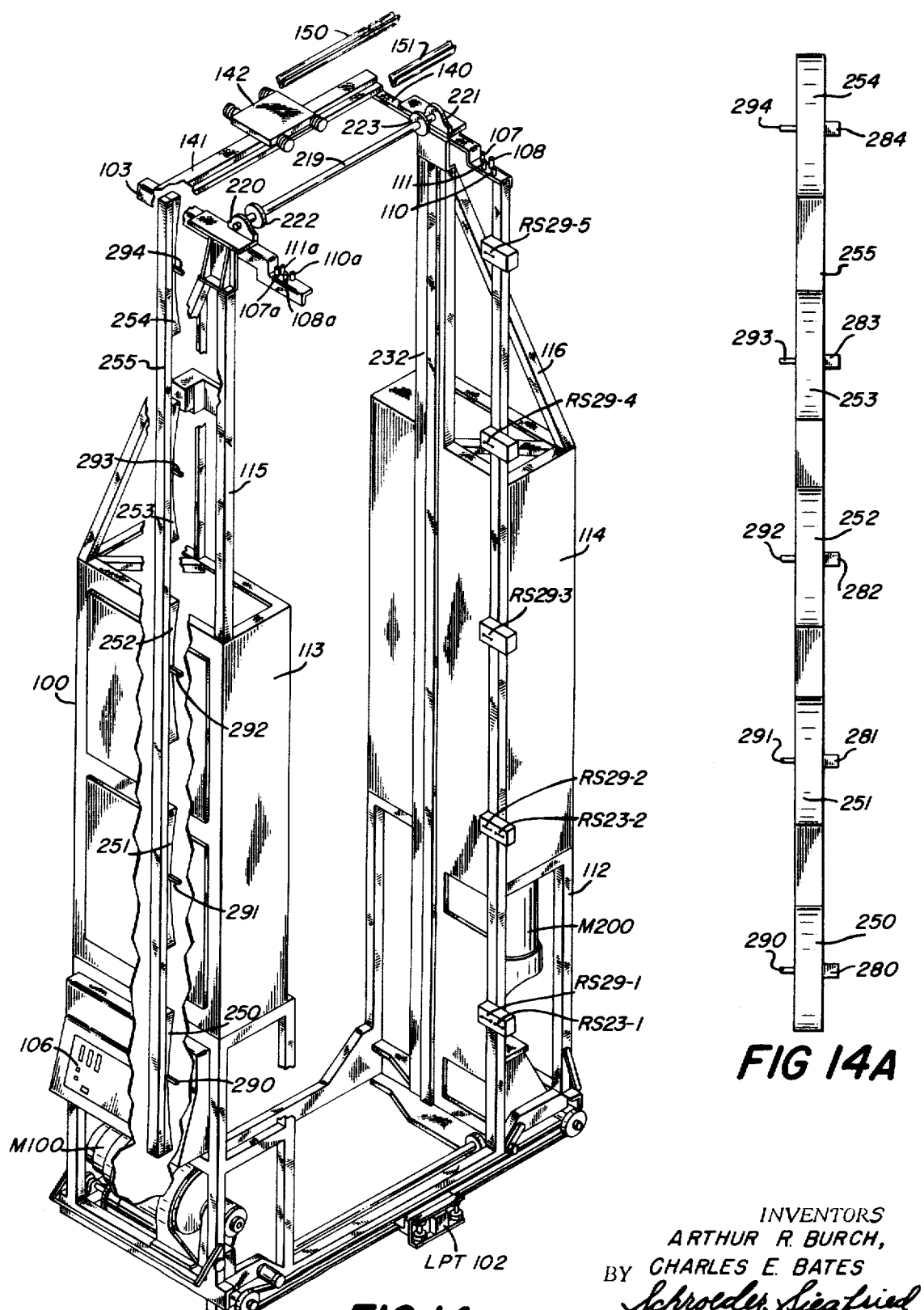
FIG. 14 is an isometric view of the stacker with the elevator removed having portions broken away to show the placement of its control switches and transducers.
FIG. 14a is a front elevational view of the stacker mast having the magnetic control elements secured thereto.

The stacker 100 is shown in FIGS. 10 and 14 in more detail than previously described. To make identification of the parts easier, the stacker 100 will be divided into a lower U-shaped section 112 with an intermediate rear section 113 lying immediately above a control panel 106 and another cabinet portion 114 lying above section 112, at the front (looking down the aisle) and a rear upper section 115 and a front upper section 116.

The lower U-shaped section contains the driving mechanisms, as shown diagrammatically in FIG. 11. For purposes of clarity, reference to the stacker will include references to a forward and rearward section wherein the rearward section is the one closest to the operator and the forward section is the one most forward or furtherest from the operator when looking down the aisles, from the transfer cart position. A longitudinal drive motor M-100 is secured to the rearward and lowermost section of structural member 112. The output of motor M-100 is transferred to a timing belt 118 through a pulley 119 connected to the motor shaft. Timing belt 118 engages another pulley 120 which is secured to a shaft 121 journaled in a pair of bearings (not shown). A flanged driving wheel 124 is connected to shaft 121 on the left side and engages rail 914 while on the right-hand side, a wheel 125 engages rail 915. A tachometer generator TG-100 is secured to the structural mechanism 112 under motor M-100 and is connected to motor M-100 through a pulley 126 on the end of the motor shaft and another pulley 127 on the tachometer generator shaft through a belt 128.

On the forward end of structural member 112, is a shaft 130 journaled in a pair of bearings (not shown). Shaft 130 is connected to a flanged driving wheel 133 on the left side and to another wheel 134 on the right side. Flanged wheel 133 engages rail 914 and wheel 134 engages rail 915. Shaft 130 is drivingly connected to shaft 121 through a pair of sprockets (not shown), having a driving chain 137 engaging the sprockets.

Figure 13:
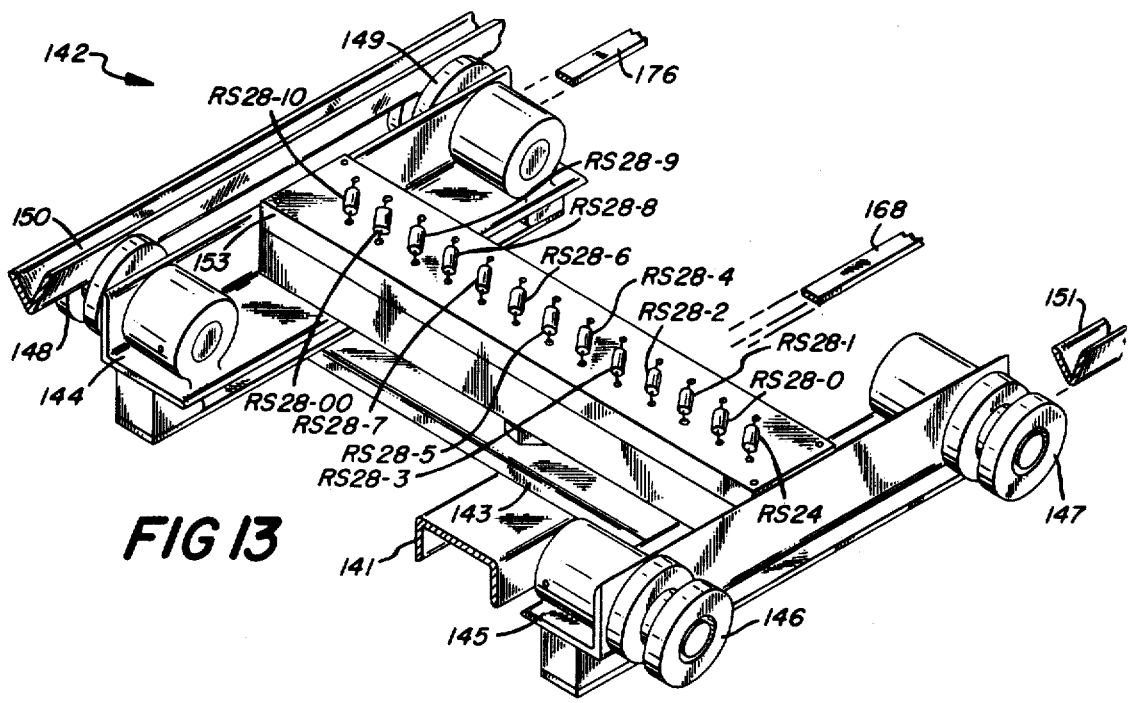
FIG. 13 is an isometric view of the reed switch array for longitudinal destination control of the stacker.

Situated at the top of the stacker (See FIGS. 10 and 14), is a crossbar 140 which is connected to the forward upper structural section 116 of the stacker. A channel member 141 is secured to another cross member 103 and to member 140 to provide a mounting member for a longitudinal reed switch assembly 142 (also see FIG. 13). Reed switch assembly 142 comprises a cross member 143 which is bolted to channel 141 and has a pair of channel members 144 and 145 secured thereto which are parallel to channel 141, that is, they extend longitudinally with respect to the stacker. Channel 145 carries a pair of wheels 146 and 147 having a V-shaped groove formed therein and which are rotatably secured to channel member 145, the wheels being mounted on the outside edges of the channel member 145. Secured to the outside portion of channel member 144, are another pair of wheels 148 and 149, each having a V-shaped groove formed therein which are mounted in the same manner as wheels 146 and 147 just described. A pair of V-shaped rails 150 and 151 form a guide for reed switch assembly 142 so that the reed switch assembly is properly aligned as it is moved longitudinally down the aisle by stacker 100. Secured between channel members 144 and 145, is an insulated member 153 carried above crossbar 143 to which is secured the longitudinal reed switches. The reed switches described herein are of the type having normally open contacts and when brought into a magnetic field, the contacts close. Upon reaching a predetermined distance between the switches and magnetic elements the spring tension in the switches overcomes the magnetic field and the switches open. As seen in FIG. 13, and starting on the right-hand side, there are secured thereto 13 reed switches laterally spaced from each other and identified as reed switches RS-24, RS28-0, RS28-1, RS28-2, RS28-3, RS28-4, RS28-5, RS28-6, RS28-7, RS28-8, RS28-9, RS28-00, and RS28-10.

Figure 12:
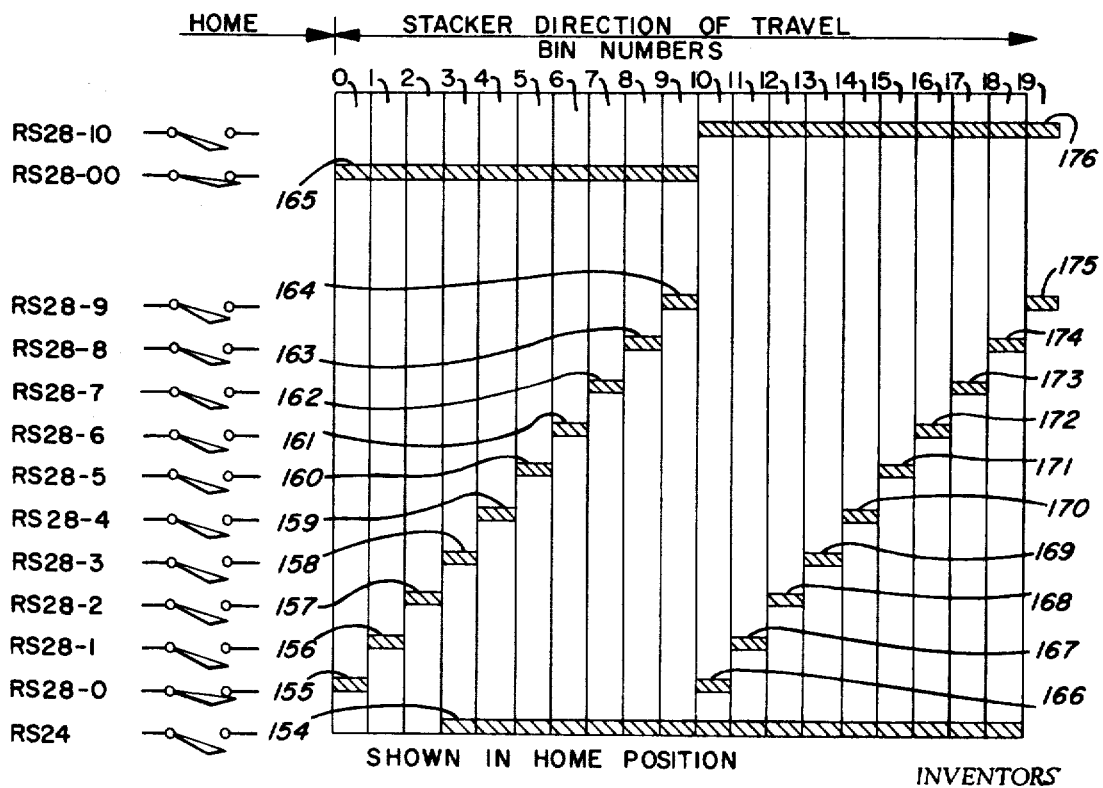
FIG. 12 is a schematic diagram of the stacker longitudinal destination reed switch and magnetic strip arrangement.

The switches just described are shown schematically in FIG. 12 where their accompanying magnetic actuation elements or magnetic strips are shown, the magnetic strips being of the same type as described previously for cooperation with the transfer cart reed switches. The bin number designations are shown in FIG. 12 with the appropriate magnetic element associated therewith which designates a particular bin number and controls a particular reed switch associated with that bin number. A magnetic strip 154 extends the length of bins numbered 3 through 19 and is used to actuate reed switch RS-24.

A more detailed explanation of this switch will be given later but it is used in a safety circuit for the longitudinal drive mechanism. Another magnetic strip 155 extends across the top of the transfer cart to designate the HOME station or zero bin position. Nine magnetic strips identifying bins 1 through 9 are secured overhead in the aisles and are identified as magnetic strips 156 through 164 respectively. Magnetic strips 156 through 164 actuate reed switches RS28-1 through RS28-9 respectively and each is as long as the bin is wide. To remove ambiguity in the switching circuits, another strip 165 extends between bins 1 through 9 and a portion extends overhead in the transfer cart to actuate reed switch RS28-00, and when used with the "units" switches, identifies longitudinal stations 0 through 9. As shown in FIG. 12, reed switches RS28-00 and RS28-0 are closed thus indicating that the stacker is in the HOME position, that is, on the transfer cart. Ten other magnetic strips 166 through 175 identify bins 10 through 19 respectively and cause switches RS28-0 through RS28-9 to be closed when the reed switches pass adjacent to the magnetic strips. In order to prevent ambiguity with bins 0 through 9, another magnetic strip 176 lies in front of bins 10 through 19 and actuates reed switch RS28-10 to indicate that the bins being detected are "tens" numbers 10 through 19 rather than 0 through 9.

Upon the reed switches detecting one of the magnetic strips, the longitudinal control of the stacker is changed from a coarse mode of operation to a fine mode of operation and upon doing so, the sensing device is also changed. A transducer similar to LPT-401, described previously, is found on the right side of the stacker as the operator views control panel 106 and is designated LPT-102. A magnetic strip 177 (FIG. 4) is shown secured to the right side of the transfer cart central section 431 and with its concave shape extending longitudinally down the aisle, the null occurs in the center thereof and will be sensed by transducer LPT-102. It will of course be understood that there is such a magnetic strip for which transducer LPT-102 may sense a null at each bin column. Upon sensing the null, a reed switch RS-101 will be disposed opposite a small permanent magnet (similar to that shown in FIG. 4, and designated 179) and will be closed by the magnetic field thereof. Reed switch RS-101 is connected to wire 183 and to a null detector CRSN-101 which is also connected to ground.

Returning again to FIGS. 10 and 11, there is found the vertical drive mechanism in which there is located vertical drive motor M-200 in the forward uppermost portion of the structural section 112, the motor being secured to the frame. Motor M-200 is coupled through its shaft to a pulley 200 which drives a tachometer generator TG-200 through a belt 201 and pulley 202 connected to the tachometer generator shaft. The shaft of vertical drive motor M-200 is connected to a right angled gear box 204 which has a shaft 205 connected thereto which is journaled in a pair of bearings (not shown).

Secured to shaft 205, is a pair of sprockets 211 and 212 over which pass a pair of chains 213 and 214 respectively. Chain 214 is fastened to a lug 215 on the rearward side of an elevator 217, by suitable means such as a nut and bolt. The most centrally located portion of chain 214 then passes upwardly from under sprocket 212 where it extends to the uppermost portion of the stacker. At the top of the stacker, shaft 219 is journaled in a pair of bearings 220 and 221 that are secured to cross members 103 and 140 respectively. Secured on shaft 219, adjacent cross member 103, is a sprocket 222, and another sprocket 223 is secured to shaft 219 adjacent cross member 140. Chain 214 is passed over the top of sprocket 222 and downwardly along the center line of the stacker and is connected to another lug 224 secured to the rearward side of elevator 217 by suitable means such as a nut and bolt. In a similar manner, chain 213 is secured to the forward portion of elevator 217 in the manner of securing lug 215 to the rearward side. Chain 213 is passed over the top of sprocket 223 and downwardly along the center line of the stacker and is connected to another lug 229 secured to an upper front plate of elevator 217, by suitable means such as a nut and bolt.

Figure 15:
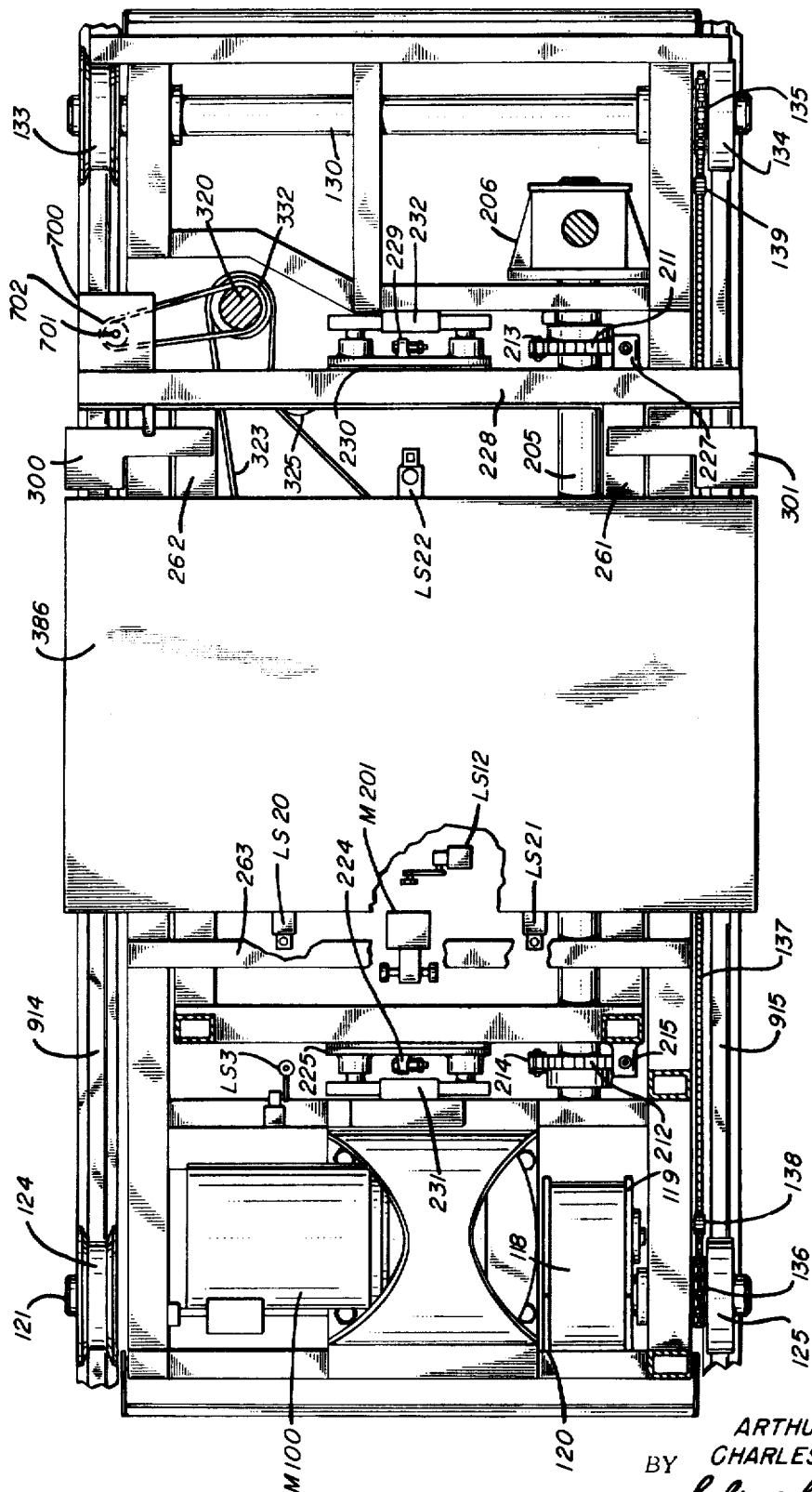
FIG. 15 is a sectional plan view of the stacker taken immediately above the longitudinal drive motor with the elevator down.

A pair of steel rails 231 and 232 (FIG. 15) are secured vertically by suitable means such as welding or bolts to the rearward and forward sections respectively of the frame members. Channels 231 and 232 are aligned vertically along a longitudinal center line of the stacker and extend from the bottom of the stacker to the top.

Figure 16:
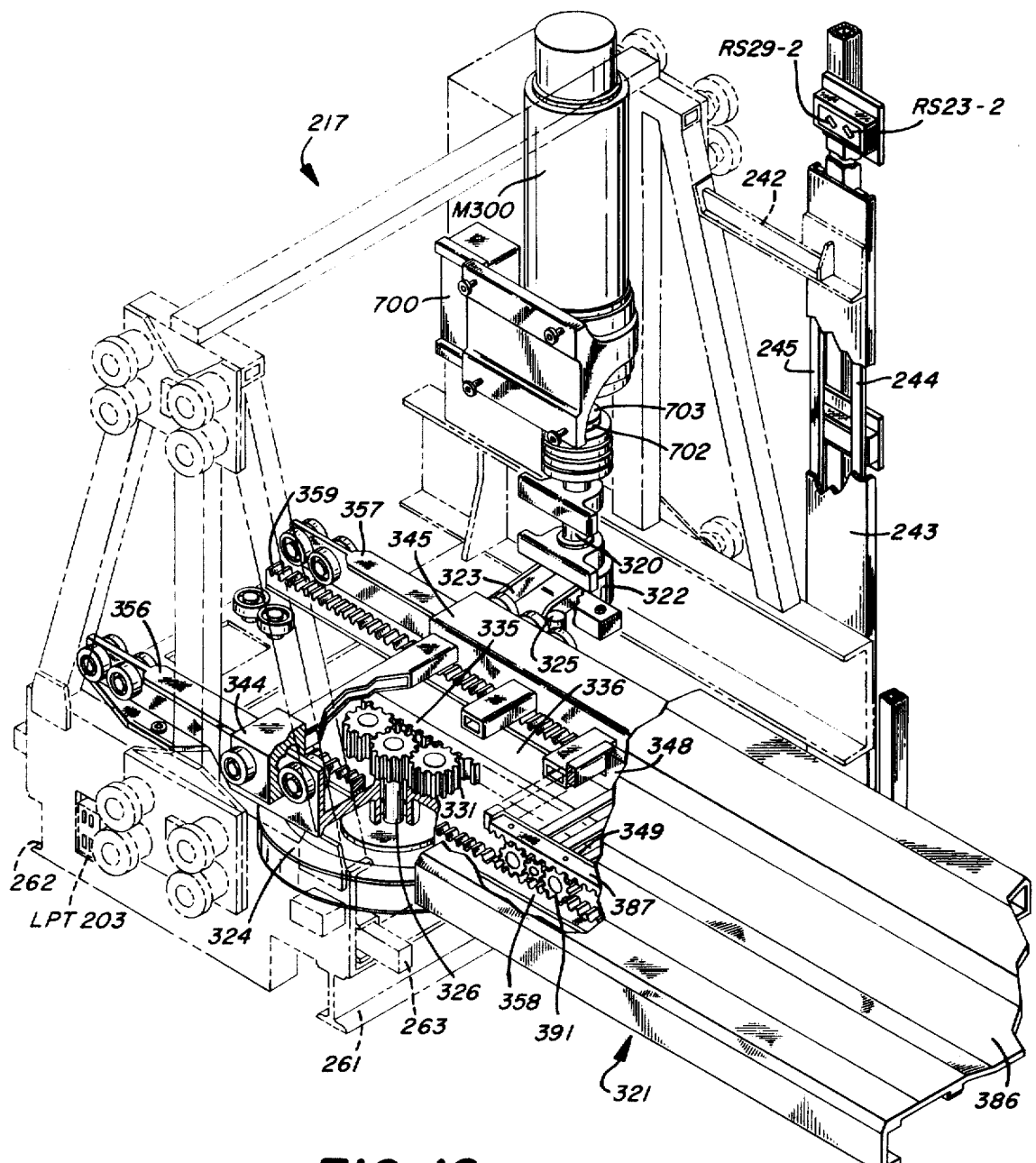
FIG. 16 is an isometric view of the elevator platform showing the lateral drive mechanism.

To keep the elevator 217 properly aligned while moving vertically, rollers are rotatably secured to the front and rearward side of the elevator 217 to engage channels 232 and 231 respectively (FIG. 16).

Figure 23:
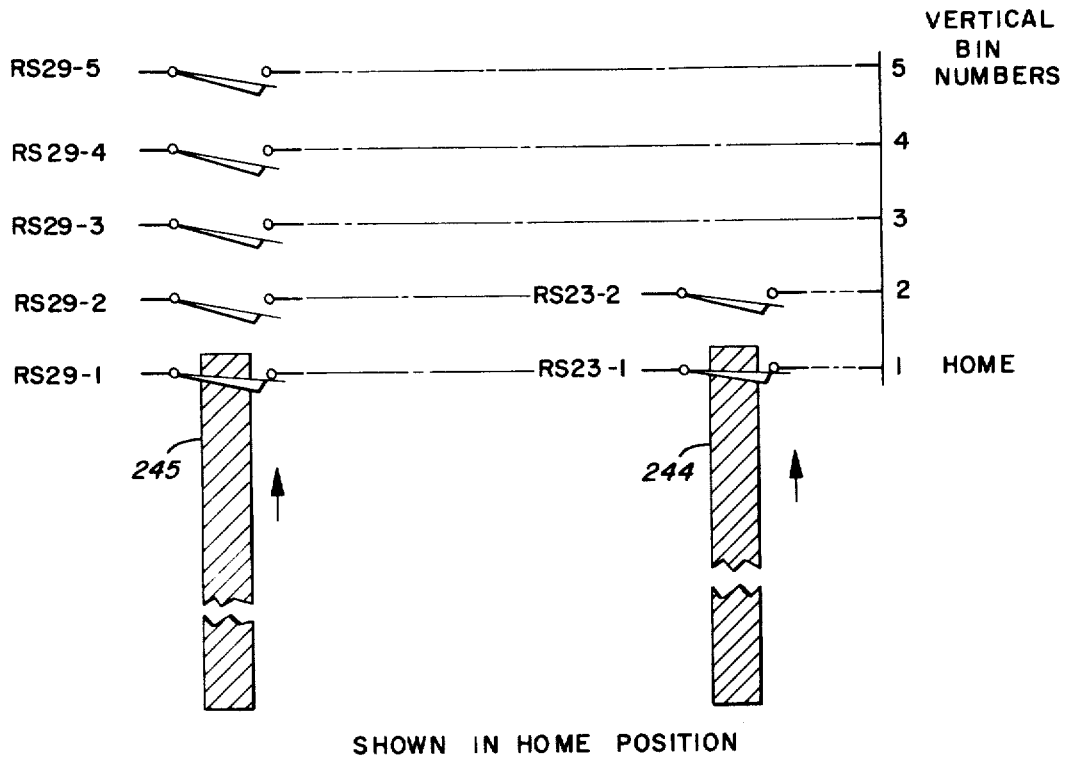
FIG. 23 is a schematic diagram of the stacker reed switch and magnetic strip arrangement for vertical control.

Securing vertical channel like member 243 which has secured therein two magnetic strips 244 and 245 to the forward side of elevator 217, is a bracket 242 above channel 228. This arrangement is shown diagrammatically in FIG. 23 also. Magnetic strip 244 cooperates with a pair of reed switches RS23-1 and RS23-2 located in a position to provide a means of indicating that the elevator is vertically aligned with rows or bins at levels No. 1 and No. 2 respectively and provide a safety feature explained more fully later. Magnetic strip 245 cooperates with five reed switches RS29-1 through RS29-5, for indicating that the elevator is opposite bin levels No. 1 through No. 5.

Once one of the vertical reed switches RS29-1 through RS29-5 is closed, as will be seen later in the description of the control circuits, the control of the elevator is changed to a "Fine" mode of operation. The fine mode of operation is accomplished by using a linear position transducer LPT-203 (FIG. 16) which is similar to the linear position transducer described previously and works in communication with five magnetic strips 250, 251, 252, 253 and 254 aligned vertically one above the other, which are shown diagrammatically in FIGS. 14 and 14a to indicate the different bin levels which correspond respectively with bins 1 through 5. The magnetic elements are secured to a vertical mast 255 on the stacker. Five permanent magnets PM-280 through PM-284 are used with the magnetic strips in the "Fine" mode of operation and are secured to mast 255 adjacent the vertical midpoint of the magnetic strips.

Once vertical and longitudinal linear position transducers LPT-203 and LPT-102 reach a null, the control of elevator 217 is shifted to a "Superfine" mode of operation, where another five permanent magnets PM-290 through PM-294 are used with the magnetic strips. Permanent magnets PM-290 through PM-294 are secured to mast 255 adjacent the vertical midpoint of the magnetic strips and on the opposite side from permanent magnets PM-280 through PM-284. It should also be observed that permanent magnets PM-290—294 are of smaller dimension than PM-280—284. Their operation will be more completely described later.

Secured to the lower right side of elevator 217 (FIGS. 16 and 18) is an I-beam 261 and secured to the lower left side of elevator 217 is another I-beam 262. Situated above the two I-beams 261 and 262, is a transducer shifter bar 263. Secured to transducer shifter bar 263, is a bracket 264 which holds in place a linear position transducer LPT-203 that projects through an opening in the rearward side of elevator 217. Transducer shifter bar 263 is secured to I-beams 261 and 262 by a pair of C-shaped brackets 265 and 266 which have a pair of vertically oriented pins 267 and 268 passing through a pair of holes 269 and 270 that are formed in transducer shifter member 263. A bottom panel member 271 is secured between I-beams 261 and 262 and the edge of the elevator side to form a "floor" beneath the transducer shifter bar 263. Secured to bottom panel member 271 is a transducer shifter bar motor M-201 which has a pair of gears 272 and 273 secured to an output shaft which extends to the left and right. A pair of racks 274 and 275 engage gears 272 and 273 respectively. Racks 274 and 275 are secured to transducer shifter bar 263 by suitable means such as welding. Thus, it will be seen that upon rotation of gears 272 and 273, transducer shifter bar 263 and the transducers secured thereto will be moved in a vertical direction depending upon the direction of rotation of gears 272 and 273. A limit switch LS-20 is positioned below transducer shifter bar 263 and comprises two sections forming limit switches LS20-1 and LS20-2 where limit switch LS20-1 is normally closed and limit switch LS20-2 is normally open. When the transducer shifter bar moves downwardly, limit switch LS20-1 is opened and limit switch LS20-2 is closed. Another limit switch LS-21 has two sections, LS21-1 which is normally closed and LS21-2 which is normally opened. A bracket 278 is secured to transducer shifter bar 263 and extends downwardly with a right angle end which engages limit switch LS-21 when the transducer shifter bar 263 is moved upwardly. The two limit switches, LS-20 and LS-21 form the lower and the upper limit switches which limit the travel of the transducer shifter bar 263. As will be seen later, the transducer shifter bar is moved vertically a sufficient amount to allow a pallet to be deposited in a bin, or withdrawn from a bin, by causing elevator drive motor M-200 to move the elevator the same distance the vertical transducer shifter bar moves, but in the opposite direction.

Once the elevator is raised to the proper bin height to deposit the pallet or is at the HOME station ready to deposit a pallet on one of the load stations on the transfer cart, it is desirable for obvious reasons, to probe or somehow make certain that the bin is unobstructed before attempting to deposit the load. A pair of obstruction sensing devices 300 and 301 (FIGS. 10, 15, 19 and 20) are provided and may be referred to as a left and right bin flipper respectively. Since bin flipper 301 is similar to bin flipper 300, with the exception of reversing the arrangement of the parts, it will not be necessary to describe the obstruction sensor 301 but only that of the left-hand side will be explained. Reference is made to the left sensing unit 300 in FIGS. 19 and 20 where a bracket 302 is secured to I-beam 262 by suitable means such as bolts. The principle driving element of sensor 300 is a solenoid SOL-1 and the principle driving element of sensor 301 is a solenoid SOL-2. Bracket 305 has another portion formed therewith which has a depending part that secures a sleeve 306 in alignment with a plunger 307 of solenoid SOL-1. Secured to the end of plunger 307, is a rack 308 that engages a pinion gear 309. As plunger 307 and rack 308 move outwardly away from solenoid SOL-1, pinion gear 309 is rotated which in turn drives a secondary gear 310 and a channel like arm 312 which is of U-shaped cross section, both being secured to the shaft 311. Secured at one end and lying longitudinally within arm 312, is a leaf spring 313 which is held a fixed distance away from the base of member 312 by a spring 314 that is held in place by a pin 315 passing through the base of the U-shaped member 312 and leaf spring 313. As plunger 307 moves outwardly and causes arm 312 and leaf spring 313 to move counterclockwise about shaft 311, it will rotate through a 90° arc unless leaf spring 313 strikes a pallet or obstruction such as shown in FIG. 19. Where an obstruction is encountered, leaf spring 313 depresses a switch arm of a switch SOL1-S2 indicating the bin is obstructed in some manner. If the bin is not obstructed, arm 312 and leaf spring 313 continue to rotate until the lower portion of member 312 engages a second switch SOL1-S1 indicating that the bin is empty. Once the solenoid SOL-1 is deenergized, a spring 316 bears against a washer 317 which is secured to shaft 307 and presses against another washer or bracket hub 318 on the side of bracket member 305. In other words, spring 316 is compressed when plunger 307 is moved outwardly and upon the solenoid coil being deenergized, the spring tension moves arm 312 and spring leaf 313 back to the position as shown in FIG. 20. As mentioned previously, the right bin flipper 301 operates in identically the same manner as that for left flipper 300 and in place of switch SOL1-S2, flipper 301 has a switch SOL2-S2. In place of switch SOL1-S1, the right bin flipper has a switch SOL2-S1. The switches just described are found in the electrical circuit which will be described in more detail later.

LATERAL PLATFORM MECHANISM

Figure 17:
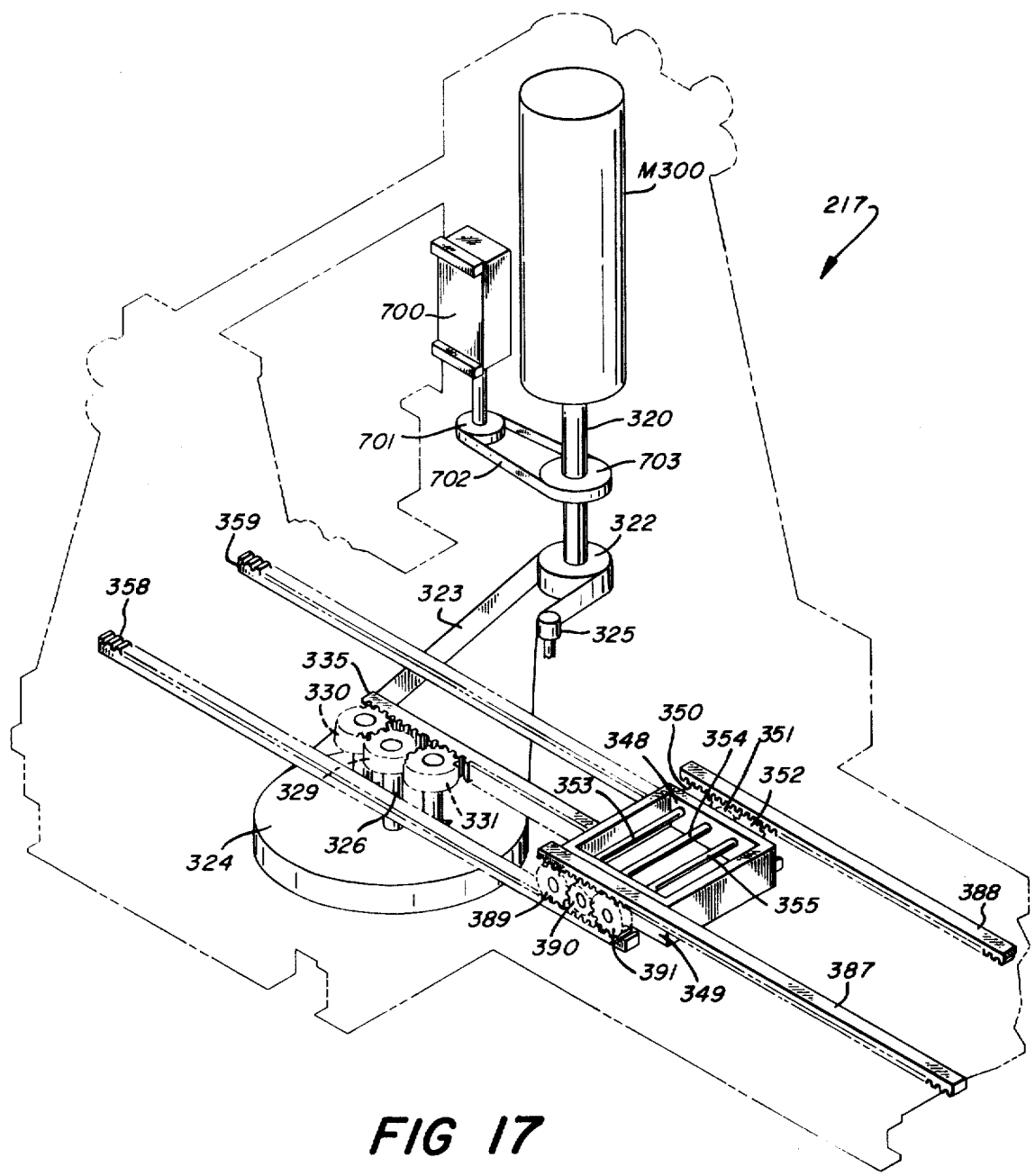
FIG. 17 is a diagrammatic view of the lateral platform driving mechanism.

Referring to FIGS. 10, 16, and 17, a motor M-300 having a shaft 320 provides the driving power for a lateral platform 321. Secured to shaft 320 is a pulley 322 that has a timing belt 323 engaged therewith that engages a driving pulley 324 and an idler pulley 325 keeps belt 323 under the proper tension. Rotating pulley 324 causes a shaft 326 secured thereto and journaled in a pair of bearings, to rotate a pinion gear 329. Pinion gear 329 engages a pair of driving gears 330 and 331. As gears 330 and 331 are rotated, they engage a rack 335 which is secured to an inverted U-shaped channel member 336 which guides rack 335 so that it moves laterally without binding. A pair of inverted U-shaped heavy duty channel members 344 and 345 have secured thereto a plurality of laterally extending cross members. A pair of bearing blocks 348 and 349 are secured to a pair of the cross members. Bearing block 348 has three gears 350, 351, and 352 secured to three shafts 353, 354, and 355 respectively. Gears 352 and 350 are larger than gear 351 communicating therebetween to ensure that both gears rotate at the same speed and to help prevent binding. In a similar manner, there are three gears 389, 390 and 391 on the left side of the platform which are secured to shafts 353, 354, and 355 and journaled in bearing block 349. Secured to the bottom of elevator 217 are a pair of I-beams 356 and 357 which are located on the left and right sides respectively. Also secured to the bottom of elevator 217 is a pair of racks 358 and 359 which extend parallel and adjacent to I-beams 356 and 357 respectively. Rack 359 engages pinion gears 350 and 352 and on the left side, rack 358 engages pinion gears 389 and 391. Secured to I-beam 357, are a plurality of rollers rotatably secured on both sides of I-beam 357 where the upper flanged portion is cut away. I-beam 356 has a plurality of rollers secured thereto in the same manner just described for I-beam 357. Attached to the outside of channel member 345, are another plurality of rollers. In a similar manner, a plurality of rollers are located on the outside of channel 344 in the same manner as for channel 345. Secured to the top of channels 385 and 384, is a metal plate 386 which forms the load platform. Secured to platform 386 are a pair of racks 387 and 388 which engage pinion gears 389 and 391, and 350 and 352 respectively. It will be noted that channels 344 and 345 are not in communication or secured to plate 386 but are allowed to move freely with respect to platform 386. Therefore, as rack 335 is driven outwardly, channel member 336 is moved with the rack and causes the frame formed of the cross members which are connected to channel 344 and 345 to also move outwardly. Since rack 359 is secured to the bottom of the elevator, as bearing members 348 and 349 move outwardly, pinion gears 350, 352, 389, and 391 engage racks 359 and 358, thus transferring the translational and rotational motion to racks 388 and 387 thus causing platform 386 which is carried therewith, to move twice the distance of the movement of members 345 and 344. By reversing the direction of rotation of shaft 326, the platform may be moved in the opposite direction.

A later drive transducer 700 (FIGS. 15, 16 and 17) is connected to shaft 320 by a pulley 701 engaging a belt 702 that engages another pulley 703 secured to lateral motor drive shaft 320. A more detailed description of the transducer will be given when the servo circuit is described.

A limit switch LS-12 (FIG. 15) is located under the center portion of platform 386 and is actuated when lateral platform 386 is fully extended in either direction. Limit switch LS-12 has three sections, LS12-1 and LS12-3 being normally open with LS12-2 being normally closed. Another limit switch LS-22 is located near the center of platform 386 and the switch is normally open except when the platform is centered on the elevator.

Additionally, there are seven reed switches which are interconnected between the transfer cart 400 and stacker 100 to provide the proper electrical interlocks between the two pieces of equipment. In FIGS. 24a and 24b, there are shown two reed switches RS-17 and RS-16 which are located on the upper left side of stacker 100 and on transfer cart 400, there are located two electromagnets L.EM-1, L.EM-2 on the upper left side which energize respectively the two reed switches. Reed switch RS-17 is controlled by electromagnet L.EM-1 where the reed switch is normally open and is operated when a pallet on the left pallet dolly is in the proper position to be picked up by the stacker. At all other times, the electromagnet is deenergized and the switch remains open. Reed switch RS-16 is closed by electromagnet L.EM-2 and is a normally open reed switch which is actuated to a closed position by a magnetic field from the electromagnet indicating that the left pallet dolly is in the HOME position. In a similar manner, a pair of reed switches RS-18 and RS-19 are located on the upper right side of stacker 100 and the controlling electromagnets R.EM-2 and R.EM-1 are located in an opposed position on transfer cart 400. Reed switch RS-19 is closed by electromagnet R.EM-1 and is operated in the same manner as reed switch RS-17 with the exception being that it pertains to the right pallet dolly rather than the left pallet dolly. Reed switch RS-18 which is closed by electromagnet R.EM-2 is a reed switch operated by the right electromagnet when the right pallet dolly is in the HOME position and this switch is similar to reed switch RS-16. Additionally, there are three reed switches located on the transfer cart where a reed switch R.RS-7 is located on the central right side thereof along with another reed switch RS-1. On the left central part of the transfer cart, is another reed switch L.RS-7. These last three mentioned reed switches are controlled by electromagnets in the stacker logic circuit and reed switch R.RS-7 is controlled by an electromagnet S.EM-3 and reed switch RS-1 is controlled by an electromagnet S.EM-1, both of which are on the right central part of stacker 100. On the left central part of stacker 100, is another electromagnet S.EM-2 which is used to control reed switch L.RS-7. Reed switches L.RS-7 and R.RS-7 must be closed to allow the left and right pallet dollies to move outwardly and this can only be accomplished in the automatic mode of operation at any time, except when the stacker platform is to be extended. Reed switch RS-1 must be closed in order to allow the transfer cart to assume a standby condition and this can only occur when the stacker is in the HOME position on the transfer cart.

STACKER LOGIC CIRCUIT

The stacker logic circuit is shown in FIGS. 21a through 21h. As described previously, the numbers on the left-hand side of the circuit designate the line between the conductors on the left and right side of the circuit and the numbers on the right side of the circuit designate the lines in which a particular relay has contacts, those numbers being underlined indicating that the contacts are normally closed whereas the other numbers indicate the relay contacts are normally opened. In line 5, a transformer T-101 has power applied to its input and produces a 115-volt output voltage which has one lead connected to wire W5 and the other lead connected to line W1. Since the logic circuit employs both alternating current and direct current relays, a power supply is used which has its input connected to wires W1 and W5 in the normal manner and taking the output from the other two terminals of the power supply which are connected to common wire W4 and wire W3. Connected between wire W3 and W4 is a series circuit comprising seven relay contacts and a relay CR-1 (line 14). The series circuit comprises two normally closed relay contacts, CR-13 and CR-14 connected to a pair of normally open null detector contacts CRSN-101 and CRSN-201 which are connected in series with a pair of normally closed relay contacts CR-5 and CR-3 that are connected in series with a pair of normally open relay contacts CR-39 all of which are connected to control relay CR-1. Closing a switch S1-1 (line 17) applies power to another circuit in line 18 which terminates with a control relay CR-2L being connected to line W5 by a series circuit connected thereto. The series circuit is formed from an actuate push button switch PB1-1, and normally open relay contacts CR-1 and CR-21. Control relay CR-2L is energized by the actuation of pushbutton switch PB1-1. Connected between wire W1 and W5 is another series curcuit having another section of the actuate switch PB1-2 connected thereto which energizes a readdress unlatch control relay CR-27UNL. In line 21, connected between wire W1 and wire W5 is a series circuit having normally closed relay contacts CR-4 and normally open relay contacts CR-2 connected to a left actuate relay CR-3L. Closing a switch S2-1 completes a circuit in line 25 to a control relay CR-4L connected to wire W5 through normally open relay contacts CR-3L and normally closed contacts CR-5. Control relay CR-4L is not energized if the right addresser is not energized. In line 27, a series circuit is formed between wire W1 and W5 by a pair of normally open relay contacts CR-4L connected to a control relay CR-5L which is also actuated when the right addresser is energized. Line 29 is completed between wires W3 and W4 with a series circuit in which a pair of normally closed relay contacts CR-13 and CR-14 are connected to a pair of normally open relay contacts CR-3L and CR-12, the circuit being completed by an electromagnet S.EM-2 which serves as a left load station warning electromagnet to open transfer cart reed switch L.RS-7. Connected in parallel with control relay contacts CR-3L in line 29, is another pair of normally open relay contacts CR-5L (line 30) and connected between the junction of normally open relay contacts CR-3L and CR-12 of line 29, is a series circuit having normally closed relay contacts CR-12 connected to a right load station warning electromagnet S.EM-3 which terminates at wire W4. Electromagnet S.EM-3 controls transfer cart reed switch R.RS-7 in the same manner as just described for the left load station.

Connected between lines W3 and W4 is a series circuit having normally open relay contacts CR-1 connected to an electromagnet S.EM-1 which enables the transfer cart by closing transfer cart reed switch RS-1. Line 32 is completed by a series circuit between wires W1 and W5 wherein three normally open relay contacts CR-38, CR-35 and CR-3 are connected to an unlatch control relay CR-2UNL. In line 33, another series circuit is formed with an unlatch control relay CR-4UNL connected between wire W5 and the junction between normally open relay contacts CR-35 and CR-3 of line 32 by normally closed relay contacts CR-3. In line 34, is a series circuit formed between wire W5 and a connection between normally open relay contacts CR-38 and CR-35 (line 32), formed from a pair of normally open relay contacts CR-36 and CR-4 connected to another unlatch control relay CR-3UNL. In line 35 there is found connected in parallel with the normally open contacts of control relay CR-4 (line 34), a second section of the right addresser switch S2-2 which is open when the right addresser switch is "on". Also connected between relay contacts CR-36 and CR-4 of line 34, is a pair of normally closed relay contacts CR-4 connected to an unlatch control relay CR-5UNL which terminates at wire W5 (line 36). In line 43, a series circuit is formed between wires W3 and W4 by a pair of normally closed relay contacts CR-27 connected to a withdrawal section of a left deposit- withdrawal switch SS1-1, a pair of normally open relay contacts CR-2 and CR-3L, and a left address bin-load station control relay CR-6. Connected in parallel with the withdrawal section of switch SS1-1 and normally open relay contacts CR-2 of line 43, is a deposit section of switch SS-1 which is open when the withdrawal section is closed and vice versa that is connected to a pair of normally closed relay contacts CR-2. Connected between the normally closed contacts of control relay CR-27 and switch SS1-1 in line 43, is a series circuit (line 45) in which a right deposit withdrawal switch SS2-1 has the withdrawal section closed and is connected to a pair of normally open relay contacts CR-4L and CR-5L which are connected to a pair of normally closed relay contacts CR-3L and a right address bin-load station control relay CR-7. In line 46, another series circuit is completed by having a deposit section of deposit-withdrawal switch SS2-1 which is open when the withdrawal section is closed and vice versa, connected to normally closed relay contacts CR-4L, the combination being in parallel with the withdrawal section of switch SS2-1 and normally open relay contacts CR-4L of line 45.

In line 50, connected between wires W1 and W5 is a deposit section of a switch section SS1-3 and a withdrawal section of a third switch section SS2-3, are three normally open relay contacts CR-3L, CR-4L and CR-48, and a longitudinal memory control relay CR-8L. Control relay CR-8L is enabled only during a dual command deposit- withdrawal cycle and is energized only if the second bin address destination in longitudinal direction is passed or not beyond that of the first command. Connected between normally open relay contacts CR-4L and CR-48, and wire W5, is a pair of normally open relay contacts CR-47 and a vertical memory control relay CR-9L (line 51). Control relay CR-9 has an action similar to that for the longitudinal control relay CR-8 except it is used in the vertical axis. Connected between wires W1 and W5 in line 52, is a pair of normally closed relay contacts CR-4L and an unlatch control relay CR-8UNL. In line 53, a pair of normally open relay contacts CR-27 are connected in parallel with relay contacts CR-4L of line 52 and an unlatch control relay CR-9UNL is connected in parallel with unlatch control relay CR-8UNL. Connected between wires W3 and W4 of line 54, is a pair of normally closed relay contacts CR-8 and a pair of normally open relay contacts CR-7 connected to a longitudinal direction control relay CR-10. Connected in parallel with control relay contacts CR-8 and CR-7 of line 54, is a pair of normally open relay contacts CR-6 in line 53. Control relay CR-10 determines the longitudinal direction of the stacker. Where the relay is energized, the stacker is directed away from the operator on the transfer cart and if the relay is deenergized, the stacker is moved towards the HOME station. In line 57, a series circuit is connected between wires W1 and W5 by a pair of normally closed relay contacts CR-26, a left bin address switch SS-3, a pair of normally open relay contacts CR-6 and CR-3L, and a left-right control relay CR-12L. Connected in parallel with switch SS-3 and relay contacts CR-6 in line 57, is a left load station address switch SS-4 which is connected to a pair of normally closed relay contacts CR-6. Connected in parallel with switch SS-3, relay contacts CR-6 and CR-3L, are a right bin address switch SS-5, a pair of normally open relay contacts CR-7 and CR-5L and normally closed contacts CR-3L. Connected in parallel with switch SS-5 and relay contacts CR-7, are a right load station addresser switch SS-6 and a pair of normally closed relay contacts CR-7. Connected between the normally closed contacts of relay CR-26 and switch SS-3, is a pair of normally closed contacts CR-22 which is connected to an unlatch control relay CR-12UNL which terminates at wire W5. Control relay CR-12 makes the proper selection of the left or right longitudinal fine transducer, vertical superfine transducer, and direction of the lateral platform extension of the stacker.

In line 62, a series circuit is formed between wires W3 and W4 by normally open relay contacts CR-50, CR-3L, CR-6, normally closed relay contacts CR-43 and a longitudinal coarse-fine control relay CR-13. In line 63, normally closed relay contacts CR-6 and CR-45 are connected in series with each other and in parallel with control relay contacts CR-6 and CR-43 of line 62. Connected in parallel with control relay contacts CR-3L of line 62 and CR-6 of line 63, are normally closed relay contacts CR-3L and CR-7 (line 64). In line 65, a pair of normally open relay contacts CR-7 are connected in series with a pair of normally closed relay contacts CR-48, the circuit being in parallel with relay contacts CR-7 of line 64 and CR-45 of line 63. In line 66, between wires W3 and W4, is a series circuit including normally open relay contacts CR-3L, CR-6, normally closed relay contacts CR-42 and a coarse-fine vertical control relay CR-14. Control relay CR-14 like CR-13 determines whether the vertical system is in fine or coarse control. In line 67, normally closed relay contacts CR-6 and CR-41 are series connected and in parallel with relay contacts CR-6 and CR-42 of line 66. In line 68, normally closed relay contacts CR-3L and CR-7 are in series with each other and connected in parallel with relay contacts CR-3L of line 66 and CR-6 of line 67. In line 69, a pair of normally open relay contacts CR-7 connected in series with a pair of normally closed relay contacts CR-47, are connected in parallel with relay contacts CRc7 of line 68 and relay contacts CR-41 of line 67. In line 70, a series circuit is connected between wires W3 and W4 through normally open relay contacts CR-50, normally closed relay contacts CR-26, normally open relay contacts CR-39 and CR-13, and a longitudinal motor control relay CR-16. Connected in parallel with relay contacts CR-13 in line 70, is a pair of normally closed null detector contacts CRSN-101, and connected in parallel with normally open relay contacts CR-50, is a limit switch LS-10. Limit switch LS-10 may be of the "proximity" type or tripped by a cam arrangement on a forward member of the transfer cart when the switch comes abreast of this longitudinal position. In line 71, a series circuit is formed between wires W3 and W4, which include normally open relay contacts CR-39 and CR-14, and a vertical motor control relay CR-18. In line 72, connected in parallel with control relay contacts CR-14 of line 71 are normally closed null detector contacts CRSN-201 and normally closed relay contacts CR-19. In line 73, another circuit is formed in parallel with relay contact CR-14 of line 71 in which normally closed null detector contacts CRSN-202 are connected to normally open relay contacts CR-19. Connected in parallel with normally open relay contacts CR-39 and CR-14 of line 71, is limit switch LS12-1 and normally open relay contacts CR-19.

In line 75, a series circuit is formed starting with a connection between null detector contacts CRSN-101 and CRSN-201 of line 14 and wire W4, comprising normally open relay contacts CR-19, normally closed relay contacts CR-27, normally open relay contacts CR-3L, and a superfine —fine control relay CR-19. Control relay CR-19 is used with the vertical control system for switching from control on the stacker mast to the bins. Connected in parallel with control relay contacts CR-19 in line 75, are normally open null detector contacts CRSN-201 and connected in parallel with control relay contacts CR-3L is a pair of normally open relay contacts CR-5L.

Another series circuit is formed in line 83 between wires W3 and W4 in which are connected reed switches RS-16 and RS-17, normally open relay contacts CR-12, normally closed relay contacts CR-26, normally open null detector contacts CRSN-202, normally open relay contacts CR-19, normally closed relay contacts CR-38 and a lateral enable control relay CR-22. Unless control relay CR-22 is enabled, the lateral subcycle cannot be initiated. Connected in parallel with reed switches RS-16, RS-17 and relay contacts CR-12 of line 83, are reed switches RS-18, RS-19, and normally closed relay contacts CR-12. Connected in parallel with reed switch RS-17, is a pair of normally open relay contacts CR-23 in line 82, and connected in parallel with reed switch RS-19 is another pair of normally open relay contacts CR-23 in line 85. In line 88, connected between wires W3 and W4 is a series circuit comprising normally open relay contacts CR-5, normally closed relay contacts CR-4L and CR-3L, and a by-pass control relay CR-23. Connected in parallel with relay contacts CR-5, CR-4L, and CR-3L are normally closed relay contacts CR-2 and normally open relay contacts CR-3L (line 87). A series circuit is connected in parallel with normally closed contacts CR-22 and unlatch control relay CR-12UNL (line 60) and completed in line 89, comprising normally open relay contacts CR-22, a normally closed pushbutton switch PB1-3 which is part of the actuate switch, normally closed relay contacts CR-27, normally open relay contacts CR-3L, normally closed relay contacts CR-2, normally open relay contacts CR-12, and a bin probe solenoid SOL-1, called the left bin flipper. Connected in parallel with control relay contacts CR-3L and CR-2, is a series circuit formed of normally closed relay contacts CR-4 and normally open relay contacts CR-5 and connected in parallel with normally open relay contacts CR-12 and solenoid SOL-1, are normally closed relay contacts CR-12, and a bin probe solenoid SOL-2 called the right bin flipper. In line 93, a series circuit is formed between wire W1 and W5 by left bin empty switch SOL1-S1, normally open relay contacts CR-22 and a lateral actuate control relay CR-26L. In line 94, a right bin empty switch SOL2-S1 is connected in parallel with switch SOL1-S1 of line 93. Connected in parallel with both switches just described, are normally open relay contacts CR-3L and CR-2 in line 95 and connected in parallel with the contacts of the two relays just mentioned, are normally open relay contacts CR-4L and CR-5L and normally closed relay contacts CR-3 (line 96). Line 98 has a series circuit formed between wires W1 and W5 in which a normally open pair of relay contacts CR-38 are connected to unlatch control relay CR-26UNL. Another pair of normally closed relay contacts CR-19 in line 99, are connected in parallel with the contacts of relay CR-38 in line 98. Connected between lines W1 and W5 is a series circuit in lines 100 and 99 having left bin full switch SOL1-S2, a pair of normally closed relay contacts CR-26, and a readdress control relay CR-27L. Control relay CR-27 is energized only under the conditions where the bin flippers establish that a bin is obstructed. The right full bin switch SOL2-S2 is connected in parallel with switch SOL1-S2. In line 101, connected between lines W3 and W4 is a series circuit formed of limit switch LS12-2 which is opened when the lateral platform is fully extended, normally open relay contacts CR-26, CR-19, and a lateral motor control relay CR-30. Connected in parallel with limit switch LS12-2, is a pair of normally open relay contacts CR-37 (line 102). Connected between wires W1 and W5, is a series circuit formed by normally open relay contacts CR-26, CR-36, and normally closed relay contacts CR-34, and an elevator control relay CR-33L. Control relay CR-33 causes the elevator to rise after a lateral extension is complete causing the transducers to be shifted. Connected in parallel with relay contacts CR-36 and CR-34 and control relay CR-33L, is a series circuit formed by normally open relay contacts CR-35, normally closed relay contacts CR-33 and an elevator control relay CR-34L. Control relay CR-34L is used in a manner similar to that of control relay CR-33 except it is used to lower the elevator. In lines 105 and 106, a pair of unlatch control relays CR-33UNL and CR-34UNL respectively are controlled by connecting one of their terminals to wire W5 and their other terminals to the junction of the two pairs of contacts which are normally open and normally closed of control relay CR-22 (line 61). In line 107, a circuit is formed from the power supply PS-201 to an armature of motor M-201 through normally open relay contacts CR-33 and limit switch LS12-3 which is closed when the lateral platform is fully extended. The other armature terminal of motor M-201 is connected to power supply PS-201, in line 110, through normally closed relay contacts CR-34, normally open relay contacts CR-33, limit switch LS20-1, and limit switch LS21-1. Connected across the armature of motor M-201 is a resistor RE-53 and the motor field is connected to power supply PS-201 on lines 108 and 109. Connected in parallel with limit switch LS20-1 is a pair of normally open relay contacts CR-34 and connected in parallel with limit switch LS21-1, is a pair of normally open relay contacts CR-33. Connected in parallel with normally closed relay contacts CR-34, are normally closed relay contacts CR-33 (line 109) and connected between relay contacts CR-34 and CR-33 in line 110, is a pair of normally open relay contacts CR-34 which terminate between relay contacts CR-33 and limit switch LS12-3 in line 107. Another pair of normally open relay contacts CR-34 are connected to line 107 and to a point on line 110 between relay contacts CR-33 and limit switch LS20-1. In line 111, a series circuit is formed between wire W3 and W4 by limit switch LS20-2 and a vertical limit control relay CR-35. Connected in parallel with limit switch LS20-2 and control relay CR-35, is a limit switch LS21-2 and another vertical control relay CR-36. Connected between wires W3 and W4 in line 113, is a series curcuit comprising normally open relay contacts CR-34 and CR-36, and a lateral retract control relay CR-37. Control relay CR-37 is energized by the completion of either the elevator rise or lower operation and causes the platform to retract. Connected in parallel with normally open relay contacts CR-34 and CR-36, are a pair of normally open relay contacts CR-33 and CR-35 in line 112. Connected between wires W3 and W4 is another series curcuit formed by normally open relay contacts CR-37 and CR-39, and a lateral complete control relay CR-38 in line 114. Control relay CR-38 causes the logic to advance to the next address and reset the lateral axis logic circuit. Connected in line 115, between wires W3 and W4 is a series circuit which has limit switch LS-22 connected to a center limit control relay CR-39.

In line 130, connected between wires W3 and W4 is a pair of normally open relay contacts CR-6 and a safe-unsafe control relay CR-50 which is enabled in the safe condition of an operation. Connected in parallel with relay contact CR-6 in line 130, are normally open relay contacts CR-7 in line 131. Connected in parallel with normally open relay contacts CR-6 are reed switches RS23-2, RS23-1, and RS-24. In other words, the three reed switches are connected in parallel with each other and the contacts of the last two mentioned control relays.

Figure 21A:
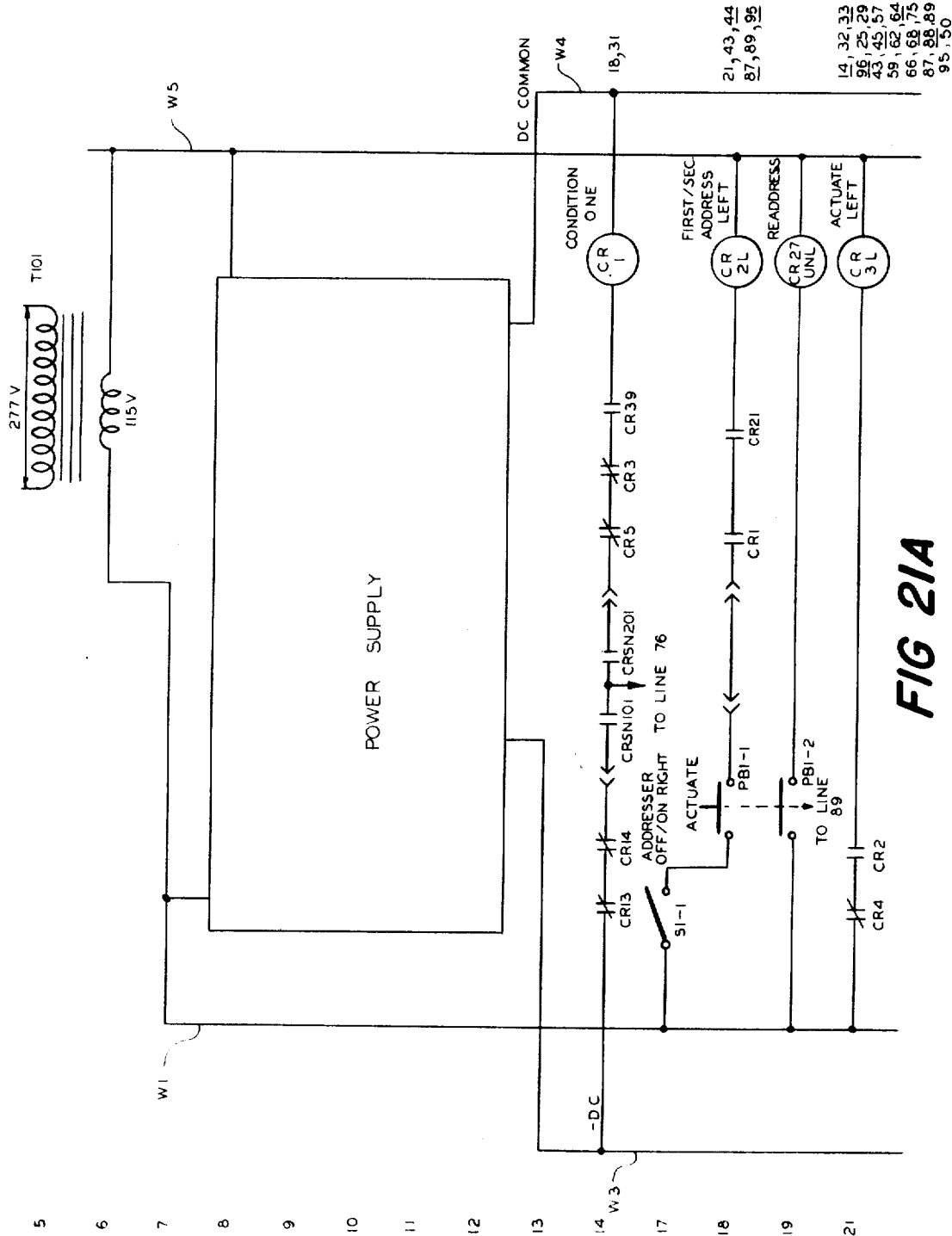
Figure 21C:
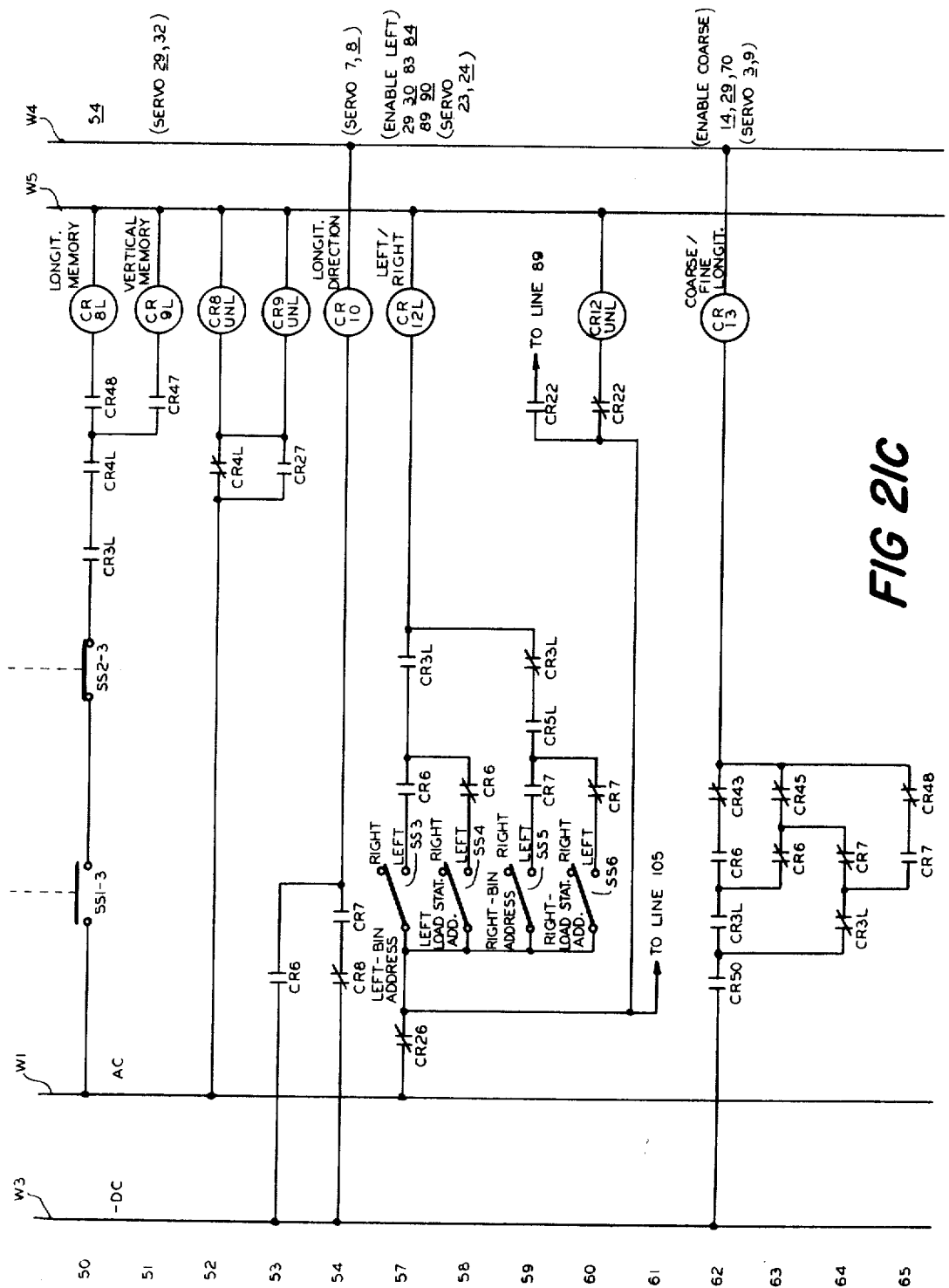
Figure 21D:
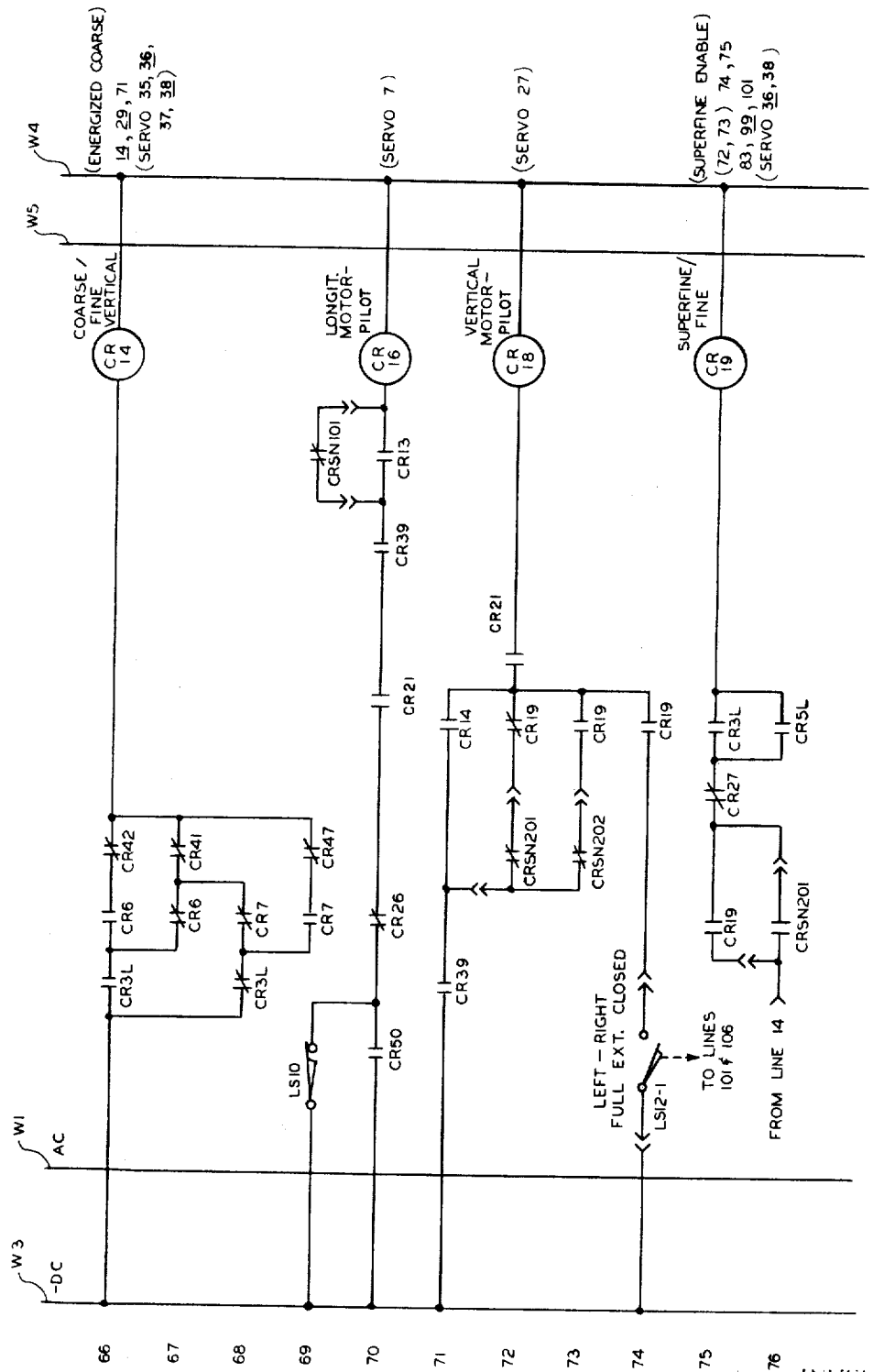
Figure 21E:
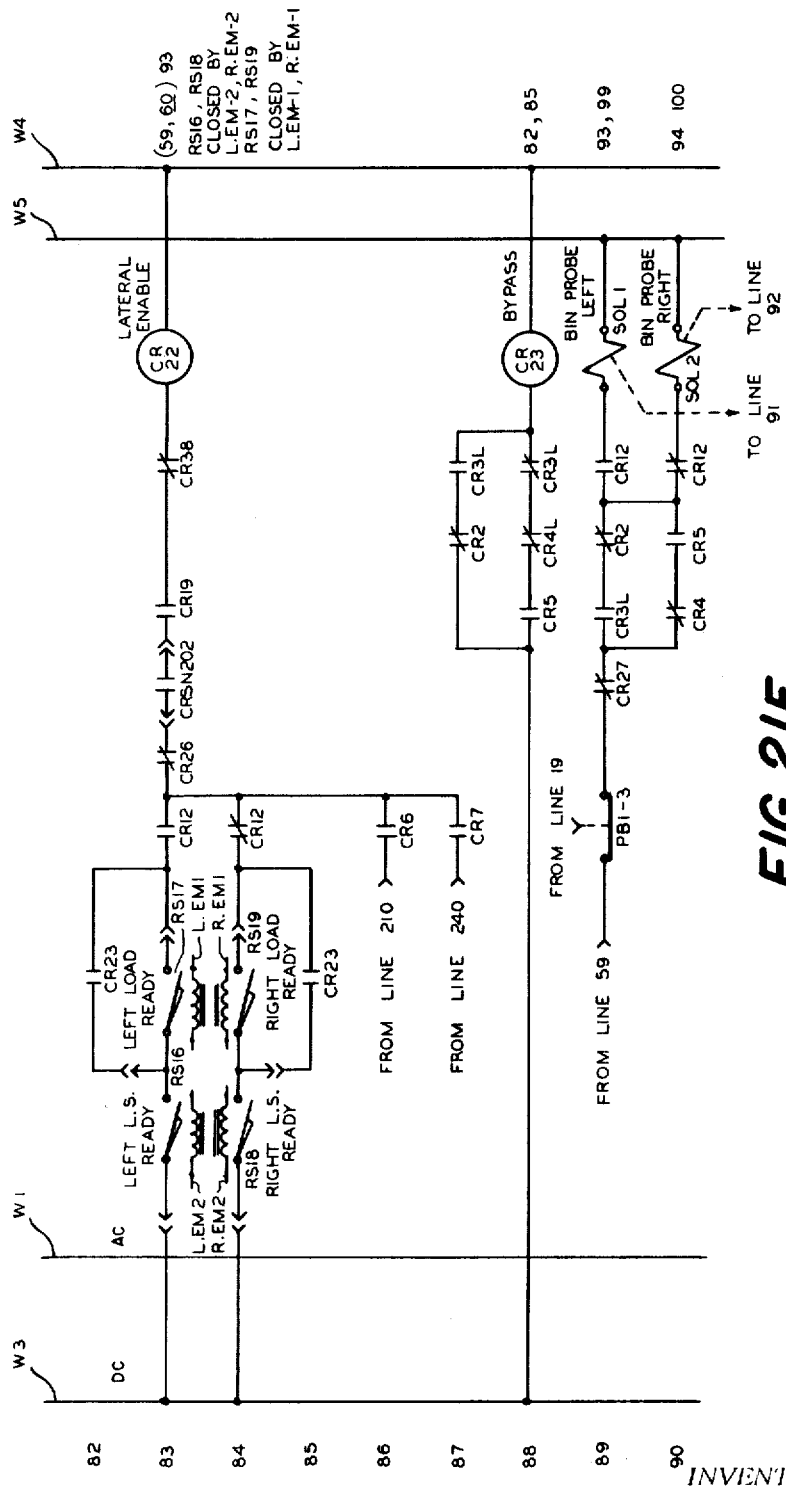
Figure 21G:
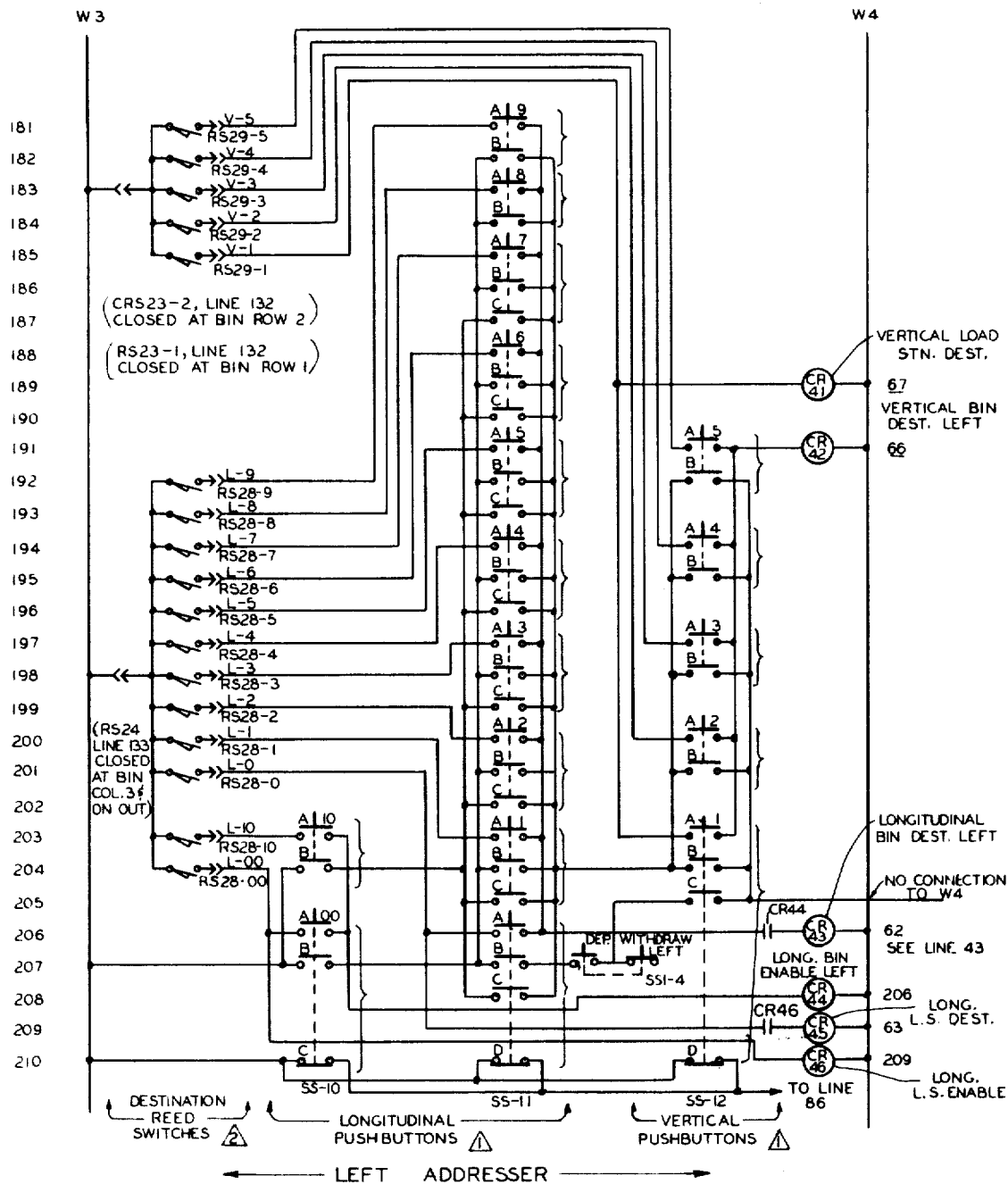
Figure 21H:
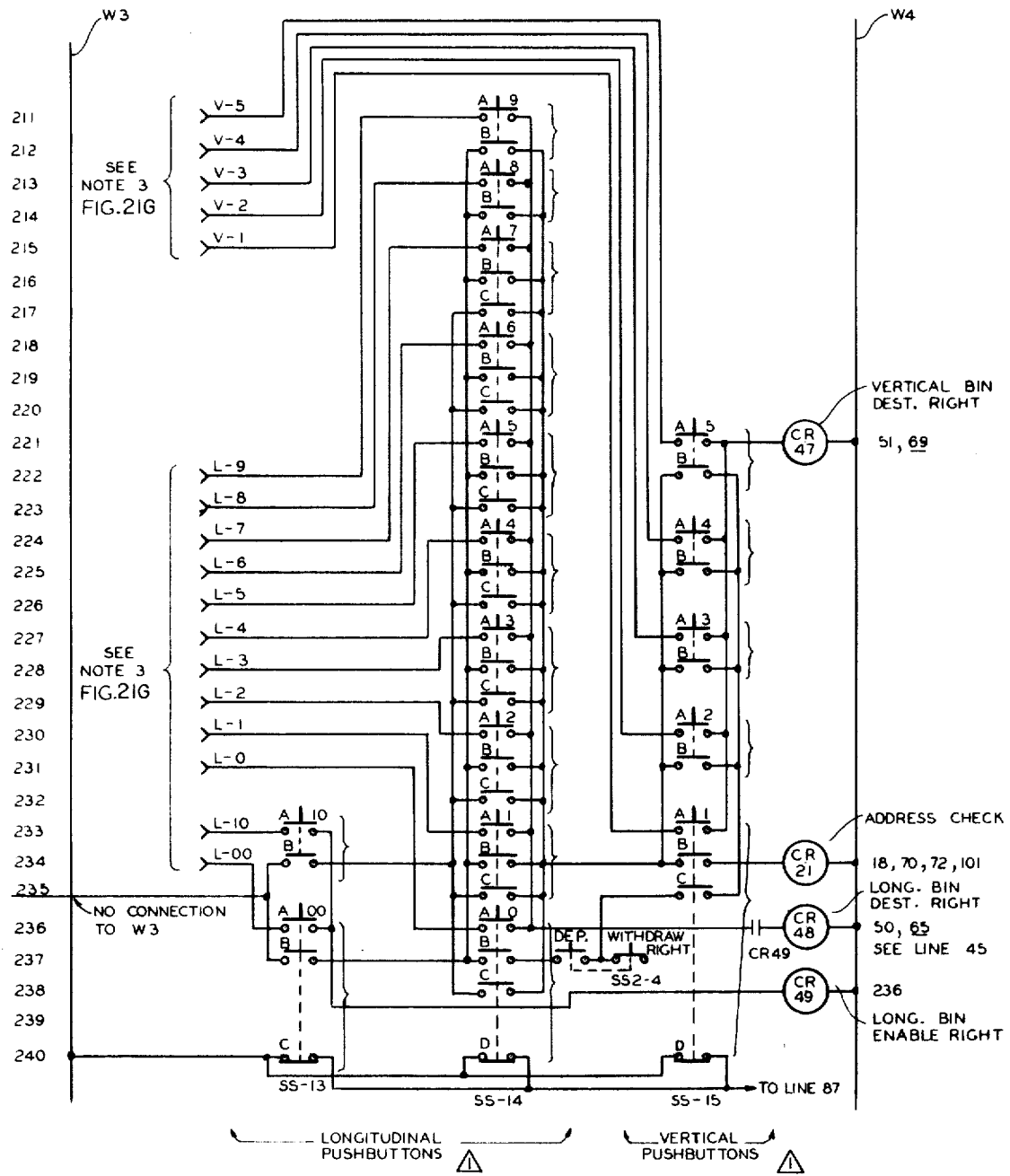

In the left and right addresser circuits, all of the power connections are made between wires W3 and W4 and the operation of both figures will be described at the same time. The five vertical reed switches RS29-1, RS29-2, RS29-3, RS29-4, and RS29-5 all have one of their terminals connected to wire W3 at line 183. The other terminal of reed switch RS29-1 is connected to a terminal of section A of vertical pushbutton switch SS12-1 (line 203) and to a terminal of section A of vertical pushbutton switch SS15-1. The other terminal of reed switch RS29-1 is also connected to a vertical load station destination control relay CR-41 which is terminated on wire W4 (line 189). The other terminal of reed switch RS29-2 is connected to a terminal of section A of switch SS12-2 (line 200) and is also connected to a terminal of section A of switch SS15-2, (line 230). In a similar manner, the other terminal of reed switch RS29-3 is connected to a terminal of section A of vertical pushbutton switch SS12-3 (line 197) and to terminal of section A of switch SS15-3 (line 227). Reed switch RS29-4 has its other terminal connected to a terminal of section A of switch SS12-4 (line 194) and to a terminal of section A of switch SS15-4 (line 224). Reed switch RS29-5 has its other terminal connected to a terminal of section A of switch SS12-5 (line 191) and is also connected to a terminal of section A of switch SS15-5 (line 221). The other terminals of section A of switch SS-12 are all interconnected and in turn are connected to a left vertical bin destination control relay CR-42 which is connected to wire W4 (line 191). In a similar manner, all of the other terminals of section A of switch SS-15 are interconnected and are connected to a right vertical bin destination control relay CR-47 which is also connected to wire W4 (line 221). Switches RS28-00, RS28-10, RS28-0, RS28-1, RS28-2, RS28-3, RS28-4, RS28-5, RS28-6, RS28-7, RS28-8, and RS28-9 all have one terminal connected to wire W3 at line 198. The other terminal of reed switch RS28-00 is connected to section A of longitudinal pushbutton switch SS10-00 (line 206) and is also connected to a longitudinal load station enable control relay CR-46 which is connected to wire W4 (line 210). The other terminal of reed switch RS28-00 is also connected to section A of pushbutton switch SS13-00 (line 236). The other terminal of reed switch RS28-10 is connected to section A of switch SS10-10 and is also connected to section A of switch SS13-10. The other connections of section A of switches SS10-10 and SS10-00 are connected to a left enable control relay CR-44 (line 208) and the other terminals of section A of switches SS13-10 and SS13-00 are connected to a right longitudinal bin enable relay CR-49 (line 239). The other terminal of reed switch RS28-0 is connected to section A of switch SS11-0 (line 206) and to section A of switch SS14-0 (line 236) and to a pair of normally open relay contacts CR-46 which in turn are connected to a longitudinal load station destination control relay CR-45 that is terminated at wire W4 on line 209. In like manner, reed switches RS28-1 through RS28-9 are connected to section A of switches SS11-1 through SS11-9 at lines 203, 200, 197, 194, 191, 188, 185, 183, and 181 respectively. In a similar manner, reed switches RS28-1 through RS28-9 are connected to section A of switches SS14-1 through SS14-9 at lines 233, 230, 227, 224, 221, 218, 215, 213, and 211. All of the other terminals of section A of switches SS11-0 through SS11-9 are connected to each other and to a pair of normally open relay contacts CR-44 which in turn is connected to a left longitudinal bin destination control relay CR-43 that is terminated at wire W4 on line 206. In like manner, section A of each of switches SS14-0 through SS14-9 have all of their other terminals interconnected and connected to a pair of normally open relay contacts CR-49 which are connected to a right longitudinal bin destination control relay CR-48 (line 236). Section B of switch SS10-10 is connected to wire W3 and its other terminal is connected to section C of each of switches SS11-0 through SS11-7. Section B of switch SS10-00 is also connected to wire W3 on line 207 and its other terminal is connected to section B of each of switches SS11-0 through SS11-9. The other terminal of section C of switches SS11-0 through SS11-7 and all of the other terminals of section B of switches SS11-1 through SS11-9 are interconnected and are connected to a terminal of section B of each of switches SS12-1 through SS12-5. The other terminals of section B of switches SS12-1 through SS12-5 and SS12-1 section C are connected together and are connected to section B of switches SS13-00 and SS13-10 on line 235. The other terminal of switch SS13-00 is connected to a terminal of section B of switches SS14-0 through SS14-9. The other terminal of switch SS13-10 is connected to a terminal of section C of each of switches SS14-0 through SS14-7. The other terminals of section C of switches SS14-0 through SS14-7 are interconnected and the other terminals of section B of switches SS14-1 through SS14-9 are interconnected with section C as just described. The interconnections just described are also made to one terminal of section B of each of switches SS15-1 through SS15-5 and the other terminals of switches SS15-1 through SS15-5 are connected to a control relay CR-21 which terminates at wire W4. Control relay CR-21 is an address checker and unless the bin addresses are complete and valid the relay will not be energized and this relay must be energized to permit actuation of the stacker and enable the vertical and longitudinal drive systems. The other terminal of section B of switch SS11-0 is connected to a deposit section of deposit-withdrawal switch SS1-4 and the other terminal of the deposit switch section is connected to a terminal of section C of vertical pushbutton switch SS12-1. The other terminal of section C of the same switch is connected to the common terminals of section B for switch SS-12. In a similar manner, the other terminal of section B of switch SS14-0 is connected to the deposit section of deposit-withdrawal switch SS2-4 and the other terminal of the deposit section is connected to a terminal of section C of switch SS15-1. The other terminal of section C of switch SS-15 is connected to the common connections of section B of switch SS-15. In line 210, a series circuit is formed between wire W3 and wire W4 through a section C of switch SS10-00 which is completed on line 86 by having connected in series normally open relay contacts CR-6 which are connected between normally open relay contacts CR-12 and normally closed contacts CR-26 on line 83. Another circuit which is in parallel with section C of switch SS-10, is a circuit formed by section D of switch SS-11 and also in parallel is section D of switch SS-12. In line 240, a series circuit is completed between wire W3 and wire W4 through a section C of switch SS-13 which is completed on line 87 by connecting a normally open relay contact CR-7 between normally open relay contacts CR-12 and normally closed relay contacts CR-26 on line 83. Another circuit connected in parallel with section C of switch SS-13, is one formed by having a section D of switch SS-14 in parallel with a section D of switch SS-15. It will of course be understood that the selector pushbutton switches which are shown in FIGS. 21g and 21h are interlocking and when one switch is depressed, all other in that column are in an inactive state but depressing a different switch will release one previously depressed.

STACKER SERVO DRIVE AND CONTROL CIRCUITS

In FIG. 22a the longitudinal driving circuit is shown in the automatic mode of operation where a summing amplifier SA-100 (line 9) has connected to its input a series circuit formed from linear position transducer LPT-102, normally closed relay contacts CR-13, and a resistor R-105. Linear position transducer LPT-102 is also connected to an electrical ground 182. A null detector CRSN-101 is used with linear position transducer LPT-102. Null detector CRSN-101 has normally closed contacts which are in stacker logic circuit line 14 and normally open relay contacts which are in stacker logic circuit line 69. The circuit just described provides the fine longitudinal mode of control for the stacker and will be further explained later. The output of summing amplifier SA-100 is connected to the input of a driving amplifier DA-100 through a pair of normally closed relay contacts CR-26. A resistor R-108 is also connected from the output to the input of summing amplifier SA-100 in line 8. The output of driving amplifier DA-100 is connected to a field coil GF-100 of generator G-100 which is shown coupled to motor M-1 that is driven by power from power lines L1, L2 and L3. Generator G-100 has a pair of resistors R-109 and R-110 connected across its armature and has one armature terminal connected to ground 182. A signal is fed back to the input of summing amplifier SA-100 on line 7 through a resistor R-107 and a pair of normally closed relay contacts CR-26 which are connected between resistor R-109 and R-110. Motors M-100 and M-300 each have one of their armature terminals connected to ground 182. Connecting the ungrounded armature terminal of generator G-100 to motor M-100 is a normally open pair of relay contacts CR-16. Also connecting the ungrounded armature terminal of generator G-100 to motor M-300 is a pair of normally open relay contacts CR-30. It will be seen that by closing relay contacts CR-16 or CR-30, either the longitudinal motor M-100 or lateral motor M-300 may be energized. Once motor M-100 is energized, it drives tachometer generator TG-100 which has one terminal connected to ground and the other terminal connected to the input of summing amplifier SA-100 through a pair of resistors R-111 and R-106. Connected between resistors R-106 and R-111 is another resistor R-113 which is connected to ground 182.

In the coarse mode of operation, a power supply PS-100 (FIG. 22b) supplies a positive and negative 15 volt direct current output upon being energized by alternating current between lines L3 and N. The positive 15 volt terminal with respect to ground 182 is connected to a lead 183 and the negative terminal with respect to ground 182 is applied to a lead 184. Connected between lead 183 and ground 182 on lines 7 and 8, are normally open relay contacts CR-10, a resistor R-101, the resistive element of a potentiometer P-101 and a resistance R-102. The wiper arm of potentiometer P-101 is connected to resistor R-105 through a pair of normally open relay contacts CR-13 (line 9). Thus there is established a direct current circuit from the power supply PS-100 to summing amplifier SA-100 for driving motor M-100 in a coarse mode of operation when the appropriate relay contacts are either opened or closed. To provide a driving signal in the opposite direction, a pair of normally closed relay contacts CR-10 (line 8) are connected between line 184 and normally open relay contacts CR-10 and resistor R-101.

The lateral drive system (FIG. 22b) does not make use of a "Coarse" mode of operation but uses only a fine mode of operation. The fine mode of operation is accomplished by supplying a reference voltage from power supply PS-100 and developing a linear voltage which is negative for travel of the platform to the left and positive for travel of the platform to the right which is compared to the reference voltage to produce the proper position of the platform. Since the longitudinal motor M-100 is never operated while the lateral motor M-300 is operated, it is possible to use part of the longitudinal drive system for the lateral system and thus reduce the number of components required. Generator G-100 is used to drive both longitudinal motor M-100 and lateral motor M-300 and a common driving amplifier DA-100 serves both the longitude and lateral driving systems.

The output of a summing amplifier SA-300 is connected to driving amplifier DA-100 through a pair of normally open relay contacts CR-26 and a connecting lead 390. A feedback resistor R-311 is connected between the output and input of summing amplifier SA-300. A speed or velocity signal is also applied to the driving motor to control its operation and this is accomplished by taking the output signal from a tachometer generator TG-300 and applying it through the resistive element of a potentiometer P-301 and a resistor R-315 connected in series therewith, to ground 182. The wiper arm of potentiometer P-301 is connected to the input of amplifier SA-300 (line 15) through a resistor R-303. In line 21 a linear voltage differential transformer LVDT-301 supplies a DC output voltage which is variable linearly much like a variable resistor. The transducer may be of the type known as a Sanborn 7 DCDT transducer manufactured by the Sanborn Company. The voltage output of LVDT-301 varies with the lateral position of platform 386 as it is moved. The output voltage from transducer LVDT-301 is applied to amplifier SA-300 through a resistor R-305. The two signal producing devices, TG-300 and LVDT-301 form the lateral transducer 700 described previously.

In line 24, a series circuit is formed to summing amplifier SA-300 by a pair of normally closed relay contacts CR-12, a pair of normally closed relay contacts CR-37, a resistor R-314 and a resistor R-309. Connected between ground 182 and resistors R-314 and R-309, is a resistor R-308, and connected between ground 182 and normally closed relay contacts CR-37 and resistor R-314, is a pair of normally open relay contacts CR-37 (line 25). Connected between relay contacts CR-12 and CR-37 in line 24, and lead 184, is a pair of normally open relay contacts CR-12 (line 23). Thus the reference voltage referred to previously is established to summing amplifier SA-300 to control the position and direction of the lateral platform as it is extended and retracted.

The vertical system of control is divided into one of coarse control, fine control, and superfine control. The coarse control moves the elevator vertically until the vertical position of the bin is established generally, after which a magnetic strip is sensed on the mast of the stacker and the superfine control is used to position the elevator opposite each of the bins vertically. In line 29, a series circuit is formed between ground 182 and lead 184 supplying a negative voltage through a pair of normally open relay contacts CR-7 and a pair of normally closed relay contacts CR-9, a resistor R-203, the resistive element of a potentiometer P-201 and a resistor R-204. The wiper arm of potentiometer P-201 is connected to the input of a summing amplifier SA-200 through a resistor R-214, a pair of normally open relay contact CR-14 and a resistor R-205. The output of summing amplifier SA-200 is connected to the input of driving amplifier DA-200, and a feedback resistor R-212 is connected between the output and input of summing amplifier SA-200 in line 31. Connected in parallel with control relay contacts CR-7 and CR-9 in line 29, is a pair of normally open relay contacts CR-6.

Connected between lead 183 and resistor R-203, is a pair of normally closed relay contacts CR-7 and CR-6 (line 33) and connected in parallel with contacts CR-7 are a pair of normally open contacts CR-9 (line 32) which provide a voltage of different polarity to cause the servo to drive in the opposite direction from that just described. Driving amplifier DA-200 has its output connected to a generator field GF-200 which forms the field of generator G-200. Generator G-200 is driven by motor M-2 which is excited through power lines L1, L2, and L3. One terminal of the armatures of generator G-200 and motor M-200 are connected to ground 182. Connected in series across the armature terminals of generator G-200, are a pair of resistors R-208 and R-209. A feedback circuit is formed at the junction of resistors R-208 and R-209 to the input of summing amplifier SA-200, through a resistor R-207 in line 28. A velocity feedback signal is supplied from tachometer generator TG-200 to the input of summing amplifier SA-200 through a pair of resistors R-215 and R-206, another resistor R-216 being connected between the two just mentioned and ground 182. The motor driving circuit is completed by connecting the ungrounded armature terminal of generator G-200 to the other armature terminal of motor M-200 through a pair of normally open relay contacts CR-18. Thus the coarse control circuit, is similar to that of the others just described.

The fine mode of operation is controlled by a series circuit between ground 182 and the junction of relay contacts CR-14 (line 35) and resistor R-205 which is formed by linear position transducer LPT-203, a pair of normally closed relay contacts CR-14, a pair of normally closed relay contacts CR-19, a summing amplifier SA-201, a resistor R-213, and a pair of normally closed contacts CR-14. A null detector CRSN-201 works in the same manner as that of CRSN-101 described in the longitudinal circuit with the exception that null detector CRSN-201 has a pair of normally open relay contacts connected in stacker logic line 72 and normally closed contacts in stacker logic line 14 and 76. Linear position transducer LPT-203 senses the magnetic strips which are on the stacker mast and provides a fine mode of alignment for the elevator, at which time one of permanent magnets 280—284 close a reed switch RS-201 which is connected between ground and line 183 to control null detector CRSN-201.

A superfine mode of control is desirable to take care of any stand-off errors in the vertical servo by integrating these errors and correcting the servo. This type of servo is generally referred to as a "type two (2)" position servo and is used to overcome the steady-state load torque by integrating the servo error until the signal input to the servo is sufficient to cause the servo to seek its null and drive the error signal to a zero valve. The superfine mode of operation is controlled by a series circuit (line 38) formed of a pair of normally open relay contacts CR-19 connected to the input of an integrating amplifier IA-201, the combination being connected in parallel with relay contacts CR-19 and amplifier SA-201. A null detector CRSN-202 works in the same manner as that of CRSN-201 described previously, the null detector CRSN-202 having a pair of normally open relay contacts connected in stacker logic line 83 and a pair of normally closed contacts in stacker logic, line 73. Linear position transducer LPT-203 again senses the null area of the magnetic strips which are on the stacker mast and provides a superfine mode of alignment for the elevator, at which time one of permanent magnets 290- —294 close a reed switch RS-202 which is connected between ground and line 183 to control null detector CRSN-202.

For a more thorough understanding of the transfer cart and the stacker, it will now be described as used in completing different modes of operation.

TRANSFER CART OPERATION

Initial Conditions

A certain set of initial conditions must be assumed before the operation of the transfer cart can be described. It will be assumed that the stacker 100 is in a position of just having performed a deposit mode of operation, and that the transfer cart 400 is "locked" to the bins at aisle No. 1 location as found in FIG. 1, and that the load stations are empty on both sides of the transfer cart. In other words, both pallet dollies are "In" and unloaded. The transfer cart brake is locked to prevent movement and the stacker has both the left addresser switch S-1 and right addresser switch S-2 in the "Off" condition. The lateral shift mechanism or platform is centered and deenergized and both the longitudinal and vertical drive assemblies are in "fine" control, at a null position with the brakes set. The elevator is in the "Down" position, with no load aboard, and the present location of the stacker is at HOME position. It will also be necessary to have the source of compressed air operating and applied to the compressed air line.

An example will now be given where it is desirable to have a load deposited on the left pallet dolly 407, transfer the stacker from aisle No. 1 to aisle No. 2, and deposit the load in a bin located in bin column 12 and row 2 (H-12, V-2). Reference is now made to FIGS. 8a through 8c, and 9, wherein the transfer cart logic and servo schematics are found. With the above conditions just described, and with power applied to the transfer cart, through power lines L1, L2, L3 and N, the following elements are energized or in the condition as will be described. When the stacker is centered and at the HOME position on the transfer cart with the lateral shift mechanism centered, it will be seen that reed switch RS-1 is closed (line 16.4) by stacker actuate electromagnet S.EM-1, which energizes control relay CR-13. Upon the closing of limit switch L.LS-1 (line 39L), control relay L.CR-11 is energized, which in turn energizes LEFT PALLET DOLLY HOME ELECTROMAGNET L.EM-2 (line 35L). It will be recognized that there are control elements between lines 26 and 46 of the left and right dolly control circuits which are identical, and, therefore, in this particular example, only the left pallet dolly circuit (FIG. 8c) will be explained, it being understood that the right pallet dolly circuit is identical. Limit switch R.LS-1 is closed (line 39R), and consequently the contacts of control relay R.CR-11 (line 1) are closed. It will also be observed that reed switch L.RS-7 and limit switch L.LS-12 are closed (line 41L) thus energizing control relay L.CR-12. When energized, control relay L.CR-12 allows the dolly to move outward as long as limit switch L.LS-12 is not tripped, which occurs whenever the stacker lateral platform is extended from the stacker. In other words, as long as the lateral shift mechanism of the stacker is centered, and the stacker is not programmed to enter that load station, the dolly may move out from its load station position. It will also be observed that the transfer cart 400 will be LOCKED to the bin aisle 907 from the last aisle-to-aisle transfer. It should also be mentioned that the transfer cart TRANSFER switch PB-1 will most likely be in the "-Transfer" position having remained at that position from the last mode of operation.

DOLLY-OUT MODE OF OPERATION

The left pallet dolly switch L.PB-2 is turned to the "OUT" position and depressed, and LEFT OUT-SOLENOID L.SOL-5 (line 28L) is energized which mechanically controls three-way valve 462 which receives compressed air at its input from the compressed air source 402 and supplies compressed air at its output to cylinder 457 and plunger 461 which causes the pallet dolly to be extended outwardly as long as the left pallet dolly switch L.PB-2 is maintained in the "Out" condition. Once the left pallet dolly starts to move outwardly towards its most extended position, limit switch L.LS-1 is opened (line 39L), and control relay L.CR-11 again resumes a deenergized state, deenergizing the LEFT PALLET DOLLY HOME ELECTROMAGNET L.EM-2 (line 35L).

LOAD POSITIONED ON LEFT PALLET DOLLY

"Dolly-In" Mode of Operation

Once the pallet is aboard the dolly, limit switch L.LS-7 is closed (line 31L) and limit switch L.LS-7(A) is opened (line 40L) and these switches remain in this position as long as the pallet is aboard the dolly.

After the load is positioned on left pallet dolly 407, it is then desirable to retract the pallet dolly or cause it to move to its IN position. This is done by moving the LEFT PALLET DOLLY SWITCH L.PB-2 to the IN position, and depressing the switch (line 26L) which causes control relay L.CR-7 to be energized, which in turn energizes LEFT IN-SOLENOID L.SOL-6 (line 30L). The LEFT IN-SOLENOID L.SOL-6 actuates three-way valve 462 to cause the compressed air to be applied against the opposite end of the piston through compressed air line 464 in the pallet dolly drive cylinder, and the dolly is moved inwardly (towards the stacker). At this point in the operation, once the dolly starts to move inwardly, if the load on the pallet is too high, the load is stopped and the dolly is reversed (this mode of operation will be described at the finish of the "Dolly In" mode of operation).

As the left dolly continues to move inwardly, it eventually reaches the HOME position where limit switch L.LS-1 is again closed by channel member 473 (line 39L), and control relay L.CR-11 is again energized. Upon control relay L.CR-11 being energized, it in turn energizes the LEFT PALLET DOLLY HOME ELECTROMAGNET L.EM-2 (line 35L) and simultaneously energizes LEFT POSITION SOLENOID L.SOL-7 (line 31L). LEFT POSITION SOLENOID L.SOL-7 is mechanically coupled to valve 800 which is used to control the compressed air from line 439 to cylinder 802 and plunger 805 which is coupled to the positioning arm 807 to square up the pallet in one direction only. As position arm 807 moves the pallet, limit switch L.LS-13 (line 44) is closed, which energizes LEFT POSITION SOLENOID L.SOL-9. This solenoid is mechanically coupled to valve 810 which is used to control the compressed air in line 811 to another cylinder 812 and plunger 815 which is located 90° or perpendicular to cylinder 802, and position arm 817 then centers the pallet at load station 409. That is, the pallet is "squared up" at the load station so that it may be in a position to be lifted from the load station by the lateral shift platform 386 of the stacker.

Once the pallet has been positioned on the load station, that is, centered so that the stacker may pick up the pallet, limit switches L.LS-8, L.LS-9 and L.LS-10 are closed which causes control relay L.CR-22 to be energized (line 32L). It will be observed that the limit switches are located at three different positions on the pallet dolly as seen in FIGS. 6a and 6b. Upon control relay L.CR-22 being energized, control relay L.CR-7 is deenergized (line 27L). Also, the LEFT POSITION SOLENOID L.SOL-6 is deenergized (line 31L), stopping the movement of position arm 807, and the LEFT POSITION SOLENOID L.SOL-9 is deenergized (line 44L), thus allowing both position arms to retract to their normal deenergized positions. The LEFT IN-SOLENOID L.SOL-6 deenergized (line 30L) because the pallet has been retracted to its innermost position, and at this time the LEFT PALLET POSITION ELECTROMAGNET L.EM-1 is energized (line 34L), which supplies a magnetic field to close reed switch RS-17 (FIG. 24a) in the stacker logic circuit (line 83).

LOAD TOO HIGH

In certain cases, the load which is positioned on the pallet may be too high to be accepted by the bins, and therefore, provision is made to reject the load under such conditions. After the load has been placed upon LEFT PALLET DOLLY 409, and the LEFT PALLET DOLLY IN switch L.PB-2 has been pressed and released, control relay L.CR-7 is energized (line 26L), which in turn energizes the LEFT IN-SOLENOID L.SOL-6 (line 30L), which starts the pallet dolly towards the "in" position. If the light beam is broken from lamp L.LT-9 to the LEFT HIGH LOAD P.E.C., which happens when the load is too high, control relay L.CR-20 is energized (line 38.5L), which in turn energizes control relay L.CR-9 (line 36L). Control relay L.CR-9 prevents the pallet dolly from moving further by deenergizing control relay L.CR-7 (line 26L), which in turn deenergizes the LEFT IN-SOLENOID L.SOL-6 (line 30L). At the same time the LEFT OUT-SOLENOID L.SOL-5 is energized (line 29L), which starts the pallet dolly moving outwardly rather than inwardly. As the dolly reaches its outermost position, limit switch L.LS-11 is opened by rack 485 (line 36L), thus deenergizing control relay L.CR-9 which deenergizes the LEFT OUT-SOLENOID L.SOL-5 (line 29L). Because the load has returned to its outward-most position, the LEFT PHOTOELECTRIC CELL L.PEC is opened thus deenergizing control relay L.CR-20 (line 38.5L).

LEFT RECYCLE

The occasion may also arise where the stacker has deposited a load on the left pallet dolly, and it may be desirable to replace the load in the bins, but in a different location. In this condition, obviously there is no need to send the pallet dolly out and have it brought back to be repositioned. However, because the pallet dolly may be off center or turned to one side, it is necessary to reposition the pallet dolly so that the stacker may pick up the load. This is accomplished in the same manner as the latter steps of retracting the pallet dolly.

SELECT AISLE LOCATION

Since the transfer cart is now located at aisle No. 1, it may be assumed that the aisle selector switch SS1-1 was pressed, and in so doing, it will be observed that reed switch RS-8 is closed, and that switch NO. 1 (FIG. 8b) is depressed (line 17.1), which at this instant produces no particular result. It will be observed, however, that reed switch RS-3 is also closed (line 22) which energizes control relay CR-8. Control relay CR-8 (FIG. 9) is used to further determine the mode of operation of the transfer cart longitudinal motor and causes the transfer cart servo circuit (servo line 12) to be energized and assume a "fine" mode of operation. This then is the state of the transfer logic circuit with respect to aisle selection prior to selecting a new aisle location. Aisle selector switch SS1-2 is depressed, and in such condition, reed switch RS-8 remains closed (line 17.1), and reed switch RS-3 also remains closed (line 22). However, at this time, the selector switch SS-1 causes aisle switch No. 1 to assume its undepressed position, and aisle switch No. 2 is then depressed. Under such a condition, it will be seen that reed switch RS-9 will remain open (line 17.2), since magnetic strip 832 (FIG. 7) associated with reed switch RS-9 has not yet been reached (located at aisle No. 2), and reed switch RS-4 (line 23) also remains open since magnetic strip 832 closes both reed switches RS-9 and RS-4 when the transfer cart approaches aisle No. 2. It will be observed that voltage is applied through switch section c to reed switch RS-4 (line 23), and that sections b and d of switch No. 2 of the aisle selector switch SS-1 are in an open condition. Since there is no longer an electrical path through switch No. 1 of the aisle selector switch SS-1, control relay CR-8 is deenergized (line 23). Deenergizing control relay CR-8 (servo line 7) causes the transfer cart servo circuit (FIG. 9) to receive a COARSE signal. Once the aisle has been selected, the transfer cart must then be unlocked from the bin before transferring to the next aisle.

UNLOCKED TRANSFER CART

The transfer switch PB-1 is then rotated from the TRANSFER position to the UNLOCK position and depressed and held, which energizes control relay CR-1 (line 1). Control relay CR-1 energizes BACK SOLENOID SOL-1 (line 5) which controls three-way valve 441 that is connected to the compressed air line so that cylinders 451 and 434 withdraw plungers 454 and 436 at both the top and bottom respectively of the transfer cart which is locked to the bin structure 900. In order to prevent the operator from changing the aisle selection to a different aisle, a PUSH BUTTON LOCK SOLENOID SOL-4 is energized (line 18.5) which physically locks the aisle selector switch SS-1, to prevent a change of aisle positions while the transfer cart is actually moving. Once the locking plungers 454 and 436 have been withdrawn from the bins, limit switches LS-2 and LS-3 close, which energize control relay CR-4 (line 7). Control relay CR-4 deenergizes the BACK SOLENOID SOL-1 (line 5) the locks having already been withdrawn. At this point the TRANSFER SWITCH PB-1 may be released from the UNLOCK mode of operation.

TRANSFER FROM AISLE 1 TO AISLE 2

The transfer switch PB-1 is turned to the TRANSFER position and depressed and held in the depressed condition where control relay CR-2 is energized (line 8). Because the transfer cart is initially at aisle No. 1, reed switch RS-8 is closed by magnetic strip 830 (line 17.1), and upon the energizing of control relay CR-2, control relay CR-6L (the L indicates a latching relay) is energized which is used to determine the transfer cart direction of motion. In the energized state, control relay CR-6 causes the transfer cart to move from left to right where the aisle designations are numbered from left to right, that is, 1 through 4, by energizing the transfer cart servo circuit (FIG. 9) (servo line 7). Control relay CR-2 also energizes transfer cart motor M-400 (servo line 5).

At this point, a brief look at the transfer cart servo circuit will disclose the operation of the driving mechanism for the transfer cart. Since control relay CR-8 is deenergized (servo line 7), it will be seen that the signal for the driving mechanism in the coarse mode is obtained from power supply PS-400 and the fine transducer signal is blocked by the open relay contacts (servo line 12). When energized, control relay CR-2 closes the circuit to motor M-400 (servo line 5), and removes the dynamic braking from the motor (servo line 6). A positive 15 volts is applied to the input of control amplifier 931 (servo line 7) to cause movement of the transfer cart to the right. The motor will then drive the transfer cart in this condition until such time as the transfer cart reaches magnetic strip 832 adjacent to aisle No. 2, at which time the transfer cart logic circuit is again affected.

Returning now to the transfer cart logic circuit, reed switch RS-9 will now be closed by magnetic strip 832 adjacent to aisle No. 2, and in so doing, control relay CR-6L is again energized through its latching coil. Reed switch RS-8 and reed switch RS-3 are now both in an open condition, but reed switch RS-4 is closed which energizes control relay CR-8 (line 23) which shifts the mode of operation from one of a COARSE drive in which the signal is taken from power supply PS-400, to one of a FINE drive where the signal is taken from transducer LPT-401 which is controlled by the magnetic strips adjacent to the aisle such as magnetic strip 830 (FIGS. 9 and 4) as the transfer cart moves to aisle No. 2. This is accomplished by opening the output circuit of control amplifier 931 (servo line 7) and closing the circuit from transducer LPT-401 to summing amplifier SA-400 (servo line 12). It should be observed that tachometer TG-400 is also supplying a feed-back or speed signal to the input of the summing amplifier to provide a positive control over motor M-400. As the transfer cart approaches the aisle and becomes aligned with the aisle, the permanent magnet PM-1 (FIG. 4) located on the bin structure closes reed switch RS-2 (line 13) which energizes control relay CR-5. Control relay CR-5 deenergizes control relay CR-1 (line 1). At the same time, FORWARD SOLENOID SOL-2 (line 6) is energized which is mechanically coupled to three-way valve mechanism 441 for causing the cylinders to again move the plungers 454 and 436 into engagement with the lock structures on the bins (FIG. 4) and unlatch control relay CR-3UNL (line 14) is energized but since control relay CR-3L is still energized, there is no effect upon control relay CR-3L, and it remains in the energized state. However, upon control relay CR-1 being deenergized (line 1), it will be seen that control relay CR-6L is electrically deenergized (line 17.8), but remains mechanically latched because unlatch control relay CR-6UNL has not as yet been electrically energized (line 18). Upon the contacts of control relay CR-5 closing and energizing unlatch control relay CR-6UNL (line 18), control relay CR-6L is mechanically unlatched and deenergized (line 17.8). It will also be observed that upon deenergizing control relay CR-1, that the PUSH BUTTON LOCK SOLENOID SOL-4 is deenergized (line 18.5).

TRANSFER CART LOCKS

Once the transfer cart 400 is locked to the bin structure 900, limit switches LS-2 and LS-3, are opened which deenergize control relay CR-4 (line 7) which in turn deenergizes control relay CR-2 (line 8). Control relay CR-2 in turn deenergizes motor M-400 (servo line 5). The transfer switch PB-1 may now be released from its depressed state. Control relay CR-4 also deenergizes control relay CR-5 (line 13), which in turn deenergizes the FORWARD SOLENOID SOL-2 (line 6), thus shutting off the compressed air to cylinders 451 and 434 for locking the transfer cart to the bin structure and also deenergizes unlatch control relay CR-3UNL (line 14), and deenergizes unlatch control relay CR-6UNL (line 18). It will now be observed that the transfer cart is in the same condition as it was at the beginning of the transfer mode of operation with the pallet on the left pallet dolly at the HOME position.

ALL AISLE SWITCHES NON-DEPRESSED

If at any time during the selection of the aisle with the aisle selector switch SS-1, the push buttons should assume a condition where none of the switches are pressed or energized, there would not be an intelligent signal transmitted to the motor drive circuits, and, therefore, such a condition should not be allowed to exist. For this reason, control relay CR-21 is energized whenever all the selector switch buttons of SS-1 are raised on nonenergized (line 17), and this will be seen by tracing the circuit through contacts d of each of the switch sections. Upon being energized, control relay CR-21 deenergizes control relay CR-2 (line 8) so that the transfer function can never be completed since control relay CR-2 controls the energization of motor M-400. Upon selecting any of the buttons of the aisle selector switch SS-1 and depressing any one of them, control relay CR-21 is deenergized (line 17) by breaking the circuit just described.

The operation of the stacker will now be described in taking the pallet load from the transfer cart and depositing it in the appropriate bin, and by withdrawing a pallet from a bin and depositing it at a load station.

STACKER OPERATION FOR DEPOSIT-WITHDRAWAL MODE

Initial Conditions

Certain initial conditions must be assumed before the operation of the stacker can be fully set forth. It will be assumed that the following conditions and modes of operation have taken place or exist:

1. Power is applied to the transfer cart and stacker.
2. The load is aboard the left pallet dolly and positioned at the load station ready for a deposit mode of operation with the dolly in HOME position.
3. The transfer from aisle No. 1 to aisle No. 2 has been completed.

The transfer cart is locked in place in front of aisle No. 2 and the stacker is ready to be set in motion with the following transfer cart and stacker conditions existing:

TRANSFER CART COMPONENTS ENERGIZED

| | |
|---|---|
| Control Relay L.CR-11 | Control Relay CR-13. |
| Dolly Home Electromagnet L.EM-2. | Control Relay R.CR-11. |
| Control Relay L.CR-22 | Right Dolly Home Electromagnet R.EM-2. |
| Left Pallet Positioned Electro-magnet L.EM-1. | Control Relay R.CR-22. |

It is desirable to pick up the pallet at the left load station 409 on the transfer cart and deposit the load in a left bin twelve columns longitudinally away and two rows high (H-12,V-2) and withdraw a second load from a right bin nine columns longitudinally away and four rows high (H-9, V-4).

STACKER SWITCHES ACTUATED

| Switch Name | Left Addresser | Right Addresser |
| --- | --- | --- |
| Work Mode Sw | SS-1 "Deposit" | SS-2 "Withdraw" |
| Load Station Selector Sw | SS-4 "Left" | SS-6 "Right" |
| Bin Selector Sw | SS-3 "Left" | SS-5 "Right" |
| Long. Bin No. Sw | SS10-10, SS11-2 | SS-13-00, SS14-9 |
| Vert. Bin No. Sw | SS12-2 | SS-15-4 |
| Left Addresser | S-1 "On" | |
| Right Addresser | | S-2 "On" |

STACKER PRE-STANDBY MODE

| Item | Status |
| --- | --- |
| Actuate Switch PB-1 | Off. |
| Lateral Platform | Centered and Off. |
| Longitudinal Servo | Fine Control, At Null, Brake Set. |
| Vertical Servo | Fine Control, At Null, Brake Set. |
| Elevator | Down. |
| Load | Empty. |
| Location | Home Position. |

Reference is now made to the stacker logic and servo schematics FIGS. 21a through 21h and 22a through 22b Since power is received from transformer T-101 (line 5, FIG. 21a) unlatch control relay CR-12UNL (line 60) and unlatch control relays CR-8UNL and CR-9UNL (line 52) are energized. Also energized are unlatch control relays CR-26UNL (line 98) and CR-33UNL and CR-34UNL (line 105). At this point it will also be observed that the power supplies are also energized.

After the last mode of operation, the transducer shifter bar 263 was moved to an UP position (the elevator is DOWN) and limit switch LS21-2 is closed thus energizing control relay CR-36 (line 112). At the same time, because the elevator is in a "safe quadrant" reed switch RS23-1 (line 132) is also closed by magnetic strip 244 which energizes control relay CR-50 (line 130). With the elevator platform 386 centered, limit switch LS-22 is closed which energizes control relay CR-39 (line 115), control relay CR-1 (line 14), which in turn energizes transfer cart electromagnet S-EM1 (line 31). Since the stacker is at the HOME position, magnetic strip 165 will cause reed switch RS28-00 to be closed which energizes control relay CR-46 (line 210). Because the right addresser longitudinal selector switch SS13-00 is closed, control relay CR-49 is also energized (line 238). It will also be observed that because the stacker is at HOME position, reed switch RS28-0 is also closed by magnetic strip 155 to energize control relay CR-45 (line 209). Since the elevator platform is at its lowest position, indicating a bin elevation position of No. 1, reed switch RS29-1 is also closed by magnetic strip 244 which energizes control relay CR-41 (line 189). The fact that each of the selector switches SS-10 through SS-15 is closed or actuated, causes control relay CR-21 to also be energized (line 234). This then completes the conditions that exist when the stacker is in an initial condition ready to be placed in a STANDBY mode of operation.

STANDBY MODE OF OPERATION

In a "Standby" mode of operation, the left addresser switch S-1 is turned to the ON condition. With switch S1-2 closed and the Left Deposit-Withdrawal switch SS-1 in the "Deposit" position, a DEPOSIT mode of operation is indicated where the load will be taken from a load station and sent to a bin.

Since it is desirable to pick up the load from the left load station, the left load station selector switch SS-4 (line 58) is closed in the LEFT position and the left bin selector switch SS-3 is also closed in the LEFT position (line 57).

The load on the left pallet dolly is to be deposited in a bin on the left side in the twelfth column and second row. The longitudinal bin number selector switch SS10-10 is depressed, as well as switch SS11'to designate a bin in the twelfth column and vertical bin number selector switch SS12-2 is depressed indicating the bin is at a second level. After the load is taken from the left load station and deposited in a bin in column 12, row 2 (H12, V2) on the left side, the stacker then will be directed to move towards the HOME position longitudinally and move upwardly to withdraw a load from a bin in the ninth column and fourth row (H9, V4) on the right-hand side and return the load to the HOME position, deposit the load at the right-hand load station before shutting down, and be put in a condition to start the next mode of operation.

In addition to the left addresser being actuated or turned ON the right addresser switch S2-1 must also be addressed so as to carry out the second command of the withdrawal mode and is turned ON. With switch S2-3 closed and the right deposit-withdrawal switch SS2-2 closed, a WITHDRAWAL mode of operation is indicated where the load will be taken from the right bin and delivered to right load station.

It will also be observed that the right load station addresser switch SS-6 when set in the "Right" position, is in an open condition (line 60) and the right bin addresser switch SS-5 when set in the "Right" position is also open (line 59).

The right longitudinal bin number selector switch SS13-00 is depressed as well as switch SS14-9 to designate a bin in the ninth column and vertical bin number selector switch SS15-4 is depressed indicating the bin is at a fourth level.

Since all of the required information is now set into stacker panel, the sequence of operation will now begin.

LEFT ADDRESSER ACTUATED-

The operator presses the actuate switch button PB-1 and releases it, thereby energizing control relay CR-2L (line 18) which in turn energizes control relay CR-3L (line 21). As explained earlier, those relays identified with a suffix letter L indicate the relays are of the latching type.

When the operator presses the actuate switch button PB-1, switch PB1-2 is closed momentarily to energize unlatch control relay CR-27UNL (line 19) and upon the switch being released, the unlatch control relay is deenergized Control relay CR-3L immediately breaks the circuit to control relay CR-2L (line 18) but because control relay CR-2L is a latching type relay, it remains mechanically latched and its contacts are kept in an actuated condition. Control relay CR-3L also deenergizes control relay CR-1 (line 14) which in turn deenergizes the transfer cart enable electromagnet S.EM-1 (line 31). This relay in turn energizes control relay CR-19 (line 75). Control relay CR-3L also energizes control relay CR-4L (line 25) when the right addresser switch S2-1 is closed. Control relay CR-4L energizes control relay CR-5L (line 27). Upon control relay CR-5L being energized, the electrical path is broken to control relay CR-4L and it remains mechanically latched (line 25). It should also be observed that when the right addresser switch S-2 is ON unlatch control relay CR-9UNL is deenergized (line 52).

Control relay CR-3L also energizes control relay CR-12L (line 57). Therefore longitudinal transducer LPT-102 is connected to the longitudinal drive circuit, the fine-superfine vertical transducer LPT-203 is connected to the vertical drive circuit and a left reference voltage to be applied to the lateral drive circuit. At the same time, control relay CR-3L energizes left load station warning electromagnet S.EM-2 (line 29). It is assumed for convenience that the vertical superfine null coincides with the vertical fine null, therefore when control relay CR-19 is energized by relay CR-3L, the normally open contacts of relay CR-19 energize control relay CR-22 (line 83). Control relay CR-22 deenergizes unlatch control relay CR-12UNL (line 60) and energizes control relay CR-26L (line 93). Control relay CR-26L attempts to deenergize control relay CR-12L line 57, but since the unlatch coil of CR-12UNL is deenergized, control relay CR-12L assumes a mechanically latched state and remains actuated. Control relay CR-26L connects the lateral circuit to driver amplifier DA-100 (servo line 15) and disconnects the longitudinal driving circuit (servo line 9). At the same time, unlatch control relays CR-33UNL and CR-34UNL are deenergized (line 105). Control relay CR-30 is also energized by control relay 26L (line 101) which in turn energizes the lateral motor M-300 by connecting the armature circuit (servo line 7). Control relay CR-26L also deenergizes control relay CR-22 (line 83) which in turn deenergizes the coil to control relay CR-26L thus leaving control relay CR-26L in a mechanically latched state (line 93). Control relay CR-26L also energizes control relay 33L (line 103). Thus the lateral platform mechanism, in its lowermost position, is moved outwardly and under the pallet at the left load station. Control relay CR-33L arms the armature circuit for transducer shifter motor M-201 to drive the shifter bar downwardly. As the lateral platform moves outwardly, from its center position, limit switch LS22 (line 115) is opened and control relay CR-39 is deenergized.

PALLET PICKUP

Lateral Platform Out

As the lateral platform moves to its fully extended position, limit switch LS12-3 is closed which energizes transducer shifter motor M-201 (line 106). At the same time, limit switch LS12-2 is opened (line 101) which deenergizes control relay CR-30 which in turn deenergizes motor M-300. In other words, the lateral platform stops moving and the lateral platform motor and its associated driving circuits are deenergized. At the same time, limit switch LS12-1 is closed (line 74) which energizes control relay CR-18 which in turn energizes motor M-200 (servo line 27). It will thus be noted that the armature circuit to motor M-200 is completed. Under such conditions, the elevator platform is rising as the transducer shifter motor M-201 moves the shifter bar 263 downwardly causing limit switch LS21-2 to open and thus deenergize control relay CR-36 (line 112). In turn, control relay CR-33L is deenergized which assumes a mechanically latched condition.

LATERAL PLATFORM RAISED

As the lateral platform 386 moves upwardly to pickup the pallet, reed switch RS-17 (line 83) opens because the reed switch is controlled by transfer cart electromagnet L.EM-1 which became deenergized the moment the pallet was lifted from the load station. Limit switch LS20-1 is also opened (line 110) upon the transducer shifter motor shifting the transducer to the lowermost position which then deenergizes the transducer shifter motor M-201. Limit switch LS20-2 is also closed at the same time which energizes control relay CR-35 (line 111).

LATERAL PLATFORM RETRACT

Upon control relay CR-35 being energized, and control relay CR-33L being mechanically latched, control relay CR-37 (line 113) is energized and disconnects resistor R-314 (servo line 24) from the reference voltage and connects it to ground (servo line 25), thus preparing the circuits for retracting the lateral platform to the center of the elevator. At the moment the platform starts to move inwardly, limit switch LS12-1 is opened (line 74) which then deenergizes control relay CR-18 which in turn deenergizes the vertical drive motor M-200 (servo line 29).

LATERAL PLATFORM CENTERED

As the lateral platform moves inwardly, and it reaches its center position, limit switch LS22 is closed which in turn energizes control relay CR-39 (line 115) which in turn energizes control relay CR-38 (line 114). It will be well to note at this point, that the driving circuits should reach a condition in which the lateral platform driving mechanism is centered is deenergized and the vertical and longitudinal driving mechanism are in a coarse mode of operation. Control relay CR-38 energizes unlatch control relay CR-2UNL (line 32) which deenergizes control relay CR-2L since the relay was in a mechanically latched state previously. Upon control relay CR-2L being deenergized (line 18), control relay CR-3L assumes a mechanically latched state (line 21) since unlatch control relay CR-3UNL is deenergized. Control relay CR-38 also energizes unlatch control relay CR-26UNL which in turn deenergizes control relay CR-26L. Upon control relay CR-26L being deenergized (servo lines 15, 7 and 9) control to the longitude servo driving circuit is restored. Control relay CR-2L upon being deenergized, also energizes control relay CR-6 (line 44) which in turn energizes control relay CR-10. Control relay CR-10 (servo lines 7 and 8) in turn establishes a forward direction for the longitudinal servo drive circuit. At the same time, control relay CR-6 (servo lines 30 and 33) establishes an upward direction for the vertical driving circuit. Upon deenergizing control relay CR-26L unlatch control relay CR-12UNL is deenergized (line 60). Control relay CR-6 also energizes control relay CR-12L and therefore the moment unlatch control relay CR-12UNL is energized, control relay CR-12L is picked up so that control relay CR-12L remains energized (line 57), since the next destination is also to the left. Control relay CR-6 also energizes control relay CR-14 which deenergizes the left load station warning electromagnet S.EM-2 (line 29) and the coarse control is enabled for the vertical drive circuit (servo lines 35, 36, 37 and 38).

At the same time, control relay CR-26L energizes unlatch control relays CR-33UNL and CR-34UNL (line 105), which deenergizes control relay CR-33L which was mechanically latched. Control relay CR-34L is deenergized at this time and therefore there is no effect upon this relay. Control relay CR-14 also deenergizes control relay CR-19 (line 75) which in turn causes the vertical drive circuit to revert to the "fine" mode of operation. At the same time, control relay CR-19 deenergizes control relay CR-30 (line 101) which in turn deenergizes lateral motor M-300 (servo line 7). In other words, the lateral motor circuit is completely deenergized.

Control relay CR-6 also energizes control relay CR-13 (line 62) which in turn causes the longitudinal driving circuit to be operated in the coarse mode of operation (servo lines 3 and 9). Control relay CR-13, upon being energized, energizes control relay CR-16 (line 70). Control relay CR-16 in turn energizes longitudinal drive motor M-100 (servo line 7). Upon deenergizing control relay CR-2L, control relay CR-23 is energized (line 88). Control relay CR-14 energizes control relay CR-18 (line 72) which in turn energizes vertical motor M-200 (servo line 27). It will now be observed that the longitudinal and vertical driving systems are set in the coarse mode of operation, so that the stacker may move longitudinally down the aisle away from the HOME position and vertically upward toward the left bin location where the pallet is to be deposited.

STACKER MOVING IN COARSE CONTROL LONGITUDINALLY

As the stacker moves away from the HOME position on the transfer cart, reed switch RS28-0 opens and deenergizes control relay CR-45 (line 209). As the elevator starts to move upwardly, reed switch RS29-1 is opened which deenergizes control relay CR-41 (line 189) and because control relay CR-33L is deenergized and the retracting mode of operation is over, control relay CR-37 is deenergized (line 112) which in turn deenergizes control relay CR-38 (line 114) which in turn deenergizes unlatch control relay CR-2UNL (line 32). Control relay CR-37 also arms the lateral platform circuit to cause the platform to move outwardly when again energized. As the elevator platform moves upwardly, magnetic strip 245 opposite reed switch RS29-2 causes the reed switch to be closed which energizes control relay CR-42 (line 184) which in turn deenergizes control relay CR-14 (line 66) which in turn causes the vertical drive to operate in the "fine" mode of operation.

As the stacker is traveling away from the HOME station and comes in front of bin column nine, magnetic strip 164 closes reed switch RS28-9 (line 192), control relay CR-48 is energized (line 236) which in turn energizes control relay CR-8L (line 50). Control relay CR-8L sets up the memory function described previously to direct the stacker towards the HOME position for the second command. Upon reed switch RS28-9 being opened, control relay CR-48 is deenergized (line 236) which in turn mechanically latches control relay CR-8L (line 50) inasmuch as there is no voltage applied to unlatch control relay CR-8UNL and CR-9UNL as described previously due to control relay CR-4 being energized.

The vertical drive system is still operating in the fine mode of operation and let it be assumed that the stacker has now reached the tenth bin longitudinally. Reed switch RS28-00 opens and deenergizes control relay CR-46 (line 210) and control relay CR-49 (line 238), and reed switch RS28-10 is closed by magnetic element 176 which energizes control relay CR-44 (line 208). As the stacker moves longitudinally away, magnetic strip 176 keeps reed switch RS28-10 closed and when nearing the twelfth bin reed switch RS28-2 is closed by magnetic strip 168 in addition thereto which energizes control relay CR-43 (line 199) which in turn deenergizes control relay CR-13 (servo lines 3 and 9) thus putting the longitude drive circuit in the "fine" mode of operation. Control relay CR-13, at this time, also energizes left load station warning electromagnet S.EM-2 (line 29). Thus the stacker is moving towards being centered at the bin location.

STACKER LINING UP AT BIN LOCATION

Fine And Superfine Operation

Since the longitudinal drive is being controlled by transducer LPT-102, when the output signal reaches a null point, null detector CRSN-101 is energized by closing switch RS-101 by one of the permanent magnets, which opens the contacts in parallel with those of control relay CR-13 and thus deenergizes control relay CR-16 (line 70) which in turn deenergizes longitudinal motor M-100 (servo line 7), aligning the stacker longitudinally in front of the bin.

The vertical drive system is operated from the fine transducer LPT-203 (FIGS. 14, 16, 18 and 22b) which senses magnetic strip 251 on elevator mast 255 and as a null point is reached, reed switch RS-201 is closed by permanent magnet 281 causing null detector CRSN-201 to be energized which opens the contacts to control relay CR-18 (line 72) which in turn momentarily deenergizes vertical drive motor M-200 (servo line 27). Null detector CRSN-201 also energizes control relay CR-19 (line 75) which switches the servo system from "fine" to "superfine" operation (servo lines 36 and 39). Control relay CR-19 in turn deenergizes unlatch control relay CR-26UNL which has no effect on control relay CR-26L since it is already deenergized. Because fine-superfine transducer LPT-203 will most likely not be at a null position, a signal will again be present and a superfine signal will now energize control relay CR-18 which in turn energizes vertical drive motor M-200 (servo line 27). Thus the vertical drive system is again set in motion and moves the elevator until the stand-off error has been integrated by integrating amplifier IA-201 and a superfine null is reached at which point permanent magnet 291 closes reed switch RS-202, causing null detector CRSN-202 to be energized which again deenergizes control relay CR-18 and deenergizes vertical drive motor M-200 (servo line 27). The vertical drive system as well as the longitudinal drive system, are now nulled at the bin location. Upon null detector CRSN-202 reaching a null, control relay CR-22 is energized (line 83) which in turn deenergizes unlatch control relay CR-12UNL (line 60) and energizes left bin probe solenoid, SOL-1. Solenoid SOL-1 directs the operation of the left flipper 300 to check the status of the bin to determine if it is empty or obstructed before attempting to deposit the pallet in the bin.

LEFT FLIPPER OUT

Left bin solenoid SOL-1 causes arm 312 and left spring 313 (FIGS. 19 and 20) on the flipper to move outwardly and upon moving into the bin area where there is no obstruction, solenoid switch SOL1-S1 is closed (line 93) which in turn energizes control relay CR-26L. Upon energizing control relay CR-26L, control relay CR-12L, is deenergized but because there is no voltage applied to the coil of unlatch control relay CR-12UNL, control relay CR-12L assumes a mechanically latched condition, and therefore keeps its contacts in the same state as when it is electrically energized. Control relay CR-26L also deenergizes left bin solenoid SOL-1 (line 89). At the same time, control relay CR-26L deenergizes unlatch control relays CR-33UNL and CR-34UNL (lines 105 and 106) which has no effect on either control relay CR-33L and CR-34L as both are deenergized. Control relay CR-26L also deenergizes control relay CR-22 (line 83) which in turn deenergizes the coil on control relay CR-26L and since unlatch control relay CR-26UNL is deenergized, control relay CR-26L remains in a mechanically latched condition such as described previously (line 93). Control relay CR-26L also energizes control relay CR-30 (line 101) which in turn energizes lateral drive motor M-300 (servo line 7). Control relay CR-26L also energizes control relay CR-34L (line 103) and also cuts out the longitudinal drive servo and causes the lateral drive servo to be energized only (servo lines 7, 9, and 15).

LATERAL PLATFORM OUT

As the lateral platform moves outwardly to its fully extended position, limit switch LS12-2 is opened which causes control relay CR-30 to be deenergized (line 101) which in turn deenergizes lateral drive motor M-300 (servo line 7). Thus the lateral platform is stopped at its upward position of travel and is vertically positioned above the bin structure into which a load is to be deposited. At the same time, limit switch LS12-1 is closed which energizes control relay CR-18 (line 74) which energizes vertical drive motor M-200 (servo line 27). At the same time, limit switch LS12-3 is closed which energizes transducer shifter motor M-201 (line 106). It should also be remembered that as the platform moves outwardly from its center position, limit switch LS-22 is opened which deenergizes control relay CR-39 (line 115). Thus with both the vertical drive mechanism and the transducer shifter motor being energized, as the transducer shifter motor moves upwardly, the elevator moves downwardly to deposit the pallet in the bin.

LATERAL PLATFORM LOWERED

As the lateral platform is lowered and the transducer shifter bar 263 is moved upwardly, limit switch LS21-1 is opened which deenergizes transducer shifter motor M-201 (line 110) and at the same time limit switch LS21-2 is closed which energizes control relay CR-36 (line 112). It will also be apparent that limit switch LS20-2 is opened which deenergizes control relay CR-35 (line 111) which in turn deenergizes the voltage to the coil of control relay CR-34L (line 104) but since unlatch control relay CR-34UNL is deenergized, control relay CR-34L remains in the mechanically latched position. It will also be observed that upon control relay CR-36 being energized, control relay CR-37 (line 113) is energized which causes the lateral drive mechanism to start the platform moving in a retracting mode of operation by changing the driving circuit and removing the reference voltage (servo lines 24 and 25). At the same time, control relay CR-37 energizes control relay CR-30 (line 102), which in turn energizes lateral drive motor M-300 (servo line 7). As the platform starts to retract, limit switch LS12-1 is opened which deenergizes control relay CR-18 (line 74) which in turn deenergizes vertical drive motor M-200 (servo line 29). Under these conditions, the platform is locked vertically as it is being retracted.

LATERAL PLATFORM CENTERED

As the lateral platform is retracted, and reaches the center position on the elevator, limit switch LS-22 is closed which energizes control relay CR-39 (line 115) which in turn energizes control relay CR-38 (line 114). Control relay CR-38 energizes unlatch control relay CR-3UNL (line 32) and unlatch control relay CR-5UNL (line 36). Upon unlatch control relay CR-3UNL being energized, it deenergizes control relay CR-3L which has been in mechanically latched condition (line 21). Control relay CR-38 also energizes unlatch control relay CR-26UNL (line 98) which in turn deenergizes control relay CR-26L which was mechanically latched (line 93). deenergizing control relay CR-26L again cuts out the lateral drive servo and allows the longitudinal drive servo to be energized (servo lines 7, 9 and 15). Deenergizing control relay CR-3L energizes control relay CR-1 (line 14) which in turn energizes the transfer cart enable electromagnet S.EM-1 (line 31). Upon deenergizing control relay CR-3L, the left load station warning electromagnet S.EM-2 is also deenergized (line 29). Upon deenergizing control relay CR-3L, control relay CR-6 is also deenergized (line 43) which would reverse the coarse direction of travel for the vertical drive system and set it up for downward travel when only a single command mode of operation is taking place.

However, when the right addresser is in operation and the address for the second command is vertically above that of the first command or left addresser, control relay CR-7 is energized (line 45) which leaves the servo circuit energized for upward travel. At the same time, control relay CR-6 deenergizes control relay CR-10 which reverses the direction of travel for the longitudinal system under coarse control (servo lines 7 and 8) and sets up the longitudinal driving mechanism to cause the longitudinal motor to drive the stacker towards the HOME station. Also, control relay CR-6 upon being deenergized energizes control relay CR-13 which sets the stacker in the coarse mode of operation (servo lines 3 and 9). Energizing control relay CR-13 causes control relay CR-1 to be deenergized (line 14) which in turn deenergizes the transfer cart enable electromagnet S.EM-1 (line 31). Deenergizing control relay CR-26L also causes control relay CR-30 to be deenergized which in turn deenergizes lateral drive motor M-300 (servo line 7). All of the driving circuits for the stacker motors are now deenergized. Since control relay CR-13 is energized, it causes control relay CR-16 to be energized (line 70) which in turn energizes the longitudinal drive motor M-100 (servo line 7), thereby supplying power to move the stacker towards the HOME position. When control relay CR-7 was energized previously, it energized control relay CR-14 (line 66) through deenergized relay contacts CR-47 (line 69) which in turn sets the vertical drive circuits in coarse operation (servo lines 36 and 38). At the same time, control relay CR-14 energizes control relay 18 (line 71) which in turn energizes vertical drive motor M-200 (servo line 27). Both the vertical and longitudinal driving motors are now energized and set in motion to cause the stacker to move upwardly and longitudinally towards the HOME position. Also, control relay CR-3L upon being deenergized, deenergizes control relay CR-23 (line 87) and energizes unlatch control relay CR-12UNL (line 57) which in turn deenergizes control relay CR-12L since it was in a mechanically latched condition previously. Also, deenergizing control relay CR-26L energizes unlatch control relays CR-33UNL and CR-34UNL and since control relay CR-33L was previously deenergized, there is no effect on this relay but control relay CR-34L is deenergized from a mechanically latched condition (line 103). Also, control relay CR-3L deenergizes control relay CR-19 (line 75) to cause the vertical system to be operated in the "fine" mode of operation (servo lines 36 and 38). Since control relay CR-34L is deenergized, it also deenergizes control relay CR-37 (line 113) which sets up the lateral circuit to be moved outwardly (servo lines 24 and 25). Control relay CR-37 also deenergizes control relay CR-38 (line 114) which in turn deenergizes unlatch control relay CR-3UNL (line 32) and unlatch control relay CR-5UNL (line 32). To complete the sequence of relay operations, unlatch control relay CR-26UNL is deenergized (line 98).

STACKER MOVING IN COARSE CONTROL LONGITUDINALLY AND VERTICALLY

Moving Away From Bin Area For Withdrawal

As the stacker starts to move away from the left bin (H-12, V-2) reed switch RS28-2 is opened which deenergizes control relay CR-43 (line 206), after which reed switch RS28-10 opens, deenergizing control relay CR-44 (line 203). Reed switch RS28-00 is then closed by magnetic strip 165 which energizes control relay CR-46 (line 210) and also energizes control relay CR-49 (line 238). As the stacker continues to move, reed switch RS28-9 is closed by magnetic strip 164 which energizes control relay CR-48 (line 192) which in turn reenergizes control relay CR-8L (line 50). Control relay CR-48 in turn deenergizes control relay CR-13 (line 65) which in turn changes the longitudinal driving circuits from a coarse mode of operation to a fine mode of operation (servo lines 3 and 9).

As the platform moves vertically upward, reed switch RS29-2 is opened which deenergizes control relay CR-42 (line 184) and when reed switch RS29-4 is closed by magnetic strip 245, control relay CR-47 is energized. Control relay CR-47 in turn energizes control relay CR-9L (line 51) which arms the vertical drive circuit for moving the platform downwardly (servo lines 29 and 32). Control relay CR-47 also deenergizes control relay CR-14 (line 69) thus setting the vertical driving circuits in the "fine" mode of operation (servo lines 35, 36, 37 and 38).

STACKER CENTERED AT RIGHT BIN (H-9, V-4)

Since the longitudinal driving circuits are in the "fine" mode of operation, null detector CRSN-101 is energized when centered at the bin and control relay CR-16 is deenergized (line 70) which in turn deenergizes longitudinal drive motor M-100 (servo line 7).

The vertical null detector CRSN-201 is also energized and deenergizes control relay CR-18 (line 72) which in turn deenergizes vertical drive motor M-200 (servo line 27). At the same time, null detector CRSN-201 energizes control relay CR-19 (line 76) which in turn causes the vertical mode of operation to be shifted to the "superfine" mode (servo lines 36 and 38). Upon the superfine mode of operation taking place in which the vertical stand-off error is to be integrated, null detector CRSN-202 is energized which again energizes control relay CR-18 (line 73) which re-energizes vertical drive motor M-200 (servo line 27) thus causing the fine-superfine right transducer LPT-203 to null out on the magnetic material contained on the bin and have reed switch RS-202 closed by permanent magnet 293 (FIG. 14a). Upon null detector CRSN-202 being energized, control relay CR-18 becomes deenergized (line 73) which in turn deenergizes vertical drive motor M-200 (servo line 27) thus stopping the vertical movement of the platform. Energizing null detector CRSN-202 also energizes control relay CR-22 (line 83) which in turn deenergizes unlatch control relay CR-12UNL (line 60).

Control relay CR-22 energizes control relay CR-26L (line 93) which in turn changes the arrangement of the servo circuitry to enable the lateral axis and disable the longitudinal axis. At the same time, control relay CR-26L deenergizes unlatch control relays CR-33UNL and CR-34UNL (line 105). Control relay CR-26L also energizes control relay CR-30 (line 101) which in turn energizes lateral drive motor M-300 (servo line 7). Control relay CR-26L also energizes control relay CR-33L (line 103) and deenergizes control relay CR-22 (line 83) and the latter produces a mechanically latched condition of control relay CR-26L (line 93). As the platform starts to move outwardly, limit switch LS-22 is opened which causes control relay CR-39 to be deenergized (line 115).

LATERAL PLATFORM OUT

When the lateral platform is fully extended in its outward position, limit switch LS12-3 is closed which energizes the transducer shifter motor M-201 (line 106). At the same time, limit switch LS12-2 is opened which deenergizes control relay CR-30 (line 101) which in turn deenergizes the lateral drive motor M-300 (servo line 70), thus deenergizing the driving circuits to the lateral platform. The lateral platform also closes limit switch LS12-1 which energizes control relay CR-18 (line 74) which in turn energizes vertical drive motor M-200 (servo line 27) thus starting the platform to move upwardly to pick up the pallet in the bin.

LATERAL PLATFORM RAISED

The transducer shifter motor M-201 drives the transducer shifter bar 263 downwardly, and as it leaves its uppermost position, limit switch LS21-2 is opened (line 112) which causes control relay CR-36 to be deenergized, which in turn deenergizes control relay CR-33L which remains mechanically latched. When the shifter bar reaches the down position, limit switch LS20-1 is opened which deenergizes transducer shifter motor M-201 (line 110) and limit switch LS20-2 is closed which energizes control relay CR-35 (line 111). Control relay CR-35 in turn energizes control relay CR-37 (line 113) which produces a different signal for driving the lateral motor in a retracted mode of operation (servo lines 24 and 25). Control relay CR-37 also energizes control relay CR-30 (line 102) which in turn again energizes lateral drive motor M-300 (servo line 7) thus starting the lateral platform to retract with the pallet aboard since the platform was raised sufficiently to clear the bin supports.

LATERAL PLATFORM RETRACT

Once the lateral platform starts to move away from its fully extended position, limit switch LS12-1 is opened which deenergizes control relay CR-18 (line 74) which in turn deenergizes the vertical drive motor M-200 (servo line 27) which prevents any vertical movement of the platform. The lateral platform then retracts to its center position.

LATERAL PLATFORM CENTERED

Upon the lateral platform reaching the center of the elevator, control relay CR-39 (line 115) is energized through the closing of limit switch LS-22. Energizing control relay CR-39 causes control relay CR-38 to be energized, (line 114) which energizes unlatch control relay CR-4UNL (line 33) which in turn deenergizes control relay CR-4L (line 25). At the same time, control relay CR-38 energizes unlatch control relay CR-26UNL (line 98) which in turn deenergizes control relay CR-26L (line 93) since this relay was in a mechanically latched state. deenergizing control relay CR-26L energizes unlatch control relay CR-26L energizes unlatch control relay CR-12UNL (line 60) but since control relay CR-12L was deenergized at the end of the left addresser mode of operation, it is not effected. deenergizing control relay CR-26L also energizes unlatch control relays CR-33UNL and CR-34UNL (line 105). deenergizing control relay CR-26L also deenergizes control relay CR-30 (line 101) which in turn deenergizes lateral drive motor M-300 (servo line 7). Energizing unlatch control relay CR-33UNL also deenergizes control relay CR-33L (line 103) which in turn deenergizes control relay CR-37 (line 113) to produce the proper signal to drive the platform outwardly from the center position (servo lines 24 and 25). deenergizing control relay CR-37 also deenergizes control relay CR-38 (line 114).

deenergizing control relay CR-4L also deenergizes control relay CR-7 (line 45) and causes control relays CR-5L (line 27) and CR-8L (line 50) to become mechanically latched. Deenergized control relay CR-4L energizes unlatch control relays CR-8UNL and CR-9UNL (line 52) which in turn deenergize control relay CR-8L (line 50). Deenergizing control relay CR-4L also causes control relay CR-9L to become mechanically latched (line 51) and since unlatch control relay CR-9UNL was previously energized, control relay CR-9L then becomes deenergized (line 51). Deenergizing control relay CR-4L also energizes control relay CR-23 (line 88) whose contacts by-pass the closing of reed switches RS-17 and RS-19 when the stacker is on the transfer cart at HOME position. Deenergizing control relay CR-7 causes control relay CR-13 to become energized (line 62) which in turn energizes the longitudinal drive circuits in the "coarse" mode of operation (servo lines 3 and 9). It also deenergizes control relay CR-19 (line 75). Deenergizing control relay CR-7 (line 45) also causes control relay CR-17 (line 66) to be energized which in turn energizes the "coarse" vertical driving circuits (servo lines 36 and 38).

When control relay CR-38 (line 114) was deenergized as previously stated, it also deenergized unlatch control relay CR-4UNL (line 33). Deenergizing control relay CR-38 also deenergizes unlatch control relay CR-26UNL (line 98). As control relay CR-13 was just recently energized, it causes control relay CR-16 to be energized (line 70) which in turn energizes longitudinal drive motor M-100 (servo line 7). Similarly, in the energizing of control relay CR-14 previously, it in turn energizes control relay CR-18 (line 71) which in turn energizes the vertical drive motor M-200 (servo line 27). Thus at this point both the longitudinal and vertical driving systems are in operation causing the stacker to move downwardly and rearwardly towards the HOME position.

STACKER MOVING LONGITUDINALLY AND VERTICALLY IN COARSE CONTROL

As the stacker starts to move longitudinally away from the right hand bin (H-9, V-4), reed switch RS28-9 is opened, which causes control relay CR-48 to be deenergized (line 236). Upon the platform moving downwardly, reed switch RS29-4 is opened, which deenergizes control relay CR-47 (line 221). As the stacker moves downward and reed switch RS29-1 is closed by magnetic strip 245, control relay CR-41 (line 185) is energized which in turn deenergizes control relay CR-14 (line 67) to cause the vertical servo to operate in the "fine" mode of operation (servo lines 35, 36, 37 and 38). Once the null detector CRSN-201 is energized by reed switch RS-201 coming within the field of permanent magnet 280, control relay CR-18 is deenergized (line 72) which in turn deenergizes vertical drive motor M-200 (servo line 27).

Null detector CRSN-201 also energizes control relay CR-19 (line 75) which switches the servo system from "fine" to "superfine" operation (servo lines 36 and 39). Control relay CR-19 in turn deenergizes unlatch control relay CR-26UNL which has no effect on control relay CR-26L since it is already deenergized. Because fine-superfine transducer LPT-203 will most likely not be at a null position, a signal will again be present and a superfine signal will now energize control relay CR-18 which in turn energizes vertical drive motor M-200 (servo line 27). Thus the vertical drive system is again set in motion and moves the elevator until the stand-off error has been integrated by integrating amplifier IA-201 and a superfine null is reached at which point permanent magnet 290 closes reed switch RS-202, causing null detector CRSN-202 to be energized which again deenergizes control relay CR-18 and deenergizes vertical drive motor M-200 (servo line 27).

As the stacker moves longitudinally to the HOME position, reed switch RS28-0 is closed by magnetic strip 155 which energizes control relay CR-45 (line 201) which in turn deenergizes control relay CR-13 (line 62) causing the longitudinal drive circuits to operate in the "fine" mode of operation (servo lines 3 and 9). Once null detector CRSN-101 is energized, control relay CR-16 is deenergized (line 69) which in turn deenergizes longitudinal drive motor M-100 (servo line 7). Upon deenergizing control relay CR-13, it will be seen that right load station warning electromagnet S.EM-3 is energized (line 30).

STACKER HOME

Since the stacker is in the HOME position, reed switch RS-18 (line 84) is closed by electromagnet R.EM-2 in the transfer cart which energizes control relay CR-22 which in turn deenergizes unlatch control relay CR-12UNL (line 60). Control relay CR-22 also energizes the right bin solenoid SOL-2 (line 90).

FLIPPER OUT (RIGHT) EMPTY

Upon the right bin flipper 301 moving its arm and spring arrangement outwardly to determine if right load station 408 is empty, and moving to its maximum travel indicating that the load station is empty, solenoid switch SOL2-S1 is closed which causes control relay CR-26L to be energized (line 93). Control relay CR-26L in turn deenergizes the right bin solenoid SOL-2 (line 90). Upon control relay CR-26L being energized, the longitudinal drive circuits are cut out and the lateral drive circuits are connected to the lateral servo (servo lines 7, 9 and 15). Control relay CR-26L also deenergizes unlatch control relays CR-33UNL and CR-34UNL (line 105) and deenergizes control relay CR-22 (line 101) which mechanically latches control relay CR-26L (line 93). Control relay CR-26L also energizes control relay CR-30 (line 101) which in turn energizes lateral drive motor M-300 (servo line 7), to start the platform moving laterally outward. Control relay CR-26L also energizes control relay CR-34L (line 103).

LATERAL PLATFORM OUT

As the lateral platform moves to its most extended position, limit switch LS12-2 is opened which deenergizes control relay CR-30 (line 101) which deenergizes lateral drive motor M-300 (servo line 7) thus stopping the lateral driving mechanism. Limit switch LS-22 is opened which deenergizes control relay CR-39 (line 115) and limit switch LS12-3 is closed which energizes the transducer shifter motor M-201 (line 106). Limit switch LS12-1 is also closed which energizes control relay CR-18 (line 74) which in turn energizes vertical drive motor M-200 (servo line 27) to cause the vertical platform to move downwardly and deposit the pallet at right load station 408.

PLATFORM LOWERED

The transducer shifter bar 263 is moved upwardly causing platform 386 to move downwardly and upon transducer shifter bar 263 reaching its uppermost position, limit switch LS21-1 is opened which deenergizes the transducer shifter motor M-201 (line 110). At the same time, limit switch LS21-2 is closed which energizes control relay CR-36 (line 112) which in turn energizes control relay CR-37 (line 113) which in turn places the lateral driving circuits in a condition to retract the platform (servo lines 24 and 25). Energizing control relay CR-37, causes control relay CR-30 to be energized (line 102) which then energizes the lateral drive motor M-300 (servo line 7) thus energizing the lateral drive circuits. As the shifter bar 263 left the down position, limit switch LS20-2 was opened which deenergized control relay CR-35 (line 111) and caused control relay CR-34L to be mechanically latched (line 104).

PLATFORM RETRACTING

As the platform starts to retract from its most extended position, limit switch LS12-1 is opened which deenergizes control relay CR-18 (line 74) which in turn deenergizes vertical drive motor M-200 (servo line 27) thus preventing any vertical movement of the platform while it is being retracted

PLATFORM CENTERED AND HOME

Upon the lateral platform reaching the center position of the elevator, limit switch LS-22 is closed which energizes control relay CR-39 (line 115) which in turn energizes control relay CR-38 (line 114). Upon energizing control relay CR-38, unlatch control relay CR-5UNL is energized (line 32) which deenergizes control relay CR-5L which was previously mechanically latched (line 27). Energizing control relay CR-38 also energizes unlatch control relay CR-26UNL (line 98) which in turn deenergizes control relay CR-26L (line 93) which was previously mechanically latched. Upon deenergizing control relay CR-26L, control to the longitudinal portion of the drive circuits is restored in place of the lateral drive circuits (servo lines 7, 9, and 15). Deenergizing control relay CR-5L causes control relay CR-23 to be deenergized (line 88), the right load station warning electromagnet S.EM-3 is deenergized (line 30), and control relay CR-19 is deenergized (line 76). Deenergizing control relay CR-19 shifts the vertical circuit control back to the "fine" mode of operation (servo lines 36 and 38). Upon deenergizing control relay CR-26L, control relay CR-30 is deenergized (line 101) which in turn deenergizes lateral drive motor M-300 (servo line 7) thus preventing the platform moving from the center position.

Deenergizing control relay CR-26L also energizes unlatch control relay CR-12UNL (line 57) and energizes unlatch control relays CR-33UNL and CR-34UNL (line 57). Unlatch control relay CR-34UNL deenergizes control relay CR-34L (line 104) since this relay was previously mechanically latched and upon deenergizing control relay CR-34L, control relay CR-37 is deenergized (line 113) so that the lateral driving circuits are again set in the proper mode of operation to cause the platform to move outwardly (servo lines 24 and 25). Deenergizing control relay CR-37 in turn deenergizes control relay CR-38 (line 114) which in turn deenergizes unlatch control relay CR-5UNL.

Deenergizing control relay CR-5L also energizes control relay CR-1 (line 14) which in turn energizes the transfer cart enable electromagnet S.EM-1 (line 31). It will now be observed that the stacker is in the STANDBY mode of operation and is ready to receive additional commands for either a deposite or withdrawal mode of operation.

It will be obvious that other modes of operation may be initiated by the operator, however, they are primarily all variations of operations which have been described previously.

SAFETY QUANDRANTS FOR VERTICAL AND HORIZONTAL TRAVEL

In lines 132 and 133 (FIG. 21f), three reed switches RS23-2, RS23-1 and RS24 form a safety circuit by providing power to energize control relay CR-50 which has contacts in line 62 controlling the longitudinal coarse-fine control relay CR-13 and in line 70 controlling the longitudinal motor control relay CR-16. The purpose of these reed switches and their magnetic controlling elements are to ensure that the stacker is not driven towards the HOME position with the elevator elevated at a height higher than bin level No. 2 in the coarse mode of operation, at a time when the stacker is longitudinally between the HOME position and the bins located in column No. 3. Control relay CR-6 is deenergized after the platform has been retracted and centered after an extension into the bin structure, or is deenergized where the bin flipper has found the bin full and the stacker is actuated for travel towards the HOME position. In a similar manner, control relay CR-7 is deenergized after the platform has been retracted and centered from an extension into the bin structure or where the bin has been found full and the stacker is actuated for travel towards the HOME position. In other words, once the stacker is put in the coarse mode of operation and directed towards the HOME position, control relay CR-50 is controlled by reed switches RS23-2, RS23-1 and RS24 rather than relay contacts CR-6 or CR-7 in lines 130 or 131. The stacker will be allowed to operate in the coarse mode of operation longitudinally regardless of the vertical position of the elevator until the stacker comes abreast of the bins in column 2 (FIG. 12). At this position in the aisle, reed switch RS24 opens and if the elevator is above vertical level No. 2, with all the reed switches open, the longitudinal driving control is shifted to the fine mode of operation by control relay CR-13 (line 62). The longitudinal drive and servo circuits are then operated in the fine mode of operation, unless the stacker has reached the transfer cart, at which time limit switch LS-10 is opened and the longitudinal drive and servo control circuits are deenergized by control relay CR-16 (line 70). The elevator is allowed to continue downwardly and once magnetic strip 244 (FIG. 23) closes reed switch RS23-2, the longitudinal system is again shifted back to coarse control. Of course, it is necessary to keep the vertical driving system in operation and as the elevator moves magnetic strip 244 past reed switches (RS23-2 and RS23-1) FIGS. 23 and 16), magnetic strip 244 closes the reed switches to keep control relay CR-50 energized. Thus a safe means is provided to ensure that the stacker does not return to the transfer cart with a load elevated any higher than the second bin level.

The foregoing description of the automatic material handling equipment has set forth an embodiment of the invention pointing up important features of the invention. Obviously, a definite advantage exists in being able to transfer the stacker between aisles by the use of a transfer cart and thus eliminate a stacker in each aisle. However, the stacker may be used separately from the transfer cart if desired. It will also be appreciated that in the present invention, the stacker is allowed to proceed at maximum speed to the bin locations both horizontally and vertically, being controlled through coincidence circuits without resort to counting bins or measuring the distance the stacker has traveled both longitudinally and vertically. Provisions have also been made to ensure the proper operation of the two vehicles while the transfer process takes place and during the method of moving the stacker down the aisles from the transfer cart. To aid in loading the stacker, pallet dollies have been provided on the transfer cart for both loading and retrieving the pallet loads and safety precautions have been taken to ensure improper loads are rejected.

We claim:

1. A material handling system for handling material units comprising:
    material-unit support means arranged in a plurality of columns and rows of bins with a plurality of aisles extending therebetween;
    a stacking vehicle constructed and arranged to move horizontally in the aisles and comprising a platform laterally and vertically movable relative to the rest of said stacking vehicle and adapted to support material units;
    a transfer craft horizontally movable across the ends of the aisles having means for receiving, carrying, and transferring said stacking vehicle from one aisle to another;
    a load station on said transfer craft adapted to receive material units into and discharge material units out of the system and located in a position to allow pickup and deposit of material units placed thereon by the movable platform of the stacking vehicle;
    first driving means for driving said stacking vehicle and said movable platform;
    second driving means for driving said transfer craft;
    first control means operatively connected to said first driving means for directing the movement of a material unit to be deposited in, or withdrawn from, said material unit support means; and
    second control means operatively connected to said second driving means for directing the movement of said transfer craft relative to the ends of the aisles.

2. A material handling system according to claim 1 wherein said first control means comprises:
    destination indicating means for identifying a bin selected as a material unit destination;
    means for indicating a material unit destination;
    a first command section means for activating the first driving means to move the stacking vehicle toward a first selected bin and to stop said vehicle adjacent said first selected bin upon sensing said first selected bin, and for moving said movable platform to deposit or withdraw a material unit from said first selected bin; and
    a second command section means responsive to completion of the movement of the movable platform at the first selected bin for activating the first driving means to move the stacking vehicle to a second selected bin, to stop said stacking vehicle adjacent said second selected bin upon sensing said second selected bin, and to move said platform to deposit or withdraw a material unit from said selected bin.

3. A material handling system according to claim 2, wherein said first control means also comprises an obstruction sensing means for sensing unobstructed and obstructed conditions of selected bins to control the first driving means.

4. A material handling system according to claim 3 wherein said obstruction sensing means comprises a means for controlling the first driving means to automatically return the stacking vehicle to the transfer craft in response to a sensing of a respective selected obstructed or unobstructed condition of a selected bin.

5. A material handling system according to claim 1, wherein said load station comprises an aligning means for adjusting the position of material units received by said load station.

6. A material handling system according to claim 1 wherein said first control means comprises a first command section means for activating the first driving means to move the stacking vehicle toward a first selected destination and to laterally move the platform to receive or discharge a material unit at said first selected destination, and a second command section means responsive to completion of the lateral movement of said platform to receive or discharge a material unit at said first selected destination for activating said first driving means to drive said stacking vehicle to a second selected destination and to receive or discharge a material unit at said second selected destination.

7. A material handling system according to claim 1, also comprising a first guide means adjacent the ends of the aisles for guiding the horizontal movement of the transfer craft and a second guide means within the aisles for guiding the horizontal movement of the stacking vehicle.

8. A material handling system according to claim 7 wherein said first guide means comprises first rails adjacent the ends of the aisles, said transfer craft comprises wheels engaging said first rails, said second guide means comprises second rails within the aisles and on said transfer craft, and said stacking vehicle comprises wheels engaging said second rails 9. A material handling system according to claim 8 wherein said first rails and said rails within the aisles are located on a ground surface.

10. A material handling system for handling material units comprising:
    material unit support means arranged in a plurality of columns and rows of bins with a plurality of aisles extending therebetween;
    a stacking vehicle constructed and arranged to move horizontally in said aisles and comprising a platform laterally and vertically movable relative to the rest of said stacking vehicle and adapted to support material units;
    a transfer craft horizontally movable across the ends of the aisles and adapted to receive, carry and transfer said stacking vehicle from one aisle to another;
    a load station means on said transfer craft for receiving a material unit into and discharging material unit out of said system;
    aligning means operably connected to said load station means for moving a material unit into a position adjacent to said stacking vehicle on said transfer craft to allow access to the material unit by said movable platform of said stacking vehicle;
    first driving means for driving said stacking vehicle and said movable platform;
    second driving means for driving said transfer craft;

first control means operatively connected to said first driving means for directing the movement of a material unit to be deposited in, or withdrawn from, said material unit support means; and second control means operatively connected to said second driving means for directing the movement of said transfer craft relative to the ends of the aisles.

Disclaimer 3,536,209.—*Arthur R. Burch*, Wayzata, and *Charles E. Bates*, Minneapolis, Minn. AUTOMATIC MATERIAL - UNIT STORAGE AND METHOD. Patent dated Oct. 27, 1970. Disclaimer filed Oct. 1, 1970, by the assignee, *Clark Equipment Company*.

Hereby disclaims the terminal portion of the term of said patent subsequent to Mar. 31, 1987.

[*Official Gazette March 2, 1971.*]